US007346845B2

(12) United States Patent
Teshima

(10) Patent No.: US 7,346,845 B2
(45) Date of Patent: Mar. 18, 2008

(54) FONT RETRIEVAL APPARATUS AND METHOD

(75) Inventor: Atsushi Teshima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 801 days.

(21) Appl. No.: 10/305,982

(22) Filed: Nov. 29, 2002

(65) Prior Publication Data
US 2003/0131321 A1 Jul. 10, 2003

Related U.S. Application Data

(62) Division of application No. 09/348,209, filed on Jul. 8, 1999, now Pat. No. 6,687,879.

(30) Foreign Application Priority Data

Jul. 9, 1998 (JP) ................................ 10-208552

(51) Int. Cl.
G06F 17/00 (2006.01)

(52) U.S. Cl. ...................... 715/542; 715/535; 382/185; 345/171

(58) Field of Classification Search ................ 715/542, 715/535, 530; 382/185, 301; 345/26, 171, 345/467–469, 469.1, 470, 471, 472.3; 400/110, 400/484; 341/28
See application file for complete search history.

(56) References Cited

U.S. PATENT DOCUMENTS 4,298,957 A * 11/1981 Duvall et al. ................ 715/522
4,428,065 A * 1/1984 Duvall et al. ................... 707/7
4,559,615 A * 12/1985 Goo et al. .................... 715/535
4,594,674 A 6/1986 Boulia et al. ................ 345/471
4,829,583 A * 5/1989 Monroe et al. .............. 382/185
4,877,405 A * 10/1989 Stewart ....................... 434/160
4,881,197 A 11/1989 Fischer ........................ 715/530
4,937,745 A * 6/1990 Carmon ....................... 715/535
5,079,702 A * 1/1992 Ho .............................. 715/535
5,109,352 A * 4/1992 O'Dell ........................ 715/542
5,119,296 A 6/1992 Zheng et al. ................ 715/535
5,206,736 A 4/1993 Simpson ..................... 358/296
5,305,207 A 4/1994 Chiu ........................... 715/535
5,378,068 A * 1/1995 Hua ............................. 400/10
5,410,640 A 4/1995 Morikawa et al. ......... 358/1.11
5,533,180 A * 7/1996 Zhou et al. .................. 715/542

(Continued)

OTHER PUBLICATIONS

Listing of links to font managers on the internet, 28 pages, downloaded Feb. 2, 2006 <http://jeff.cs.mcgill.ca/~luc/fontmanagers.html>.*

(Continued)

Primary Examiner—Doug Hutton
Assistant Examiner—James H Blackwell
(74) Attorney, Agent, or Firm—McGinn IP Law Group, PLLC

(57) ABSTRACT

Out of a lot of fonts, the desired font is quickly found. For this purpose, out of a plurality of portions constituting a character displayed in a partial image retrieval area, the desired portion is selected. A retrieval area is clicked by a user, to retrieve a font on the basis of the selected portion. A list of the results of retrieval is displayed in a retrieval result area. Even if a font name is not memorized, a desired font can be found.

20 Claims, 52 Drawing Sheets

U.S. PATENT DOCUMENTS

| | | | |
|---|---|---|---|
| 5,586,198 A * | 12/1996 | Lakritz | 382/185 |
| 5,586,242 A | 12/1996 | McQueen et al. | 257/530 |
| 5,600,770 A * | 2/1997 | Kawabata et al. | 715/542 |
| 5,710,880 A * | 1/1998 | Howlett et al. | 345/468 |
| 5,724,031 A | 3/1998 | Huang | 341/28 |
| 5,761,655 A * | 6/1998 | Hoffman | 707/4 |
| 5,805,167 A * | 9/1998 | van Cruyningen | 715/808 |
| 5,825,362 A * | 10/1998 | Retter | 715/854 |
| 5,859,648 A * | 1/1999 | Moore et al. | 345/471 |
| 5,903,904 A * | 5/1999 | Peairs | 715/526 |
| 6,041,137 A * | 3/2000 | Van Kleeck | 382/185 |
| 6,094,666 A | 7/2000 | Li | 715/535 |
| 6,148,104 A * | 11/2000 | Wang et al. | 382/185 |
| 6,161,116 A * | 12/2000 | Saltzman | 715/535 |
| 6,278,462 B1 | 8/2001 | Weil et al. | 345/619 |
| 6,345,274 B1 * | 2/2002 | Zhu et al. | 707/5 |
| 6,377,966 B1 | 4/2002 | Cooper et al. | 715/542 |
| 6,466,694 B2 * | 10/2002 | Kamada et al. | 382/181 |
| 6,512,531 B1 * | 1/2003 | Gartland | 715/854 |
| 6,552,728 B1 * | 4/2003 | Moore et al. | 345/471 |
| 6,661,417 B1 * | 12/2003 | Cheng | 345/469 |
| 2004/0255218 A1 * | 12/2004 | Tada et al. | 714/747 |
| 2006/0017733 A1 * | 1/2006 | Matskewich et al. | 345/467 |

OTHER PUBLICATIONS

John L. Viescas, Running Microsoft Access for Windows 95 (Microsoft Press: 1996), pp. 111-113, 136, 186-187, 199-201, 204-206.

Microsoft Word Version 6.0 User's Guide (Microsoft Press: 1994), pp. 113-126, 169-201.

PostScript Language Reference Manual (Second Edition, Addison-Wesley: 1990), Chapter 5.

* cited by examiner

*Fig. 7*

FONT LINK TABLE (CLIENT COMPUTER)

| FONT ID NUMBER N | FONT NAME | INSTALL LOCATION | FILE NAME | NUMBER OF TIMES OF USE | NUMBER OF ENTERED CHARACTERS | NUMBER OF LINKS | LINKED RETRIEVAL KEY 1 | LINKED RETRIEVAL KEY 2 |
|---|---|---|---|---|---|---|---|---|
| 101 | *Fujl-mincho* | D:¥fonts | fmin.fon | 7120 | 615464 | 7 | *Mincho* | *Fude-oroshi 1* |
| 102 | *Fs-mincho* | D:¥fonts | fsmin.fon | 3263 | 302212 | 5 | *Mincho* | *Fude-oroshi 1* |
| 103 | *Fj-mincho* | URL 1 | fjmin.ttc | 120 | 2531 | 4 | *Mincho* | TITLE |
| 104 | *Fx-mincho* | D:¥fonts | fxmin.ttc | 1156 | 26325 | 3 | *Mincho* | TITLE |
| ... | ... | ... | ... | ... | ... | ... | ... | ... |
| 152 | *Fujl-gothic* | D:¥fonts | fgoth.fon | 6232 | 514353 | 8 | *Gothic* | *Fude-oroshi 3* |
| 153 | *Fs-gothic* | D:¥fonts | fsgoth.fon | 2152 | 202102 | 6 | *Gothic* | *Fude-oroshi 3* |
| 154 | *Fj-gothic* | URL 1 | fjgoth.ttc | 20 | 1024 | 5 | *Gothic* | TITLE |
| 155 | *Fx-gothic* | D:¥fonts | fxgoth.ttc | 983 | 21314 | 4 | *Gothic* | TITLE |
| ... | ... | ... | ... | ... | ... | ... | ... | ... |
| 161 | *Fujl-comic* | D:¥fonts | fcom.fon | 5104 | 412111 | 6 | *Comic* | *Fude-oroshi 5* |
| 162 | *Fs-comic* | D:¥fonts | fscom.fon | 2008 | 20031 | 5 | *Comic* | *Fude-oroshi 5* |
| 163 | *Fj-comic* | URL 1 | fjcom.ttc | 85 | 2058 | 6 | *Comic* | SUBHEAD |
| 164 | *Fx-comic* | URL 1 | fxcom.ttc | 1051 | 31315 | 6 | *Comic* | SUBHEAD |
| ... | ... | ... | ... | ... | ... | ... | ... | ... |

*Fig. 8*

FONT LINK TABLE (SERVER)

| FONT ID NUMBER N | FONT NAME | INSTALL LOCATION | FILE NAME | NUMBER OF TIMES OF USE | NUMBER OF ENTERED CHARACTERS | NUMBER OF LINKS | LINKED RETRIEVAL KEY 1 | LINKED RETRIEVAL KEY 2 |
|---|---|---|---|---|---|---|---|---|
| 301 | Fujl-mincho | C:¥fonts | fmin.fon | 28518 | 3615517 | 7 | Mincho | Fude-oroshi 1 |
| 302 | Fs-mincho | C:¥fonts | fsmin.fon | 12567 | 1200032 | 5 | Mincho | Fude-oroshi 1 |
| 303 | Fj-mincho | C:¥fonts | fjmin.ttc | 11523 | 1256433 | 4 | Mincho | TITLE |
| 304 | Fx-mincho | C:¥fonts | fxmin.ttc | 7952 | 894572 | 3 | Mincho | TITLE |
| ... | ... | ... | ... | ... | ... | ... | ... | ... |
| 352 | Fujl-gothic | C:¥fonts | fgoth.fon | 35729 | 4756789 | 8 | Gothic | Fude-oroshi 3 |
| 353 | Fs-gothic | C:¥fonts | fsgoth.fon | 26344 | 3645620 | 6 | Gothic | Fude-oroshi 3 |
| 354 | Fj-gothic | C:¥fonts | fjgoth.ttc | 14567 | 1763211 | 5 | Gothic | TITLE |
| 355 | Fx-gothic | C:¥fonts | fxgoth.ttc | 7944 | 578909 | 4 | Gothic | TITLE |
| ... | ... | ... | ... | ... | ... | ... | ... | ... |
| 361 | Fujl-comic | C:¥fonts | fcom.fon | 46857 | 5776894 | 6 | Comic | Fude-oroshi 5 |
| 362 | Fs-comic | C:¥fonts | fscom.fon | 34567 | 2489012 | 5 | Comic | Fude-oroshi 5 |
| 363 | Fj-comic | C:¥fonts | fjcom.ttc | 44123 | 3129054 | 6 | Comic | SUBHEAD |
| 364 | Fx-comic | C:¥fonts | fxcom.ttc | 55624 | 4567666 | 6 | Comic | SUBHEAD |
| ... | ... | ... | ... | ... | ... | ... | ... | ... |

Fig. 9

RETRIEVAL KEY LINK TABLE (CLIENT COMPUTER)

| RETRIEVAL KEY NUMBER M | RETRIEVAL KEY | LINKED FONT 1 | LINKED FONT 2 | LINKED FONT 3 | LINKED FONT 4 |
|---|---|---|---|---|---|
| 501 | Fude-oroshi 1 | Fuji-mincho | FS-mincho | FF-mincho | FJ-mincho |
| 502 | Fude-oroshi 2 | FF-mincho | FC-mincho | — | — |
| 503 | Fude-oroshi 3 | Fuji-gothic | FJ-gothic | FF-gothic | FJ-gothic |
| 504 | Fude-oroshi 4 | FF-mincho | FC-mincho | — | — |
| 505 | Fude-oroshi 5 | Fuji-comic | FS-comic | FJ-comic | — |
| 506 | Tome 1 | Fuji-mincho | FS-mincho | FF-mincho | FJ-mincho |
| 507 | Tome 2 | FF-mincho | FC-mincho | — | — |
| 508 | Tome 3 | Fuji-gothic | FS-gothic | FF-gothic | FJ-gothc |
| 509 | Tome 4 | FF-mincho | FC-mincho | — | — |
| 510 | Tome 5 | FF-comic | FS-comic | FJ-comic | — |
| ⋮ | ⋮ | ⋮ | ⋮ | ⋮ | ⋮ |
| 532 | Mincho | Fuji-mincho | FS-mincho | FJ-mincho | FX-mincho |
| ⋮ | ⋮ | ⋮ | ⋮ | ⋮ | ⋮ |
| 536 | Gothic | Fuji-gothic | FS-gothic | FJ-gothic | FX-gothic |
| 537 | Gothic | Fuji-comic | FS-comic | FJ-comic | FX-comic |
| ⋮ | ⋮ | ⋮ | ⋮ | ⋮ | ⋮ |
| 539 | ORTICLE | Fuji-mincho | FS-mincho | FJ-mincho | — |
| 540 | REPORT | Fuji-mincho | FS-mincho | FJ-mincho | FX-mincho |
| ⋮ | ⋮ | ⋮ | ⋮ | ⋮ | ⋮ |
| 547 | TITLE | FJ-mincho | FX-mincho | FJ-gothic | — |
| 548 | TEXT | Fuji-mincho | FS-mincho | FJ-mincho | — |
| ⋮ | ⋮ | ⋮ | ⋮ | ⋮ | ⋮ |

*Fig. 10*

RETRIEVAL KEY LINK TABLE (SERVER)

| RETRIEVAL KEY NUMBER M | RETRIEVAL KEY | LINKED FONT 1 | LINKED FONT 2 | LINKED FONT 3 | LINKED FONT 4 |
|---|---|---|---|---|---|
| 701 | Fude-oroshi 1 | Fuji-mincho | FS-mincho | FF-mincho | FJ-mincho |
| 702 | Fude-oroshi 2 | FF-mincho | FC-mincho | — | — |
| 703 | Fude-oroshi 3 | Fuji-gothic | FJ-gothic | FF-gothic | FJ-gothic |
| 704 | Fude-oroshi 4 | FF-mincho | FC-mincho | — | — |
| 705 | Fude-oroshi 5 | Fuji-comic | FS-comic | FJ-comic | — |
| 706 | Tome 1 | Fuji-mincho | FS-mincho | FF-mincho | FJ-mincho |
| 707 | Tome 2 | FF-mincho | FC-mincho | — | — |
| 708 | Tome 3 | Fuji-gothic | FS-gothic | FF-gothic | FJ-gothc |
| 709 | Tome 4 | FF-mincho | FC-mincho | — | — |
| 710 | Tome 5 | FF-comic | FS-comic | FJ-comic | — |
| ⋮ | ⋮ | ⋮ | ⋮ | ⋮ | ⋮ |
| 732 | Mincho | Fuji-mincho | FS-mincho | FJ-mincho | FX-mincho |
| ⋮ | ⋮ | ⋮ | ⋮ | ⋮ | ⋮ |
| 736 | Gothic | Fuji-gothic | FS-gothic | FJ-gothic | FX-gothic |
| 737 | Gothic | Fuji-comic | FS-comic | FJ-comic | FX-comic |
| ⋮ | ⋮ | ⋮ | ⋮ | ⋮ | ⋮ |
| 739 | ORTICLE | Fuji-mincho | FS-mincho | FJ-mincho | FX-mincho |
| 740 | REPORT | Fuji-mincho | FS-mincho | FJ-mincho | FX-mincho |
| ⋮ | ⋮ | ⋮ | ⋮ | ⋮ | ⋮ |
| 747 | TITLE | FJ-mincho | FX-mincho | FJ-gothic | FX-gothic |
| 748 | TEXT | Fuji-mincho | FS-mincho | FJ-mincho | FX-mincho |
| ⋮ | ⋮ | ⋮ | ⋮ | ⋮ | ⋮ |

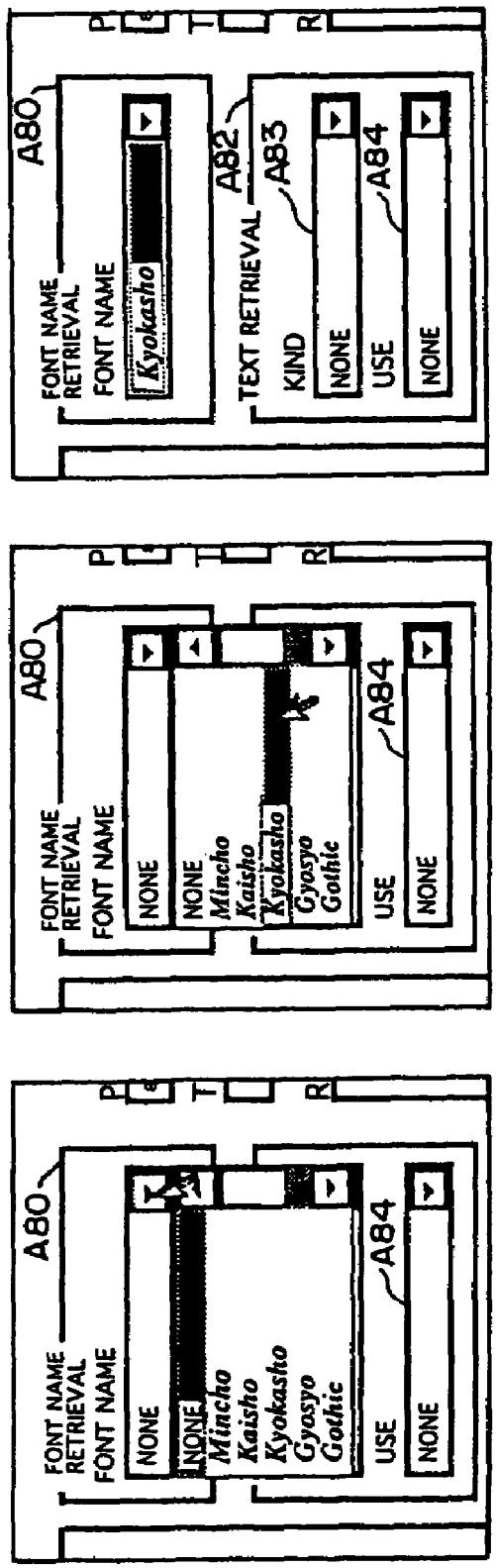

Fig. 16a Fig. 16b Fig. 16c Fig. 16d Fig. 16e Fig. 16f

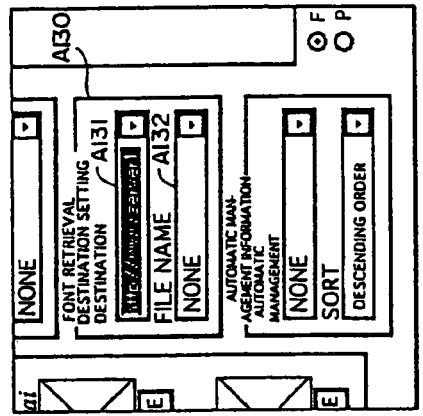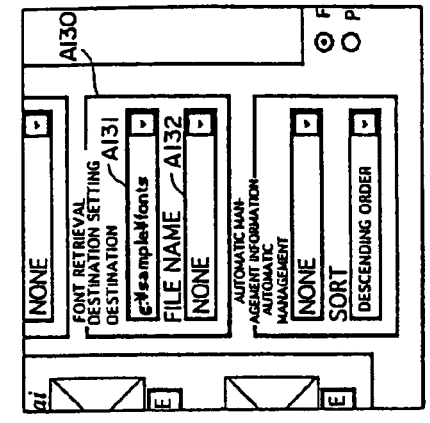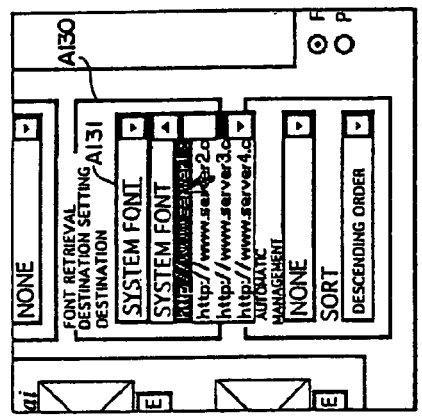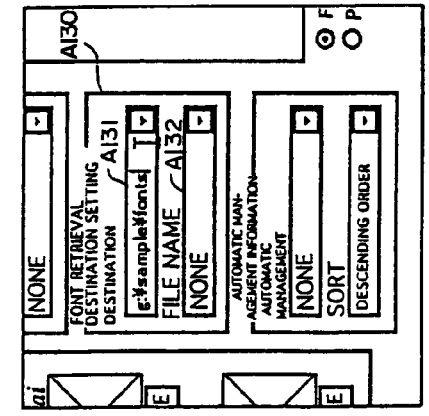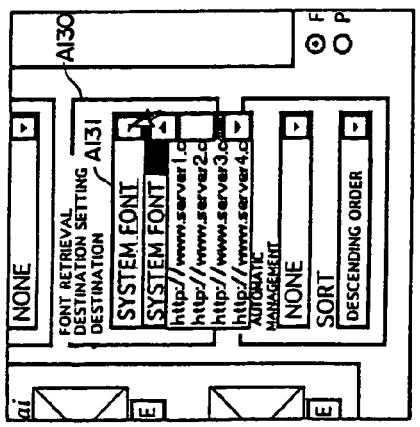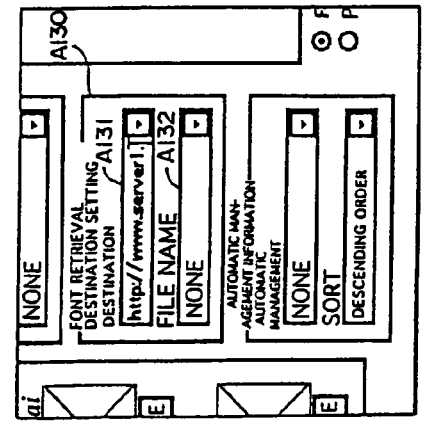

Fig. 52

| | TEXT BEING ENTERD | OPERATION |
|---|---|---|
| FIRST STEP | 今は晴れですが、 | |
| SECOND STEP | 今は晴れですが、すぐにくもるでしょう | PRESS *Kanji* SELECTION KEY TO CONVERT *Kanji* |
| THIRD STEP | 今は晴れですが、すぐにくもるでしょう | PRESS *Kanji* DETERMINATION KEY TO DETERMINE *Kanji* |
| FOURTH STEP | 今は晴れですが、すぐに曇るでしょう | PRESS FOTN CONVERSION KEY TO CONVERT FONT |
| FIFTH STEP | 今は晴れですが、すぐに曇るでしょう | PRESS FONT DETERMINATION KEY TO DETERMINE FONT |
| SIXTH STEP | 今は晴れですが、すぐに曇るでしょう | |

FONT RETRIEVAL APPARATUS AND METHOD

The present Application is a Divisional Application of U.S. patent application Ser. No. 09/348,209, filed on Jul. 8, 1999 now U.S. Pat. No. 6,687,879.

BACKGROUND OF THE INVENTION

1. Field of the Invention

The present invention relates to a font retrieval apparatus, a font retrieval method, and a recording medium storing a program for font retrieval, a display device for previewing a font, a display method of previewing a font, and a recording medium storing a program for font preview, a character entry device, a character entry method, and a recording medium storing a program for character entry, and a font data link device and a font data link method.

2. Description of the Prior Art

When a font of a character or a sign is selected, a list of selectable font names has been conventionally displayed. The name of the font to be used is selected out of the font names whose list is displayed. A user must memorize a correspondence between a font name and a font represented by the font name.

When the number of selectable font names is small, a correspondence between a font name and a font specified by the font name in the mind of the user is simple. Therefore, it is possible to accurately select the name of a font to be used.

However, the larger the number of font names whose list is displayed is, the more difficult a correspondence between a font name and a font represented by the font name is to memorize. It is difficult to accurately select a font the user desires to use.

SUMMARY OF THE INVENTION

An object of the present invention is to make it possible to efficiently retrieve a font.

A font retrieval apparatus according to the first invention is characterized by comprising a display device displaying a plurality of partial images which represent a characterizing portion of a character with a plurality of different fonts, a partial image selecting device selecting at least one of the partial images displayed on the display device, and a font output device outputting data representing the font corresponding to the partial image selected by the partial image selecting device.

The first invention also provides a method suitable for the above-mentioned apparatus. That is, the method comprises the steps of displaying a plurality of partial images which represent a characterizing portion of a character with a plurality of different fonts, selecting at least one of the displayed partial images, and outputting data representing the font corresponding to the selected partial image.

Furthermore, the first invention also provides a recording medium storing a program for controlling a computer for the purpose of the above-mentioned font retrieval.

According to the first invention, a list of partial images (Tome, Hane, Harai, Fude-oroshi, or the like) of a character (a character such as an alphabetic character, a Hiragana character, a Katakana character, a Kanji character or a numeric character, a sign, etc.) is displayed on a display screen.

A user selects, from the displayed partial images, the partial image represented by the font to be used. On the basis of the selected partial image, the corresponding font is retrieved out of the fonts and outputted.

It is possible to find by retrieval the font to be used from the displayed partial images. A font name need not be memorized in correspondence with a font. Therefore, a desired font can be found.

It is preferable that at least one of a plurality of characterizing portions of the character is selected, and the plurality of partial images of the selected characterizing portion is displayed. The partial images corresponding to the plurality of fonts of a desired portion of a character is displayed.

A font retrieval apparatus according to the second invention is characterized by comprising a storage device storing relationship between a plurality of fonts and a plurality modes of a text (writing) corresponding to the font or fonts, a mode selecting device selecting at least one of the modes stored in the storage device, and a font output-device outputting a font corresponding to the mode selected by the mode selecting device.

The second invention also provides a method suitable for the above-mentioned apparatus. That is, the method comprises the steps storing relationship between a plurality of fonts and a plurality modes of a text (writing) corresponding to the font or fonts, selecting at least one of the stored modes, and outputting a font corresponding to the selected mode.

Furthermore, the second invention also provides a recording medium storing a program for the above-mentioned font retrieval.

In one embodiment of the second invention, the mode of the text (writing) is a kind of text (writing).

According to the second invention, kinds (Article, Report, Letter, Advertisement, Leaflet, Magazine, Manual, etc.) of the text are previously stored in correspondence with the font or fonts. When the kind of the text is designated by the user, the font or the fonts are outputted in accordance with the designated kind of the text.

A font suitable for the kind of the text is found by retrieval without being designated.

In another embodiment, the mode of the text is the use of a passage, sentence, phrase or clause (text) in a document or a writing.

Uses (Title, Text, Emphasis, Note, Headline, Subhead, Comment, Itemization, etc.) of the text are previously stored in correspondence with the fonts, to cause the user to designate the use of the text. A font suitable for the use for the text is found by retrieval in accordance with the designated use for the text.

A font retrieval apparatus according to the third invention is characterized by comprising a storage device storing relationship between a plurality of main fonts and a plurality sub-fonts corresponding to the main font or main fonts, a main font selecting device selecting at least one of the main fonts stored in the storage device, and a font output device outputting a sub-font corresponding to the main font selected by said main font selecting device.

The third invention also provides a method suitable for the above-mentioned apparatus. That is, the method comprising the steps of storing relationship between a plurality of main fonts and a plurality sub-fonts corresponding to the main font or main fonts, selecting at least one of the stored main fonts, and outputting a sub-font corresponding to the selected main font.

Furthermore, the third invention also provides a recording medium storing a program for the above-mentioned font retrieval.

According to the third invention, a main font (Mincho, Gothic, etc) is classified into sub-fonts (Mincho 1, Mincho 2, Mincho 3, Gothic 1, Gothic 2, Gothic 3, etc.).

When a main font is designated, sub-fonts which are included in the designated main font are retrieved out of the stored sub-fonts.

The user can relatively simply find, even if he or she does not know the names of the sub-fonts, the sub-fonts to be used if the user memorizes the name of the main font.

A font retrieval apparatus according to the fourth invention is characterized by comprising a storage device storing relationship between a plurality of fonts and a plurality kinds of retrieval keys classified into a plurality of groups, the retrieval key being associated with the font or fonts, a display device displaying a plurality of retrieval keys for each group, a retrieval key selecting device selecting at least one of keys with respect to at least one group, and a font output device retrieving and outputting a font associated with the retrieval key selected by the retrieval key selecting device.

The fourth invention also provides a method suitable for the above-mentioned apparatus. That is, the method comprises the steps of storing relationship between a plurality of fonts and a plurality kinds of retrieval keys classified into a plurality of groups, the retrieval key being associated with the font or fonts, displaying a plurality of retrieval keys for each group, selecting at least one of keys with respect to at least one group, and retrieving and outputting a font associated with the selected retrieval key.

The fourth invention also provides a recording medium storing a program for the above-mentioned font retrieval.

In a preferred embodiment, when a plurality of retrieval keys are selected by said retrieval key selecting device, a font which is associated with all of the selected retrieval keys is retrieved.

In one embodiment of the fourth invention, the groups of the retrieval keys are at least two groups selected from a group or groups defined by a partial image of a characterizing portion of a character, a group or groups defined by a mode of a text, and a group defined by a main font, which are described above.

According to the fourth invention, previously stored for each font is a retrieval key (or keys) representing the feature of the font (kinds of or uses for a sentence or a document or text, partial images of portions of a character, etc.). The font is retrieved on the basis of the retrieval key. It is possible to find the font on the basis of the retrieval key.

It is preferable that a list of the results of retrieval is displayed by fonts found by the retrieval. The fonts found by the list display can be perceived with the user's eye.

In another embodiment of the invention, the storage device stores data representing a number relating to a font in correlation with each font, and the font output device outputs the selected fonts in the order which is represented by the numbers corresponding to the retrieved fonts.

The number may be the number of the retrieval keys associated with the font. The number may be the number of characters entered with the font. Further, the number may be the number of times of use of the font.

The larger the number of retrieval keys associated with a font is, the larger the number of times of use of a font is, and the larger the number of characters entered with a font is, the higher the frequency of use of the font by the user is. The user can find a font whose frequency of use is high without previously memorizing the name of the font.

The fifth invention is directed to a display device for previewing, in order to confirm a font of a character to be entered, the font, characterized by comprising font selection means for selecting at least one of a plurality of fonts, character entry means for entering a character, and preview control means for previewing the character entered from the character entry means on a display screen by the font selected by the font selection means.

The fifth invention also provides a method suitable for the above-mentioned device. That is, in a display device for previewing, in order to confirm a font of a character to be entered, the font, the method comprises the steps of selecting at least one of a plurality of fonts, entering a character, and previewing the entered character on a display screen by the selected font.

The fifth invention also provides a recording medium storing a program for the above-mentioned preview.

According to the fifth invention, at least one of the plurality of fonts is selected. The character is entered from the character entry means. The character entered from the character entry means is previewed by the selected font.

The character actually used can be confirmed by the font to be used.

In a display device for previewing, in order to confirm a font of a character to be entered, the font, a display device according to the sixth invention is characterized by comprising font selection means for selecting a first font and a second font, first preview control means for previewing a character having the first font selected by the font selection means in a first display area on a display screen, and second preview control means for previewing a character having the second font selected by the font selection means in a second display area different from the first display area on the display screen.

The sixth invention also provides a method suitable for the above-mentioned device. That is, in a display device for previewing, in order to confirm a font of a character to be entered, the font, the method comprises the steps of selecting a first font and a second font, previewing a character having the selected first font in a first display area on a display screen, and previewing the character having the selected second font in a second display area different from the first display area on the display screen.

The sixth invention also provides a recording medium storing a program for the above-mentioned selected font preview.

According to the sixth invention, the first font and the second font are selected. The character having the font selected by the first font selection is displayed in the first preview area. The character having the font selected by the second font selection is displayed in the second preview area.

Since the first preview area and the second preview area exist in the different areas on the display screen, the character having the font selected by the first font selection and the character having the font selected by the second font selection can be compared with each other upon being simultaneously displayed. The desired font can be selected while seeing the characters.

In a display device for previewing, in order to confirm a font of a character to be entered, the font, a display device according to the seventh invention is characterized by comprising font list instruction entry means for entering a font list instruction, and list preview control means for previewing, on the basis of the font list instruction entered from the font list instruction entry means, a list of characters by fonts which can be previewed.

The seventh invention also provides a method suitable for the above-mentioned device. That is, in a display device for previewing, in order to confirm a font of a character to be entered, the font, the method comprises the steps of entering a font list instruction, and previewing, on the basis of the entered font list instruction, a list of characters by fonts which can be previewed.

The seventh invention also provides a recording medium storing a program for the above-mentioned preview.

According to the seventh invention, when the font list instruction is entered, the list of the characters is displayed by the fonts which can be previewed. Therefore, the font to be used can be determined while seeing the list.

Desired characters may be entered, and a list of the entered characters may be displayed by fonts which can be previewed. A list of the desired characters is displayed by the fonts which can be previewed.

In a character entry device comprising character entry means for entering a character and display control means for displaying the character entered from the character entry means on a display screen of a display device, a character entry device according to the eighth invention is characterized by comprising font display priority storage means storing the priority for displaying fonts, first entered character display control means for displaying the character entered from the character entry means on the display screen of the display device in accordance with the priority stored in the display priority storage means, font conversion instruction entry means for entering a font conversion instruction, and second entered character display control means for displaying, every time the font conversion instruction is entered from the font conversion instruction entry means, the character entered from the character entry means by the different font on the basis of the priority stored in the font display priority storage means.

The eighth invention also provides a method suitable for the above-mentioned device. That is, in a character entry device comprising character entry means for entering a character and display control means for displaying the character entered from the character entry means on a display screen of a display device, the method comprises the steps of storing the priority for displaying fonts, displaying the entered character on the display screen of the display device in accordance with the stored priority, entering a font conversion instruction, and displaying, every time the font conversion instruction is entered, the entered character by the different font on the basis of the stored priority.

The eighth invention also provides a recording medium storing a program for the above-mentioned font preview.

According to the eighth invention, the priority for displaying the fonts is stored. When the character is entered, the entered character is displayed on the display screen by the font determined by the priority. When the font conversion instruction is entered, the font is converted in accordance with the priority, and the character is displayed by the converted font. The font can be changed into a desired font even while the character is being entered.

By entering the font determination instruction, the font is determined.

It is preferable that the stored priority for displaying the fonts can be changed. The priority can be changed into a priority desired by the user.

A font data link device according to the ninth invention is characterized by comprising font data storage means storing font data for displaying characters, retrieval key entry means for entering a retrieval key relating the feature of a font, and link means for linking the font data stored in the font data storage means and the retrieval key entered from the retrieval key entry means.

The ninth invention also provides a method suitable for the above-mentioned device. That is, the method comprises the steps of storing font data for displaying characters, entering a retrieval key relating the feature of a font, and linking the stored font data and the entered retrieval key.

According to the ninth invention, it is possible to link the font data and the retrieval key.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates an example of a font link table stored in the client computer;
FIG. 8 illustrates an example of a font link table stored in the server;
FIG. 9 illustrates an example of a retrieval key link table stored in the client computer;
FIG. 10 illustrates an example of a retrieval key link table stored in the server;
FIGS. 15a to 17f illustrate a part of the font selection window;
FIGS. 48a to 49c illustrate a part of the font selection window;
FIG. 52 illustrates a text which is being entered and operations at that time.

DESCRIPTION OF THE PREFERRED EMBODIMENTS (1) Outline of Font Retrieval System

Figure 1:
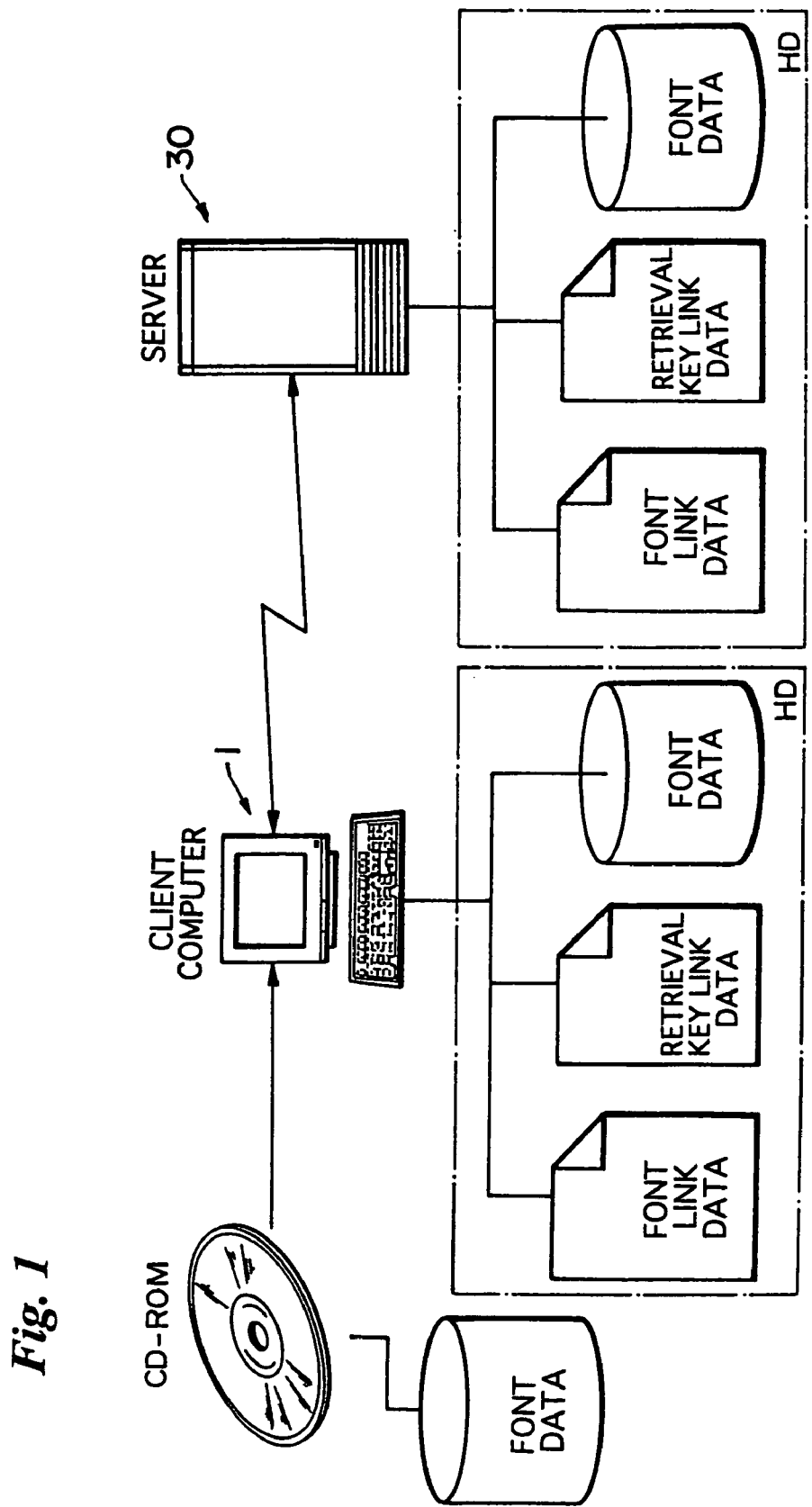
FIG. 1 illustrates the outline of a font retrieval system.

FIG. 1 illustrates the configuration of a font retrieval system according to the present embodiment.

The font retrieval system comprises a client computer 1 and a server 30 which can establish data communication with each other through a network. From a CD-ROM storing a program or the like for font retrieval, the program or the like is installed in the client computer 1. Consequently, the client computer 1 can perform font retrieval.

Figure 2:
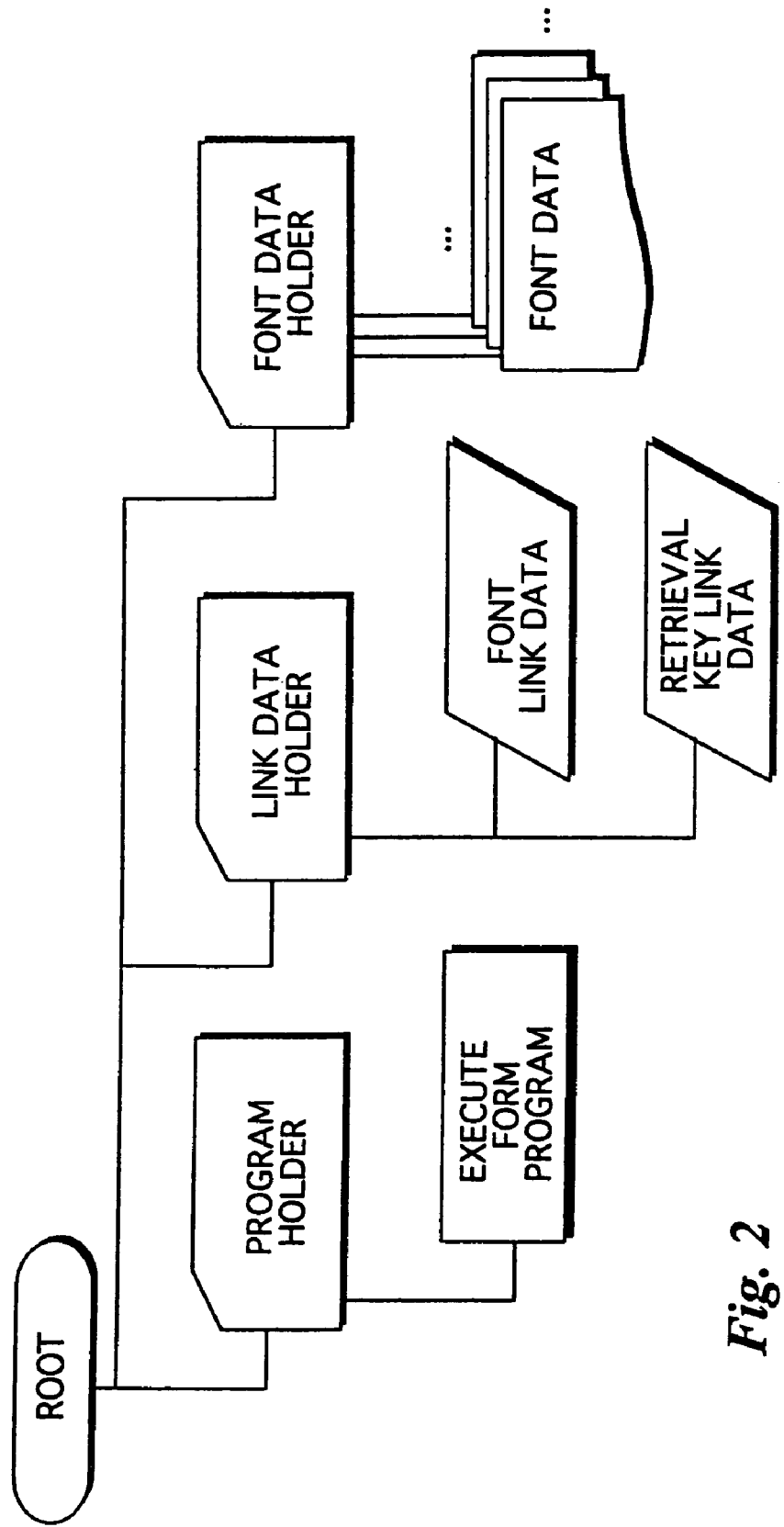
FIG. 2 illustrates the structure of a file stored in a client computer.

FIG. 2 illustrates the structure of a file in the CD-ROM. The CD-ROM includes a program holder storing an execute form program (execution program) (a font retrieval program), a link data holder storing font link data (a font link table) and retrieval key link data (retrieval key link table), and a font data holder storing font data for various kinds of fonts (sub-fonts) described later. The font retrieval program may be composed of not only one program but also a plurality of programs.

The CD-ROM having the file structure shown in FIG. 2 is installed in the client computer 1, so that the font retrieval program, the font link data (table), the retrieval key link data (table), and the font data for various fonts are stored in a hard disk HD of the client computer 1. Similarly, the font retrieval program, the font link data (table), the retrieval key link data (table), and the font data for various fonts are also stored in a hard disk HD of the server 30. These data may be transmitted from the client computer 1 to the server 30, or installed in the hard disk HD of the server 30 from the CD-ROM.

Figure 3:
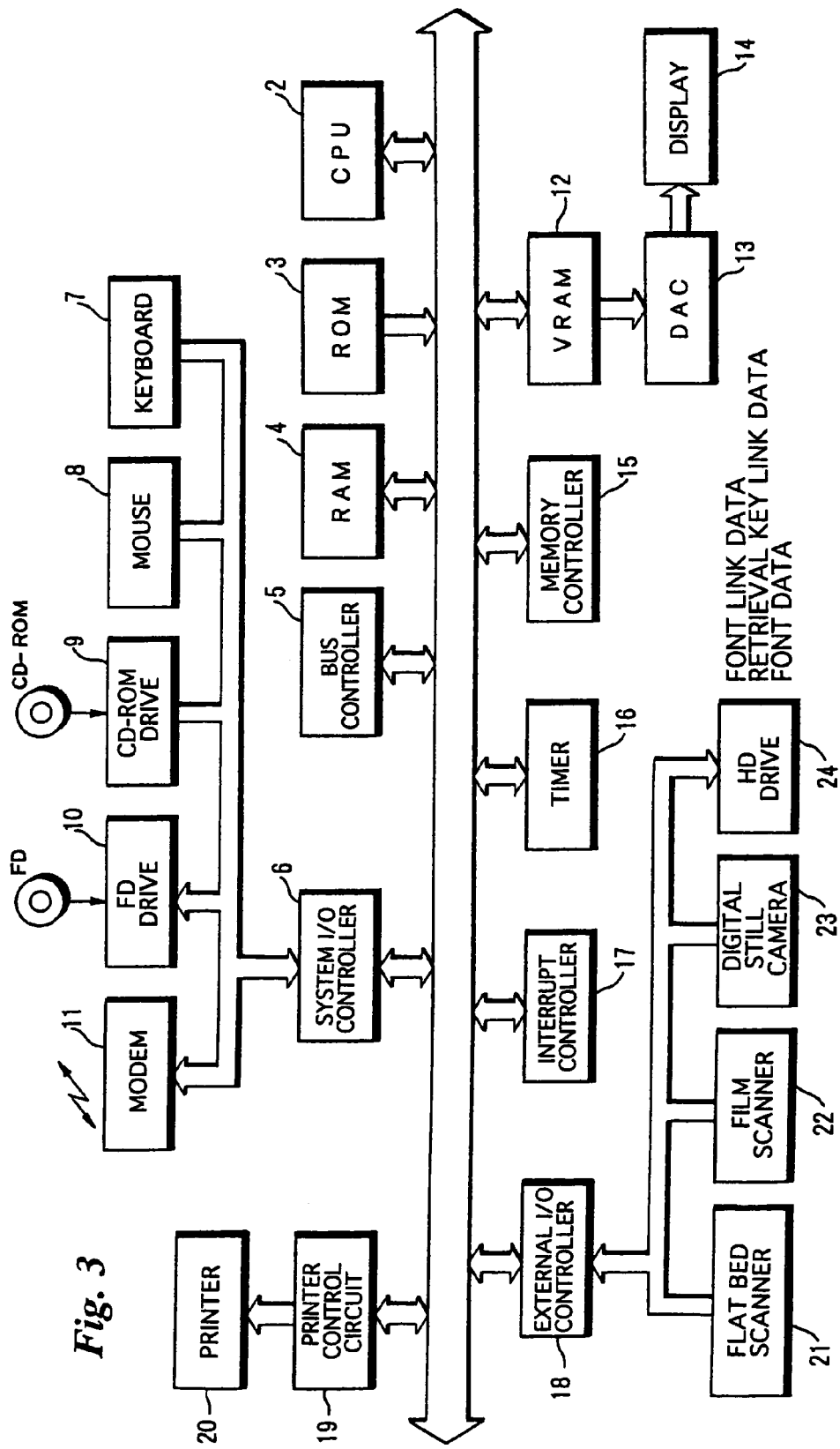
FIG. 3 illustrates the electrical configuration of the client computer.

FIG. 3 is a block diagram showing the electrical configuration of the client computer 1.

The overall operation of the client computer 1 is supervised by a CPU 2.

The client computer 1 comprises a ROM 3, a RAM 4 temporarily storing data, a VRAM 12 used for displaying an image on a display device 14, and a memory controller 15 for controlling reading of data from the ROM 3 and writing and reading of data to and from the RAM 4 and VRAM 12. Image data read out of the VRAM 12 is fed to a DA (Digital-to-Analog) converter 13. Accordingly, the image data is converted into an analog video signal, and the image is displayed on the display device 14 based on the along video signal.

A bus controller 5, a memory controller 15, and a timer 16 are connected to the client computer 1.

Furthermore, a system I/O controller 6 is connected to the client computer 1. Connected to the system I/O controller 6 are a keyboard 7 and a mouse 8 for receiving an operation instruction from a user of the client computer 1, a CD-ROM drive 9 for reading the programs or the like from the CD-ROM having the file structure shown in FIG. 2, and an FD drive 10 for reading from or writing to a floppy disk (FD) ROM, and a modem 11 for connection to the Internet.

An external I/O controller 18 is connected to the client computer 1. A flat bed scanner 21, a film scanner 22, a digital still camera 23, and an HD drive 24 are connected to the external I/O controller 18. The font retrieval program and the other data are read by the CD-ROM drive 9 from the CD-ROM and are stored in the HD by the HD drive 24. The font retrieval program and the other data are read out of the HD, to and from which data is writable and readable, by the HD drive 24.

Furthermore, a printer 20 for printing an image, characters or a text and a printer control circuit 19 for controlling the printer 20 are further connected to the client computer 1.

Figure 4:
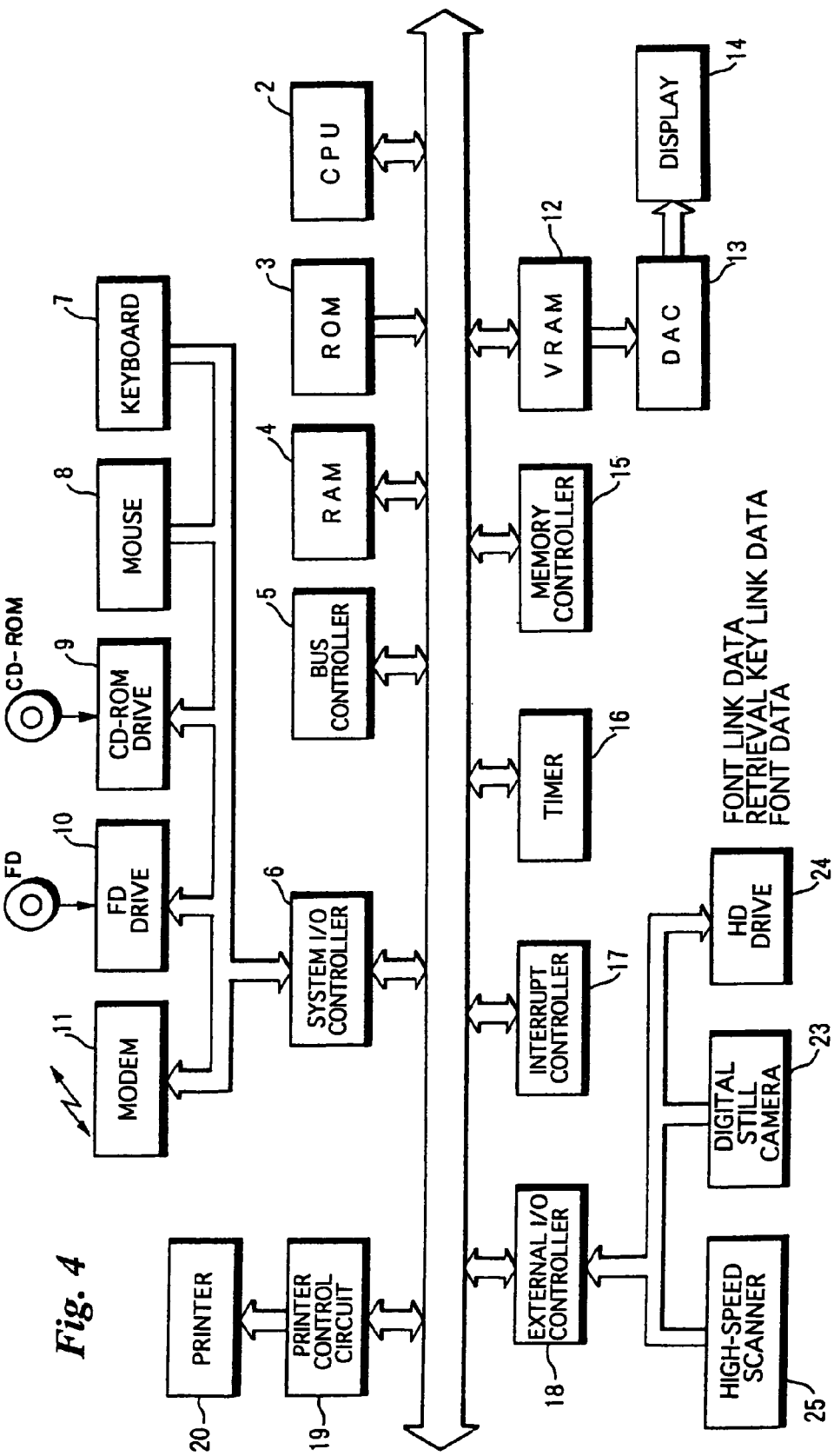
FIG. 4 illustrates the electrical configuration of a server.

FIG. 4 is a block diagram showing the electrical configuration of the server 30. In FIG. 4, the same components as those shown in FIG. 3 are assigned the same reference numerals and hence, the description thereof is not repeated. In the server 30, a high-speed film scanner 25 is connected in place of the flat bed scanner 21 connected to the client computer 1.

In this embodiment, there are a plurality of main fonts such as "Mincho", "Kaisho", "Kyokasho", "Gyosho", "Gothic", "Maru-gothic", "Comic" and "Hop". Each main font includes a plurality of sub-fonts. For example, the main font Mincho includes such sub-fonts as "Fuji-mincho", "FS-mincho", "FJ-mincho" and "Fx-mincho". Gothic includes "Fuji-gothic", "FS-gothic", "FJ-gothic" and "Fx-gothic". The font retrieval is a processing to finally find one or a plurality of sub-font(s) which conform(s) to or match(es) with a given font retrieval key(s).

Figure 5:
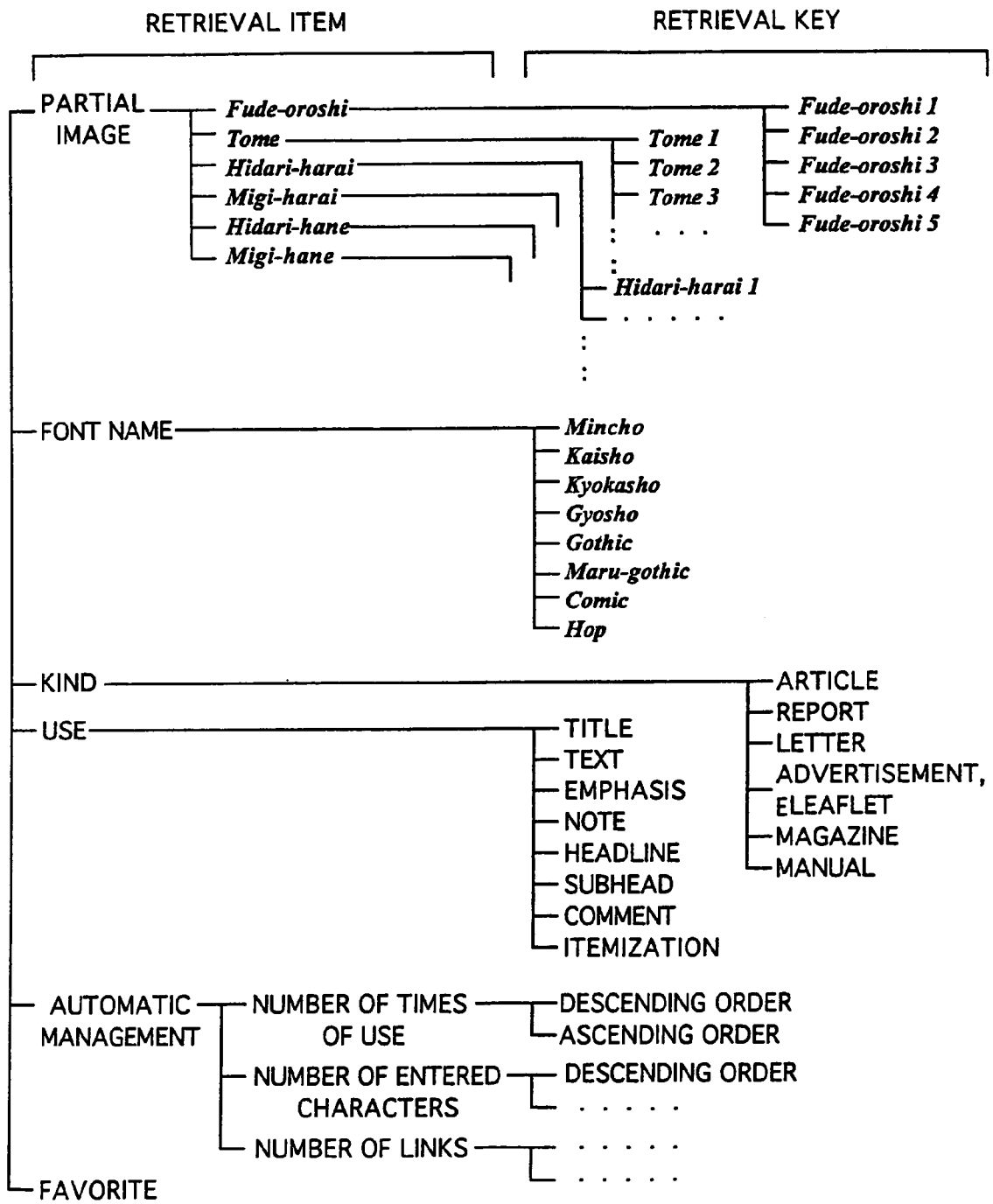
FIG. 5 illustrates the relationship between a retrieval item and a retrieval key.

FIG. 5 illustrates the relationship between a retrieval item and a retrieval key.

In the font retrieval system according to the present embodiment, retrieval keys are determined for each retrieval item. The retrieval key(s) is(are) entered, to find a font(s) conforming to the entered retrieval key(s).

The retrieval items include partial image retrieval, font name retrieval, kind (of text) retrieval, use (of text) retrieval, automatic management retrieval, and favorite retrieval.

The partial image retrieval is for designating an image representing a portion (a part) (a partial image) constituting a character to find a font (a sub-font) from the designated partial image. In the partial image retrieval, "Fude-oroshi", "Tome", "Hidari-harai", "Migi-harai", "Hidari-hane" and "Migi-hane" are set as the retrieval items, i.e., as the portions (parts of) (partial image of) the character (especially, a Chinese character=Kanji).

A user selects one or a plurality of desired retrieval item(s) out of the portions (partial images) "Fude-oroshi", "Tome", "Hidari-harai", "Migi-harai", "Hidari-hane" and "Migi-hane". The portions (partial images) "Fude-oroshi", "Tome", "Hidari-harai", "Migi-harai", "Hidari-hane" and "Migi-hane" respectively represent the ways of writing the portions constituting the character (Chinese character), as shown in FIGS. 43 to 46.

Figure 6:
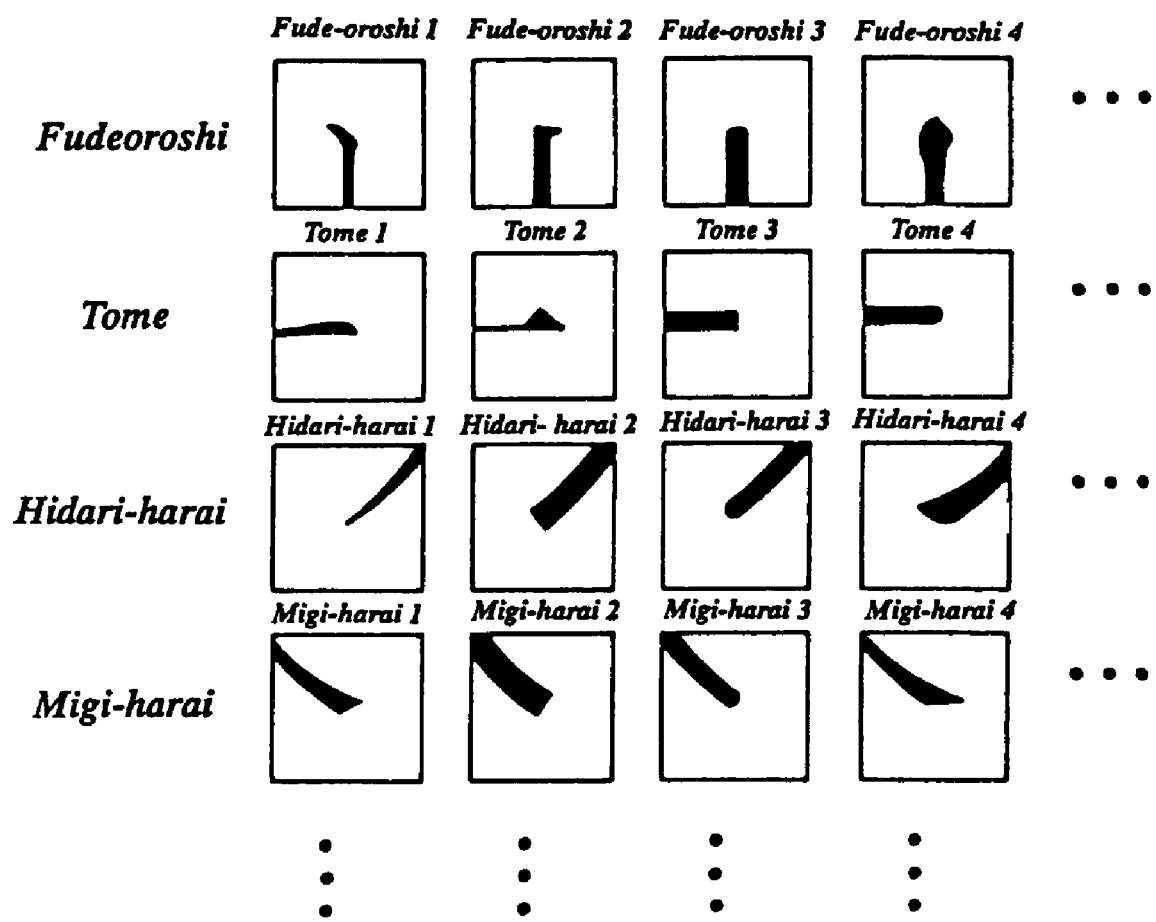
FIG. 6 illustrates an example of a partial image.

As shown in FIG. 6, a plurality of portions having different shapes which are respectively represented by a plurality of fonts (a plurality kinds of sub-fonts) are set as retrieval keys for each of the retrieval items, i.e., "Fude-oroshi", "Tome", "Hidari-harai", "Migi-harai", "Hidari-hane" and "Migi-hane". For example, Fude-oroshi 1, Fude-oroshi 2, Fude-oroshi 3, Fude-oroshi 4 and so on are set as retrieval keys for the retrieval item "Fude-oroshi", Tome 1, Tome 2, Tome 3, Tome 4 and so on are set as retrieval keys for the retrieval item "Tome". The user designates one or a plurality of the retrieval keys.

As to the font name retrieval, various main font names such as "Mincho", "Kaisho", "Kyokasho", "Gyosho", "Gothic", "Maru-gothic", "Comic" and "Hop" are set as retrieval keys. The user designates one of the retrieval keys.

As to the kind-of-text retrieval (kind retrieval), a kind of the sentence or text which is entered by the user is used as a retrieval key. The kinds for the sentence include "Article", "Report", "Letter", "Advertisement or Leaflet", "Magazine", "Manual", etc. The user designates one of the retrieval keys.

As to the use-of-text retrieval (use retrieval), uses for the sentence clause or phrase or text in one document are used as retrieval keys. The uses for the sentence (text) in one document, for example, "Title", "Text", "Emphasis", "Note", "Headline", "Subhead", "Comment" and "Itemization" are designated as retrieval keys.

The kind (of text) retrieval and the user (of text) retrieval are altogether referred as a text retrieval.

The automatic management retrieval includes retrieval based on the number of times of use, retrieval based on the number of entered characters, and retrieval based on the number of links.

The retrieval based on the number of times of use is for retrieving a font on the basis of the number of times of use of the font (sub-font). Examples include descending order retrieval for retrieving fonts in descending order of the numbers of times of use of the fonts and ascending order retrieval for retrieving fonts in ascending order of the numbers of times of use of the fonts. The descending order and the ascending order are kinds of the retrieval keys. The retrieval based on the number of entered characters is for retrieving, for each type of font (sub-font), the font on the basis of the number of characters entered with the font. The retrieval based on the number of links is for retrieving a font on the basis of the number of retrieval keys linked to the font (the number of retrieval keys related to the font). The descending order and the ascending order are used as the retrieval keys in the retrieval based on the number of entered characters and in the retrieval based on the number of links.

The favorite retrieval is for previously registering user's favorite fonts and retrieving a font on the basis of the registration.

FIG. 7 illustrates an example of a font link table (font link data) stored in the HD of the client computer 1. An unique font ID (Identification) number N is assigned, to each font (sub-font). Stored in the font link table in correlation with the font ID number N are the font name, the install location where the font data is stored, the file name of the font data, the number of times of use of the font, the number of characters entered with the font, the number of the retrieval keys (number of links) and the retrieval keys (which may be represented by a retrieval key numbers described later) linked to (associated with) the font. With regard to the font data stored in the HD of the client computer 1, the install location is represented by a path (file name), and with regard to the font data stored in the HD of the server 30, the install location is represented by a URL (Uniform Resource Locator).

FIG. 8 illustrates an example of a font link table (font link data) stored in the HD of the server 30. The items included in the table are the same as those shown in FIG. 7.

FIG. 9 illustrates an example of a retrieval key link table (retrieval key link data) stored in the HD of the client computer 1. FIG. 10 shows an example of a retrieval key link table stored in the HD of the server 30.

The retrieval key link table is used for finding a font or fonts (sub-font(s)) using the above mentioned retrieval keys (exclusive of the descending order and the ascending order) and relates the retrieval key to the fonts (sub-fonts) associated with (linked to) the retrieval key. A unique retrieval key (ID) number M is assigned to the retrieval key. Stored in the retrieval key link table, in correspondence with the retrieval key number M, are the retrieval key (name) and the sub-font names (which may be represented by the font ID number) (linked fonts) linked to the retrieval key.

(2) Setting (Entering) of Retrieval Key

Figure 11:
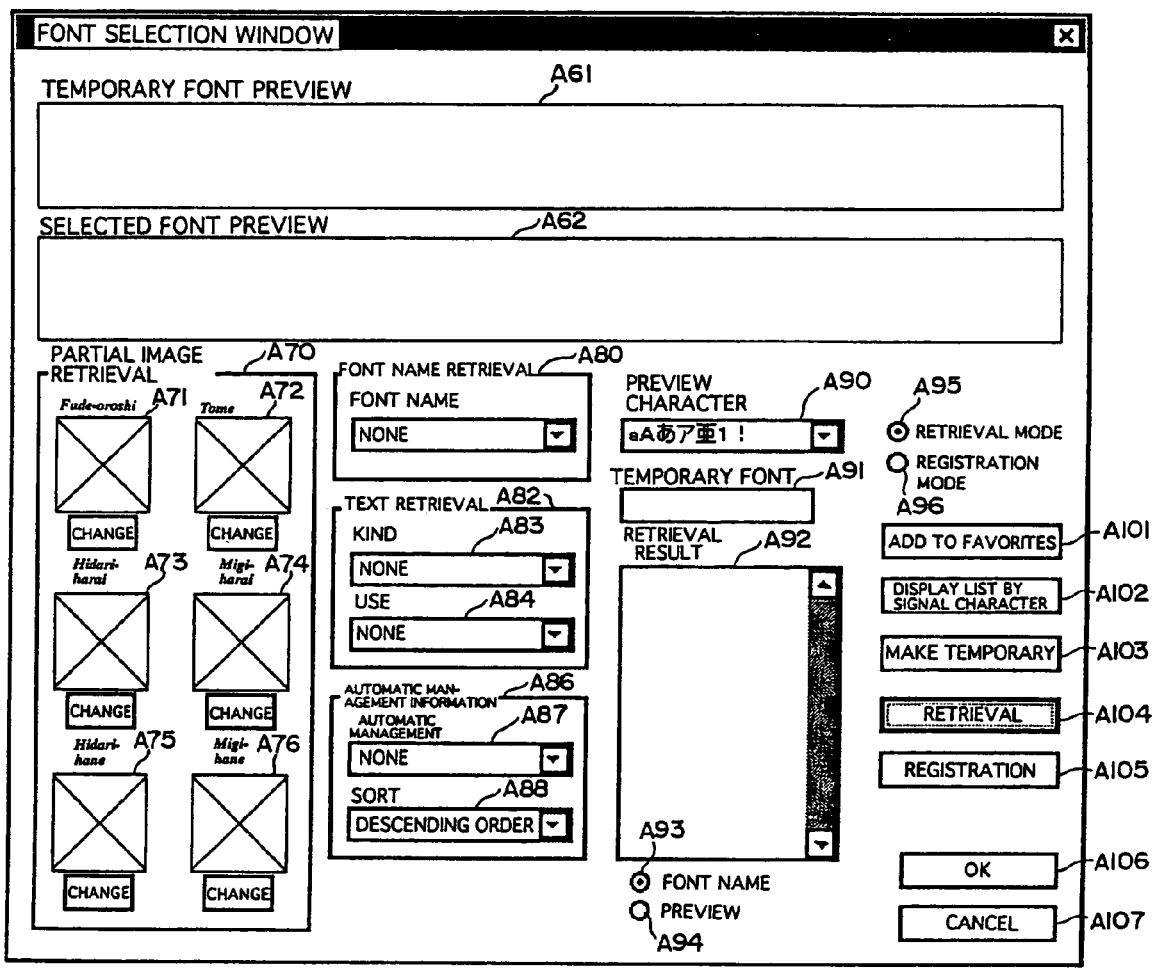
FIGS. 11 to 14 illustrate an example of a font selection window.

FIG. 11 illustrates an example of a font selection (retrieval) window displayed on a display screen of the display device 14 in the client computer 1 when a font is selected (found and determined) by font retrieval.

The font selection window includes the following areas:

Temporary Font Preview Area A61;

The temporary font preview area A61 is an area where a font (a character represented by a font) is temporarily previewed for comparison by the user clicking a temporary setting (make temporary) area A103, as described later.

Selected Font Preview Area A62;

The selected font preview area A62 is an area where a selected font (the character represented by the selected font) is previewed.

Partial Image Retrieval Area A70;

The partial image retrieval area A70 is an area where an partial image is entered as the retrieval key in the partial image retrieval, as described above. The area A70 includes an area A71 where the partial image of "Fude-oroshi" is displayed, an area A72 where the partial image of "Tome" is displayed, an area A73 where the partial image of "Hidari-harai" is displayed, an area A74 where the partial image of "Migi-harai" is displayed, an area A75 where the partial image of "Hidari-hane" is displayed, and an area A76 where the partial image of "Migi-hane" is displayed. A partial image of a character which has been selected is displayed in these areas A71-A76. The areas A71-A76 are accompanied by buttons "CHANGE" for displaying a partial image list window described later.

Font Name Retrieval Area A80;

The font name retrieval area A80 is an area where a main font name is designated. Sub-fonts included in the designated main font are retrieved.

Text Retrieval Area A82;

The text retrieval area A82 is an area where a kind of text and a use of text is set. The area A82 includes a kind retrieval setting area A83 and a use retrieval setting area A84. A kind (Article, Report, etc.) of a sentence or a text to be entered (or having been entered) is set in the kind retrieval setting area A83. A use (Title, Text, etc.) for the sentence or the text in one document is set in the use retrieval setting area A84.

Automatic Management Information Area A86;

The automatic management information area A86 is an area for setting such that font retrieval is performed on the basis of automatic management information. The area A86 includes an automatic management area A87 and a sort area A88. The automatic management area A87 is an area where it is determined which of retrieval items, that is, the number of times of use, the number of entered characters, and the number of links forms the basis of font retrieval. The sort area A88 is an area where the descending order or the ascending order is set.

Preview Character Area A90;

The preview character area A90 is an area where a preview character displayed in the preview area A61 or A62 is displayed.

Temporary Font Area A91;

The temporary font area A91 is an area where a font name of a character displayed in the temporary font preview area A61 is displayed.

Retrieval Result Display Area A92;

The retrieval result display area A92 is an area where the results of font retrieval (sub-font names or characters represented by the sub-fonts) are displayed.

Font Name Display Designation Area A93;

The font name display designation area (button) A93 is an area (button) clicked by the user when the results of retrieval displayed in the retrieval result display area A92 are displayed by font names.

Preview Designation Area A94;

The preview designation area (button) A94 is an area (button) clicked by the user when the results of retrieval displayed in the retrieval result display area A92 are previewed by fonts (characters represented by fonts).

Retrieval Mode Setting Area A95;

The retrieval mode setting area (button) A95 is an area (button) clicked when a retrieval mode is set by the user.

Registration Mode Setting Area A96;

The registration mode setting area (button) A96 is an area (button) clicked when a registration mode is set by the user.

Favorite Addition Area A101;

The favorite addition area A101 is an area clicked by the user when a font (desired by the user) is added to favorites (favorite font list).

List Display Area A102;

The list display area A102 is an area clicked by the user when a list of fonts which can be displayed is displayed by a single character.

Temporary Setting Area A103;

The temporary setting area A103 is an area clicked by the user when a font is previewed in the temporary font preview area A61 for comparison with the font displayed in the selected font preview area A 62.

Retrieval Command Setting Area A104;

The retrieval command setting area A104 is an area clicked by the user for entering a retrieval command.

Registration Command Area A105;

The registration command area A105 is an area clicked by the user for entering a registration command. OK area A106;

The OK area A106 is an area clicked by the user when a selected font is confirmed or determined.

Cancel Area A107;

The cancel area A107 is an area clicked by the user when the selected font is cancelled (not used).

Figure 12:
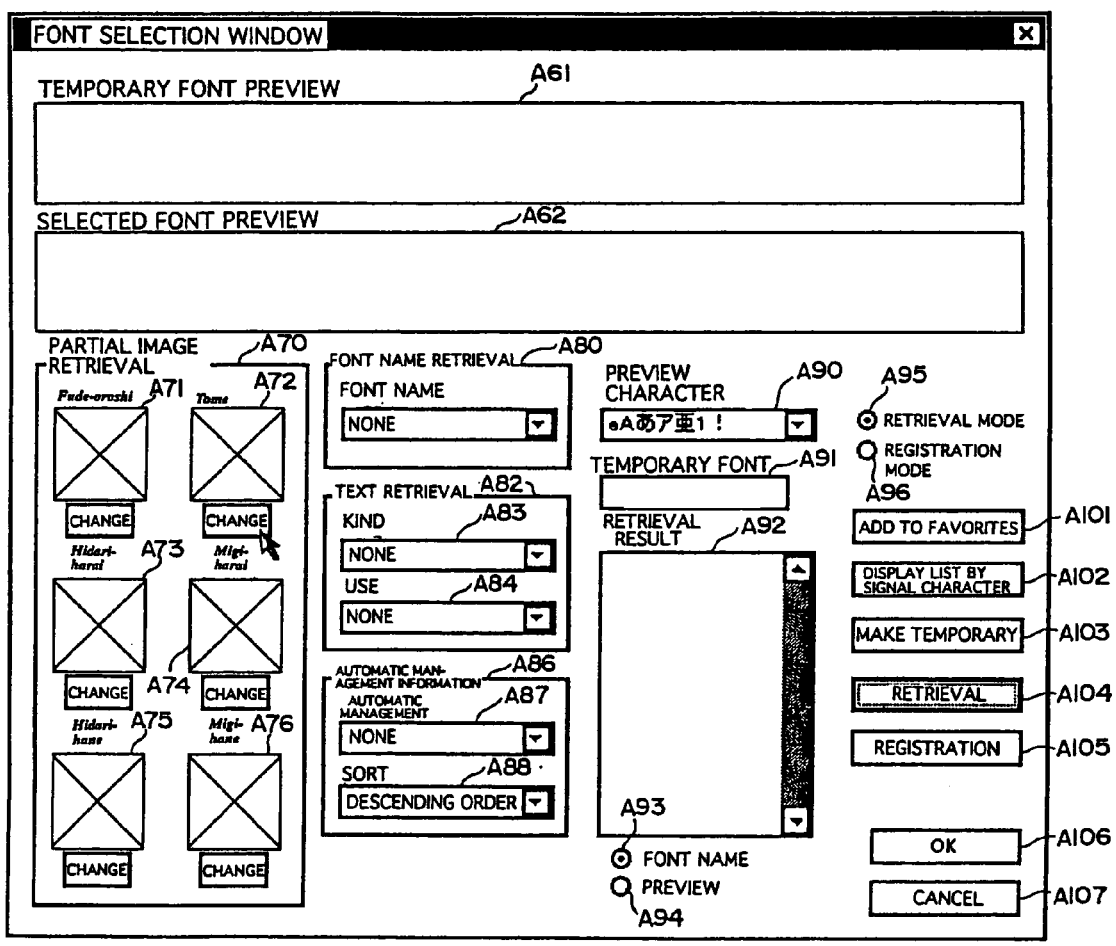
Figure 13:
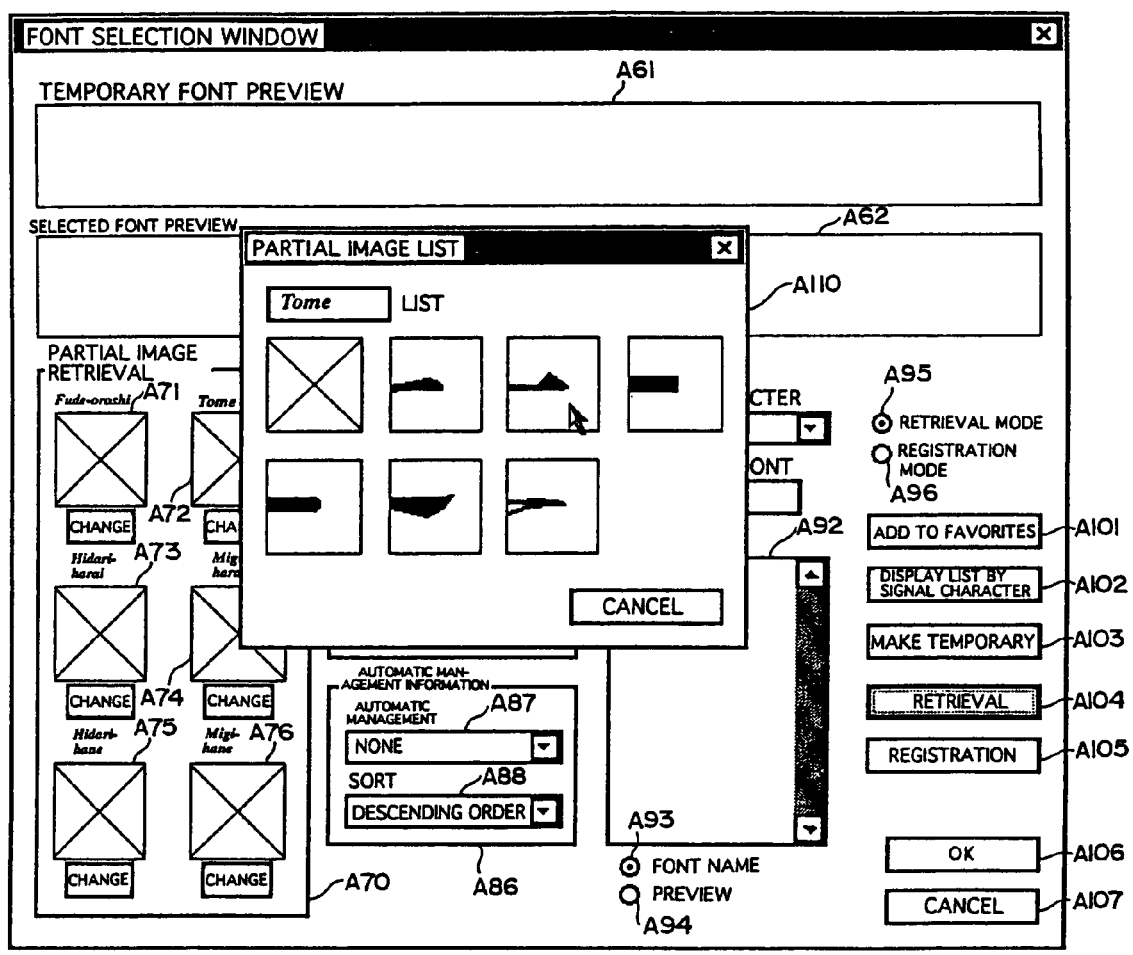
Figure 14:
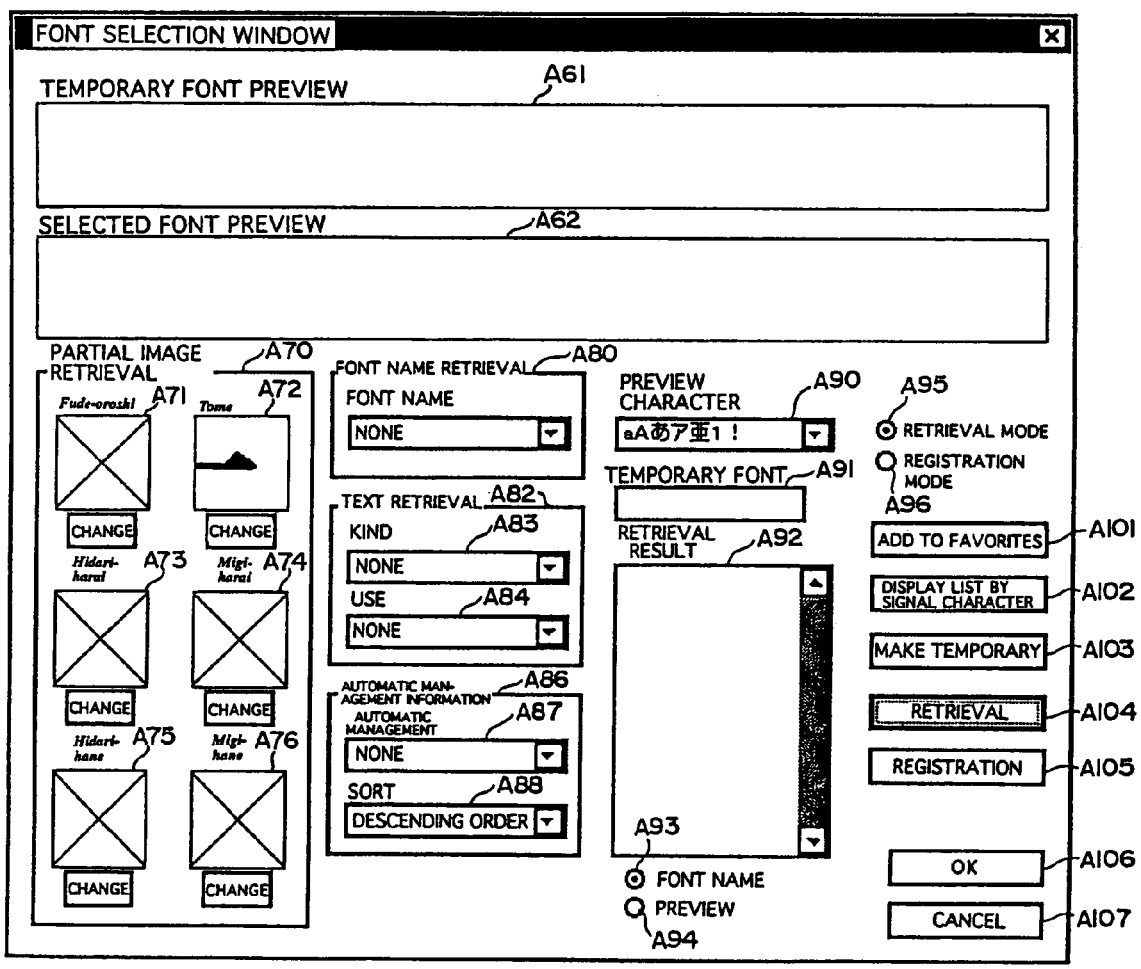

FIGS. 12 to 14 illustrate the state of the font selection window in a case where the partial image retrieval key is set.

When the partial image retrieval key is set, a "CHANGE" button area corresponding to a desired partial image area is clicked by the user, as shown in FIG. 12 (a "CHANGE" area corresponding to "Tome" area is clicked in FIG. 12). A partial image list window A110 appears on the display screen of the display device 14, as shown in FIG. 13, in response to the click.

A list of partial images represented by different fonts with respect to the clicked partial image is displayed in the partial image list window A110.

Out of the partial images of the different fonts whose list is displayed in the partial image list window A110, the desired font is selected by clicking the desired partial image. The partial image of the selected font is displayed in a corresponding partial image display area (here, the area A72) in the partial image retrieval area A70, as shown in FIG. 14.

By the foregoing processing, the partial image retrieval key setting processing is terminated. It goes without saying that when a plurality of partial images are set as retrieval keys, the above-mentioned processing is repeated.

FIGS. 15a to 15c illustrate a part of the font selection window in a case where a font name retrieval key is set.

By pulling down the font retrieval area A80 as shown in FIG. 15a, a pull-down list which includes names of the main fonts is displayed. As shown in FIG. 15b, a desired font (a main font name) is selected from the displayed pull-down list. As shown in FIG. 15c, the selected font is displayed in the font retrieval area A80.

FIGS. 16a to 16f illustrate a part of the font selection window in a case where text retrieval keys are set.

Figures 16A, 16B, 16C, 16D, 16E, 16F:
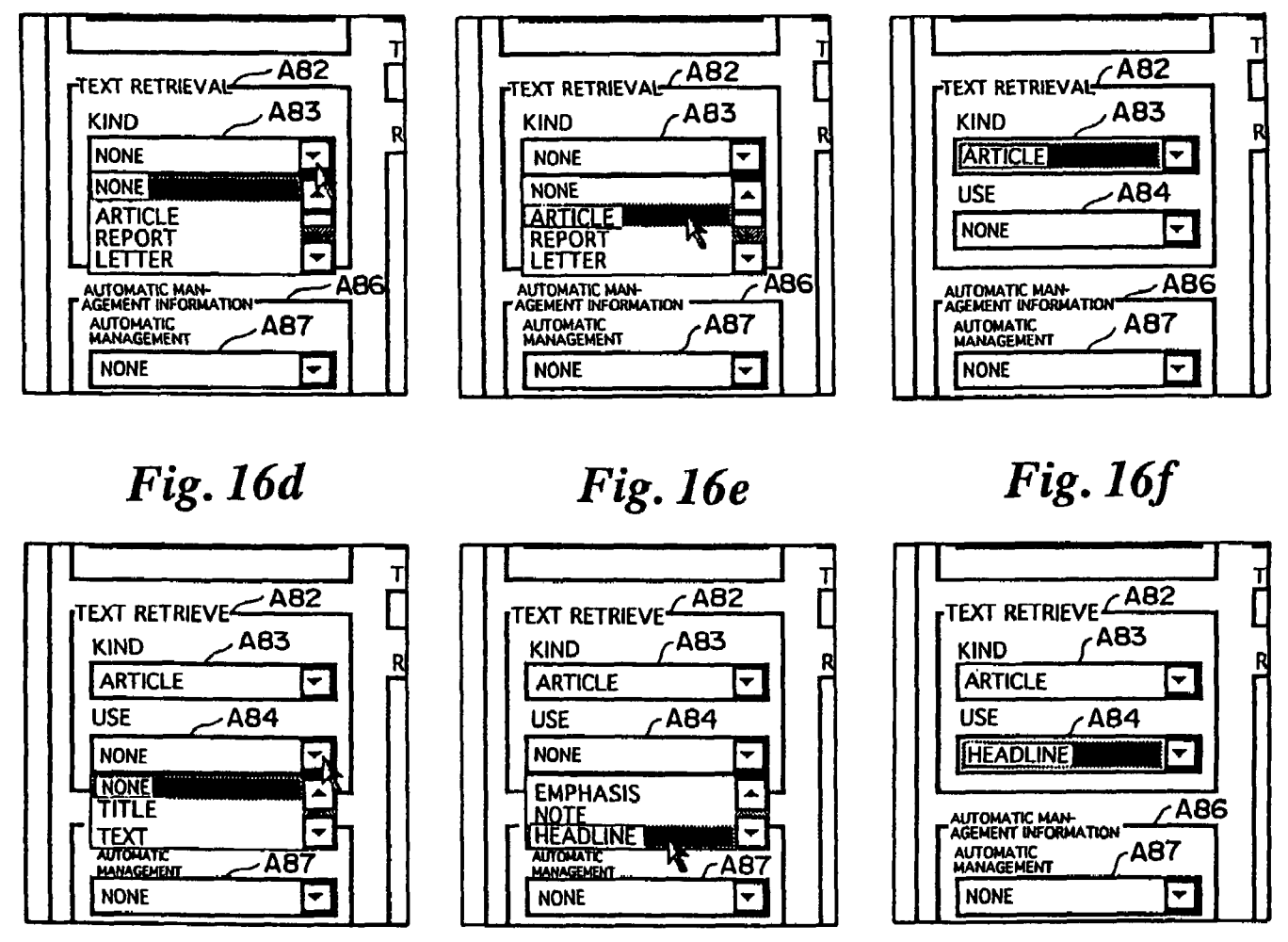

By pulling down the kind retrieval setting area A83 as shown in FIG. 16a, a pull-down list relating to kinds of a text is displayed. As shown in FIG. 16b, a desired kind is selected from the displayed pull-down list. As shown in FIG. 16c, the selected kind (Article) is displayed in the kind-of-text retrieval setting area A83.

Furthermore, by pulling down the use retrieval setting area A84 as shown in FIG. 16d, a pull-down list relating to uses for the sentence or text in one document is displayed. As shown in FIG. 16e, a desired use is selected from the displayed pull-down list. As shown in FIG. 16f, the selected use (Headline) is displayed in the use-of-text retrieval setting area A84.

FIGS. 17a to 17f illustrate a part of the font selection window in a case where font retrieval by automatic management information is set.

Figure 17A:
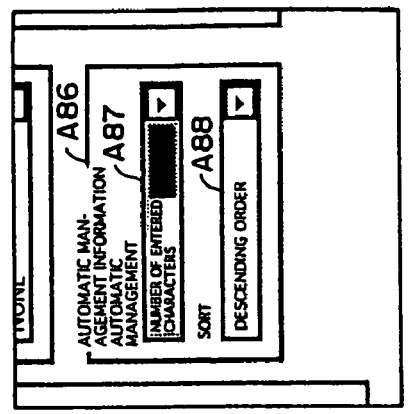
Figure 17B:
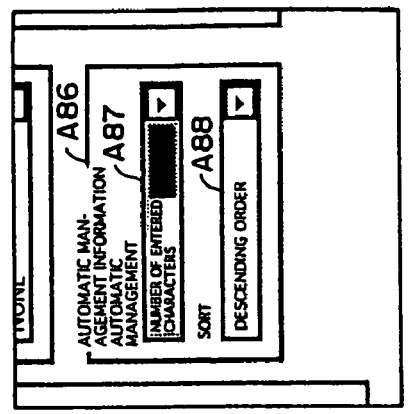
Figure 17C:
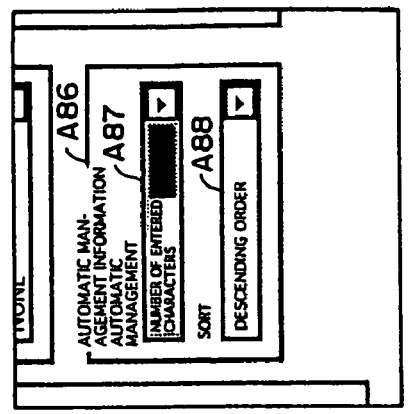

By pulling down the automatic management information area A87 as shown in FIG. 17a, a pull-down list relating to automatic management information is displayed. As shown in FIG. 17b, desired automatic management information is selected from the displayed pull-down list. As shown in FIG. 17c, the selected automatic management information (Number of entered characters) is displayed in the area A87.

Figure 17D:
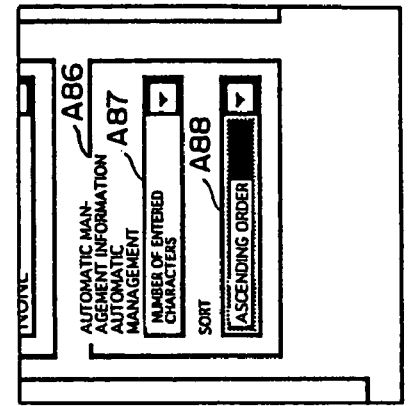
Figure 17E:
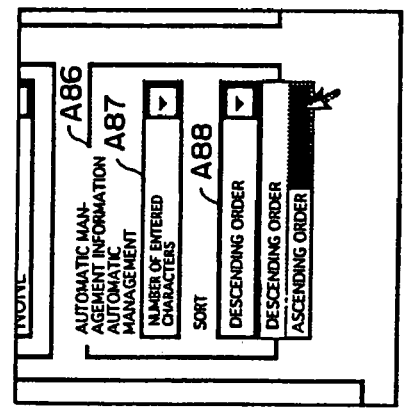
Figure 17F:
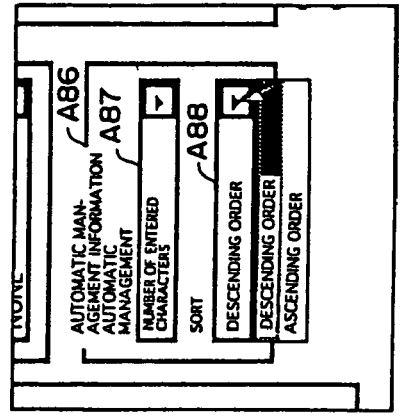

By pulling down the sort area A88 as shown in FIG. 17d, a list representing the descending order or the ascending order is displayed. As shown in FIG. 17e, the descending order or the ascending order is selected from the displayed list. As shown in FIG. 17f, the selected order (Ascending order) is displayed in the area A88.

(3) Font Retrieval

Figure 18:
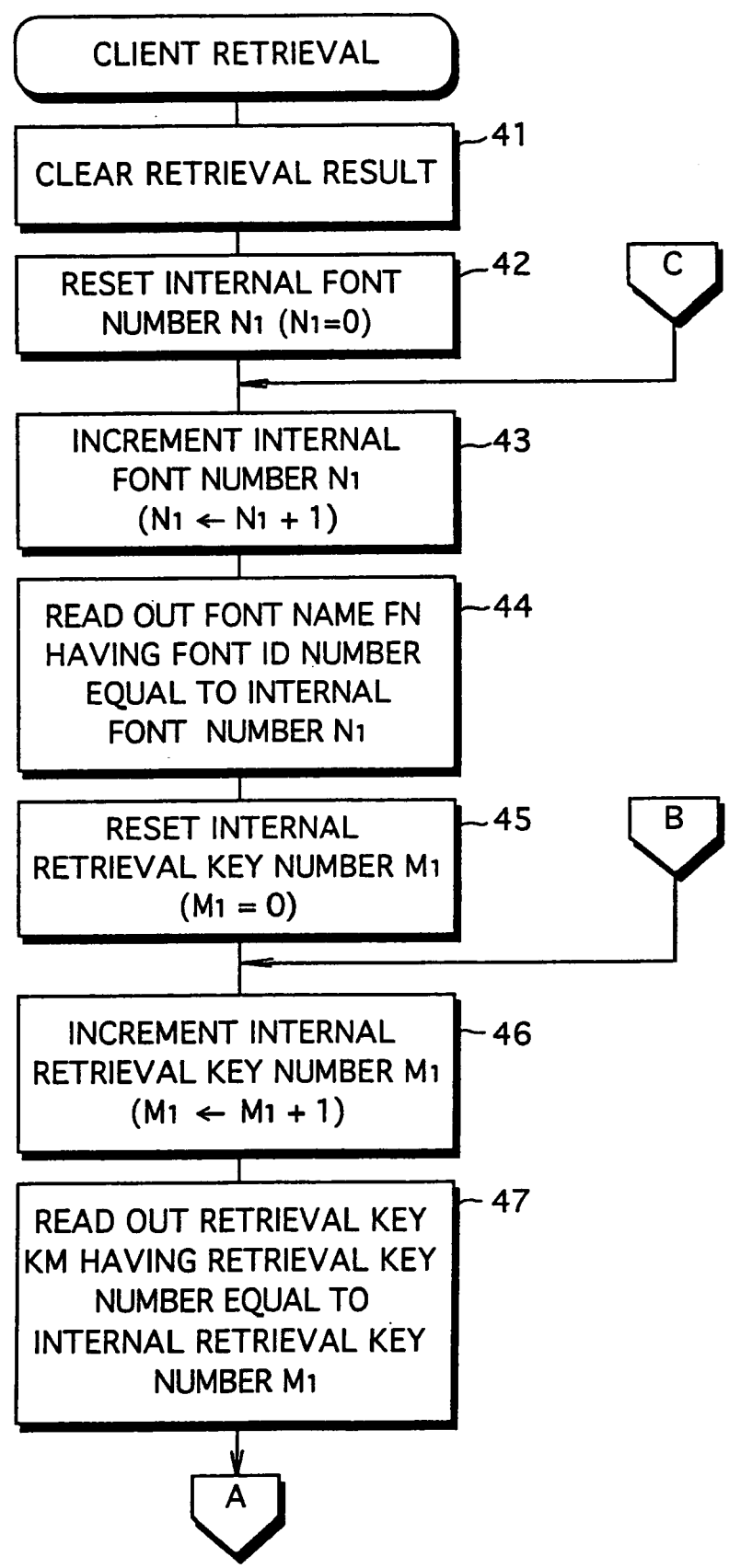
FIGS. 18 and 19 are flow charts showing font retrieval processing.
Figure 19:
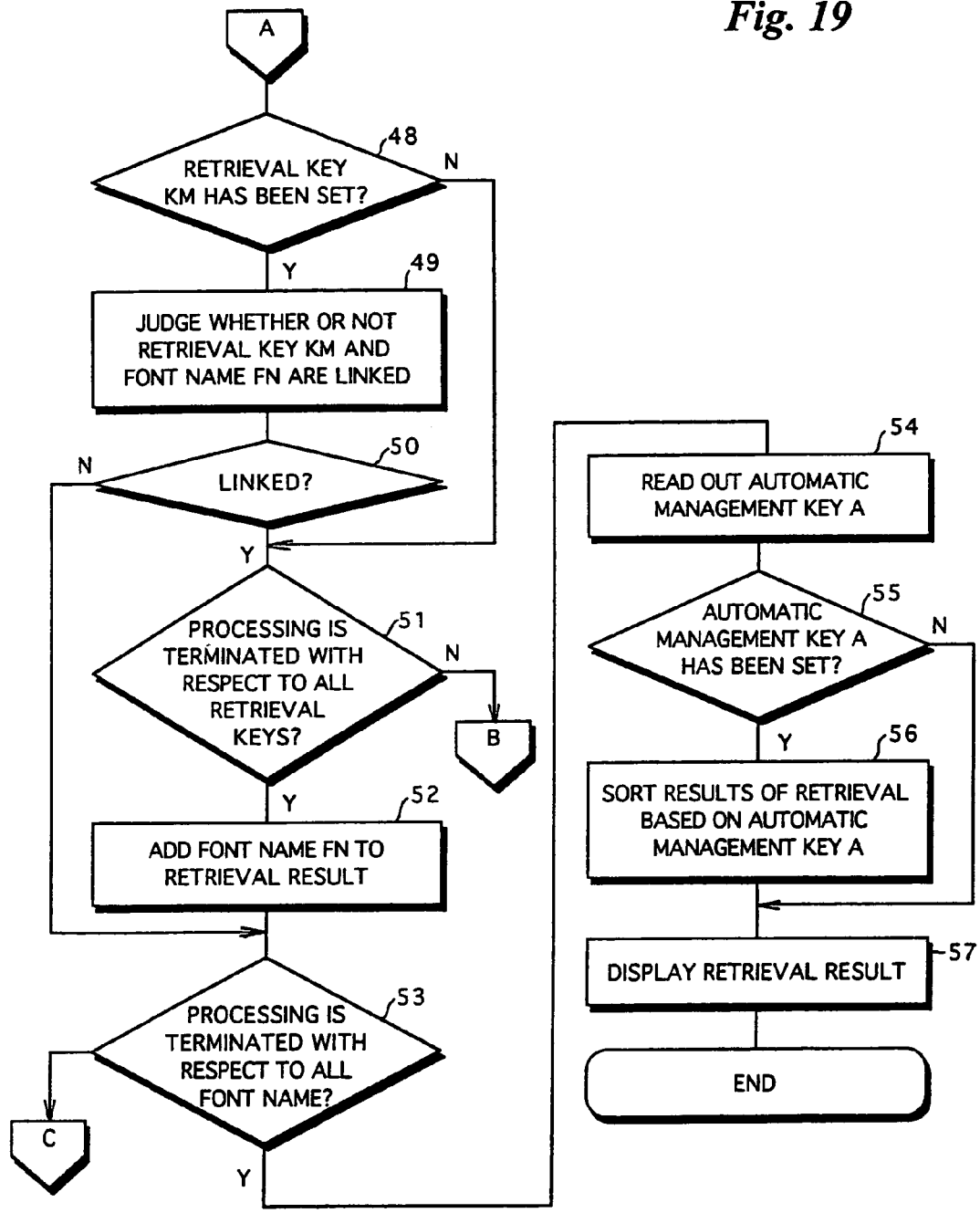

FIGS. 18 and 19 are flow charts showing the procedure for font retrieval processing. The font retrieval processing is for retrieving fonts concerning font data stored in the hard disk for the client computer 1.

Prior to the font retrieval, at least one retrieval key with respect to at least one retrieval item has been set using the above-mentioned font selection window. The font retrieval is a processing for finding a sub-font (or sub-fonts) each of which is linked to all the set retrieval keys or key. In order to perform the font retrieval processing, at least one of (or both of) the font link table (FIG. 7) and the retrieval key kink table (FIG. 9) is used.

The previous result of retrieval (area A92) is cleared prior to the font retrieval processing (step 41). An internal font number (counter) $N_1$ for designating the font ID number N is reset (step 42). The internal font number $N_1$ is incremented (step 43). The sub-font name FN having a font ID number N equal to the incremented internal font number $N_1$ is read out of the font link table in the hard disk for the client computer 1 (step 44).

An internal retrieval key number $M_1$ designating the retrieval key number M is reset (step 45). The internal retrieval key number $M_1$ is incremented (step 46). A retrieval key KM having a retrieval key number M equal to the incremented internal retrieval key number $M_1$ is read out from the retrieval key link table (step 47).

It is judged whether or not the retrieval key KM read out has been set (step 48).

When the retrieval key KM has been set (YES at step 48), it is judged on the basis of the font link table whether the retrieval key KM and the $N_1$-th font name FN are linked to each other (step 49). If they are linked (YES at step 49), it is checked whether the $N_1$-th font name FN read out is linked to all set retrieval keys, incrementing the internal retrieval key number $M_1$ (step 51, steps 46-50).

If the $N_1$-th font name FN read out is linked to all the set retrieval keys, a font represented by the $N_1$-th font name FN coincides (matches) with all of the retrieval keys set by the user. The $N_1$-th font name FN is added to (displayed on) the result of retrieval (the retrieval result area A92) (step 52).

If the $N_1$-th font name FN read out is not linked to one of all the set retrieval keys (NO at step 50), the font represented by the $N_1$-th font name FN does not coincide with all of the retrieval keys set by the user. Therefore, the $N_1$-th font name FN is not added to the results of retrieval, and the subsequent font data is read out by incrementing the internal font number $N_1$ (No at step 53, and steps 43 and 44).

When check as to whether all the font data stored in the font link table in the hard disk are linked to the set retrieval keys is terminated (YES at step 53), an automatic management key A (a retrieval key set in the automatic management area A87) is read out (step 54). When the automatic management key A has been set (YES at step 55), the results of retrieval (sub-font names) are sorted on the basis of the set automatic management key A (in the set order of descending order or ascending order) (step 56). The sorted results of retrieval are displayed in the retrieval result display area A92 (step 57). If the automatic management key A has not been set, the results of retrieval (a list of the sub-font names) are displayed in the retrieval result display area A92 without being sorted (step 57).

FIGS. 20 to 25 illustrate an example of the font selection window displayed on the display screen of the display device 14 in the client computer 1.

Referring to the drawings, how a font is retrieved will be specifically described.

Figure 20:
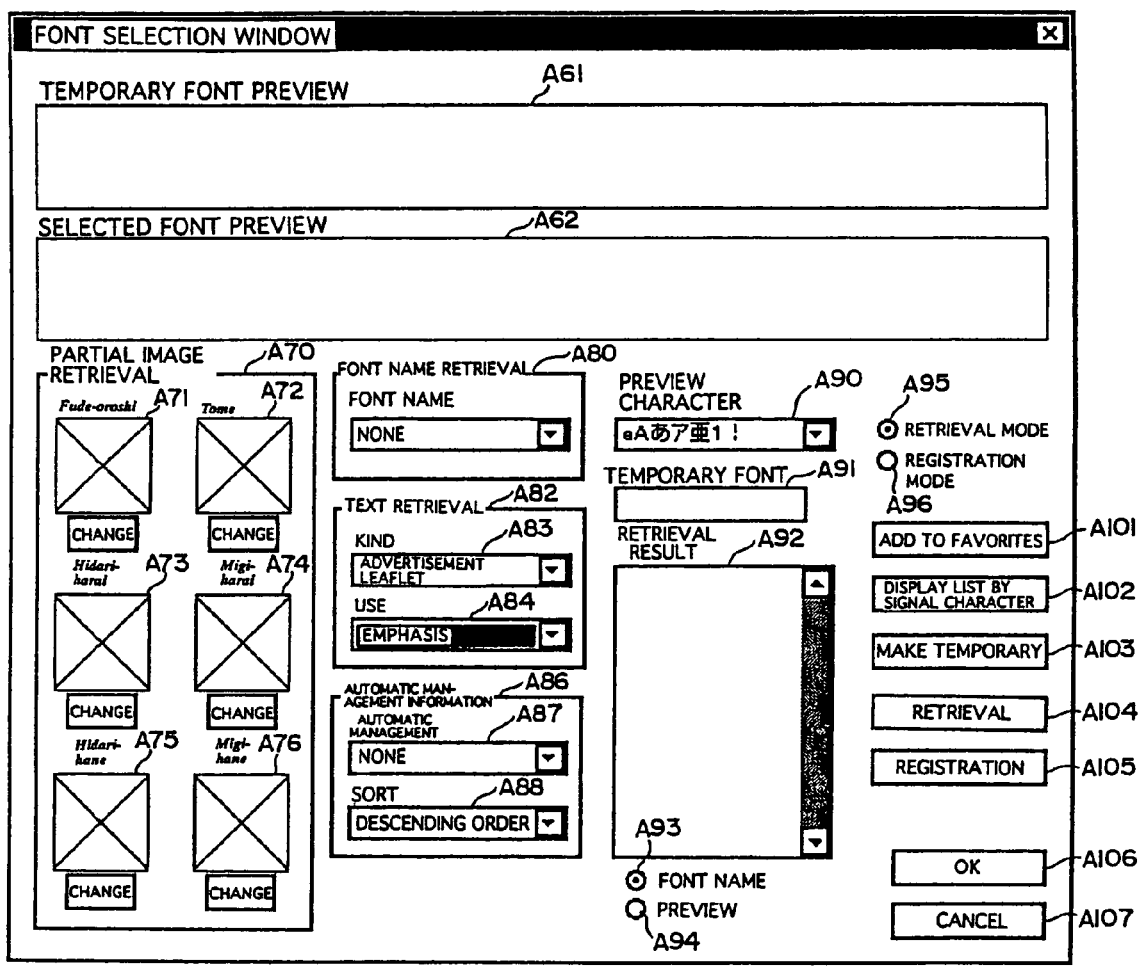
FIGS. 20 to 25 illustrate the font selection window.
Figure 21:
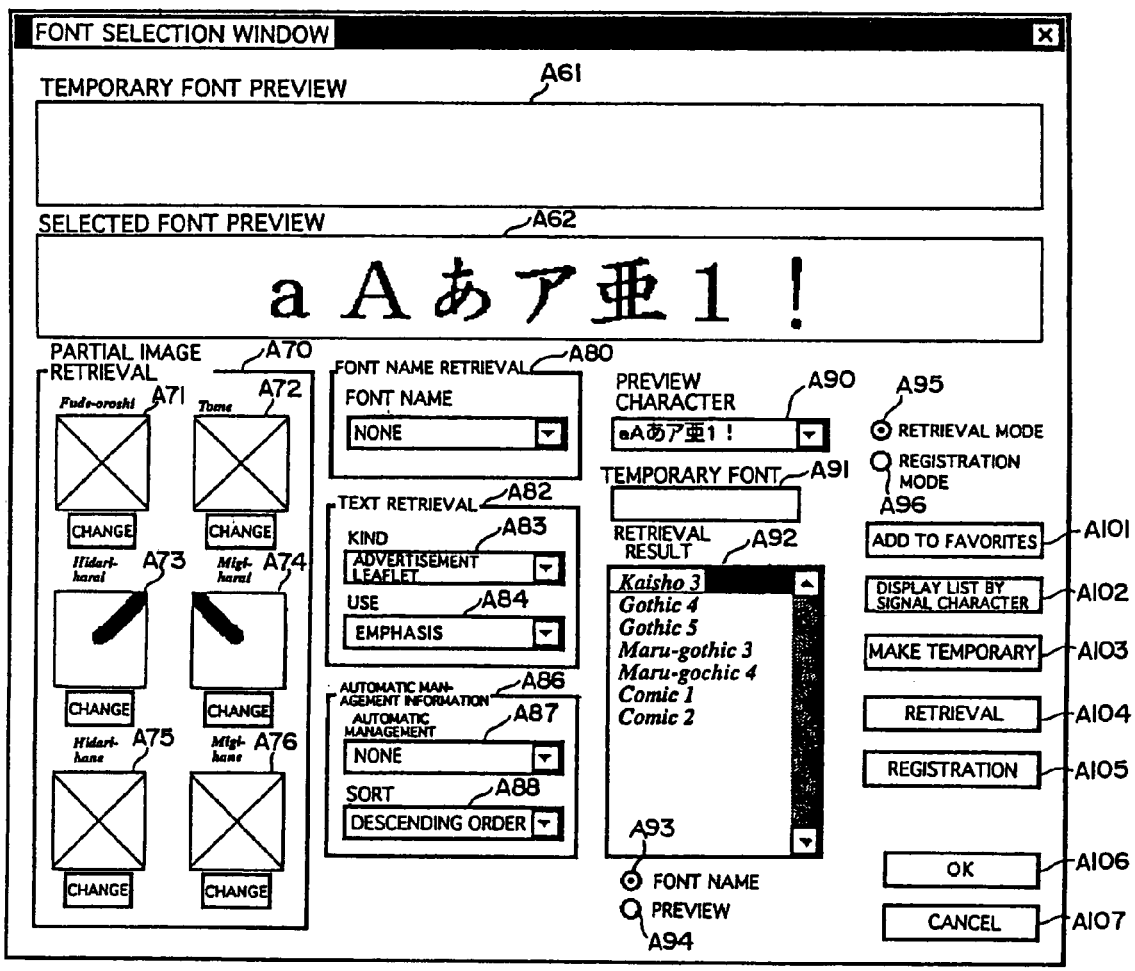

First, a retrieval key shall be set such that a kind of a text to be entered (or having been entered) is set to "Advertisement, Leaflet", and the sentence or text to be entered (or having been entered) is used for a use "Emphasis" (FIG. 20). It goes without saying that these retrieval keys are set by pulling down the kind retrieval setting area A83 and the use retrieval setting area A84, as described above.

The retrieval area A104 is clicked by the user, so that font retrieval processing is performed. A font name or font names which are linked to all the set retrieval keys are found, referring to the font link table or the retrieved key link table (the processing from the step 41 shown in FIG. 18 to the step 53 shown in FIG. 19). Here, no retrieval key is set in the automatic management area A87, so that the results of retrieval are displayed in the retrieval result area A92 without being sorted (the processing at steps 54, 55 and 57 shown in FIG. 19) (see FIG. 21).

Characters represented by a font corresponding to a font name displayed in the uppermost part of the retrieval result area A92 is displayed in the selected font preview area A62 (the kinds of displayed characters are predetermined). In the example shown in FIG. 21, "Kaisho 3" is displayed as a font name in the uppermost part of the retrieval result area A92, so that characters represented by the font "Kaisho 3" are displayed in the selected font preview area A62.

Figure 22:
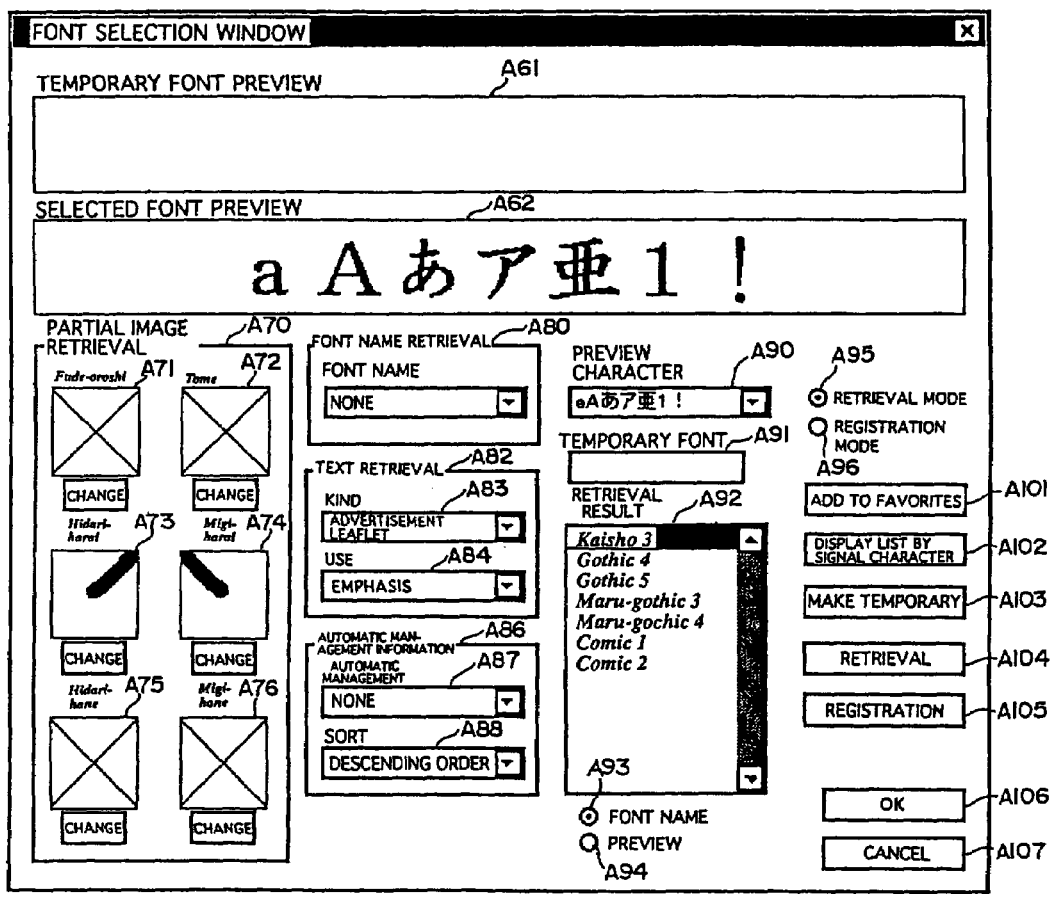
Figure 23:
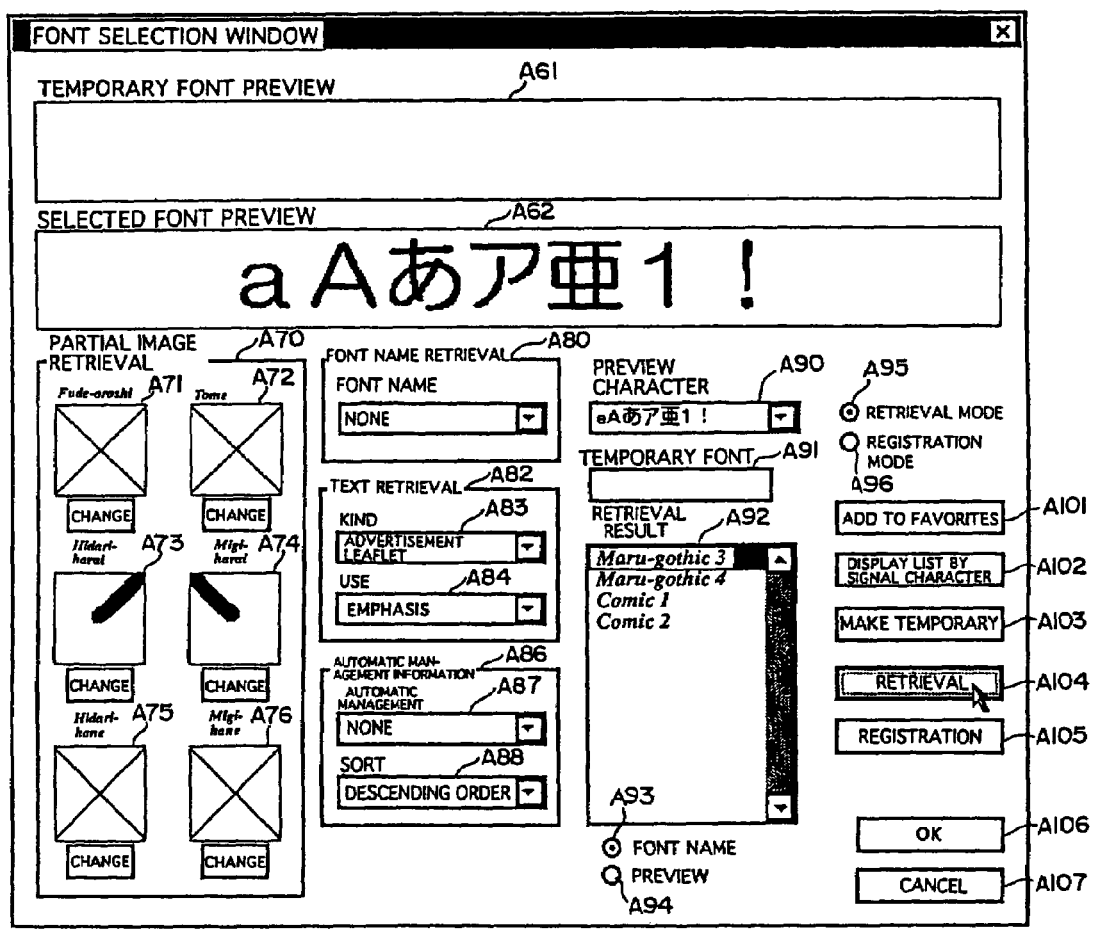

Furthermore, partial images represented by a desired font (or fonts) are respectively set in the "Hidari-harai" area A73 and the "Migi-harai" area A74 in the partial image retrieval area A70 in order to narrow the results of retrieval down (see FIG. 22). The partial image represented by a desired font is also set by designating a partial image in the partial image list window A110 appearing by clicking each of the "CHANGE" buttons corresponding to the "Hidari-harai" area A73 and the "Migi-harai" area A74, as described above (FIG. 13).

When the retrieval area A104 is clicked again by the user, font retrieval processing is performed again, adding the newly set partial image retrieval keys. The results of retrieval are displayed in the retrieval result area A92. Characters represented by a font of a font name displayed in the uppermost part of the retrieval result area A92 is displayed in the selected font preview area A62 (see FIG. 23). In the example shown in FIG. 23, "Maru-gothic 3" is displayed as a font name in the uppermost part of the retrieval result area A92, so that characters represented by the font "Maru-gothic 3" is displayed in the selected font preview area A62.

Figure 24:
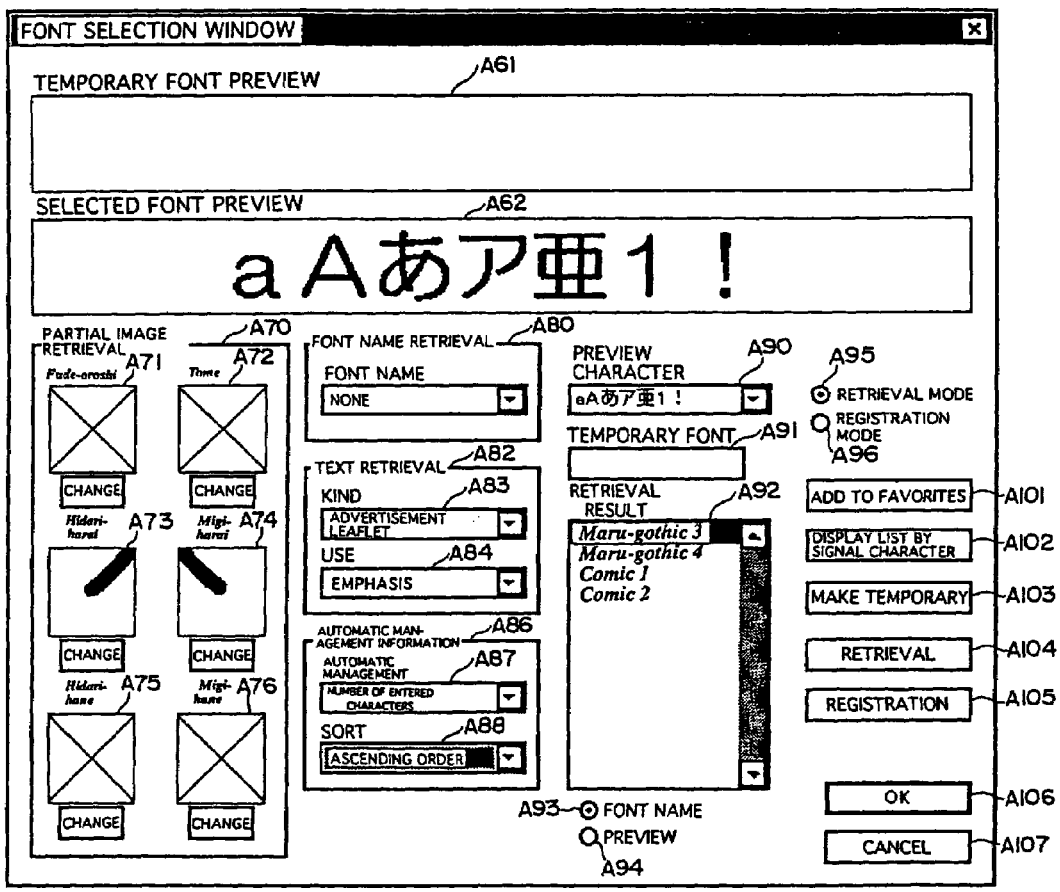

In order to rearrange the results of retrieval in ascending order of the numbers of entered characters in the past, the number of entered characters and the ascending order shall be respectively set in the automatic management area A87 and the sort area A88 in the automatic management information area A86 (see FIG. 24).

Figure 25:
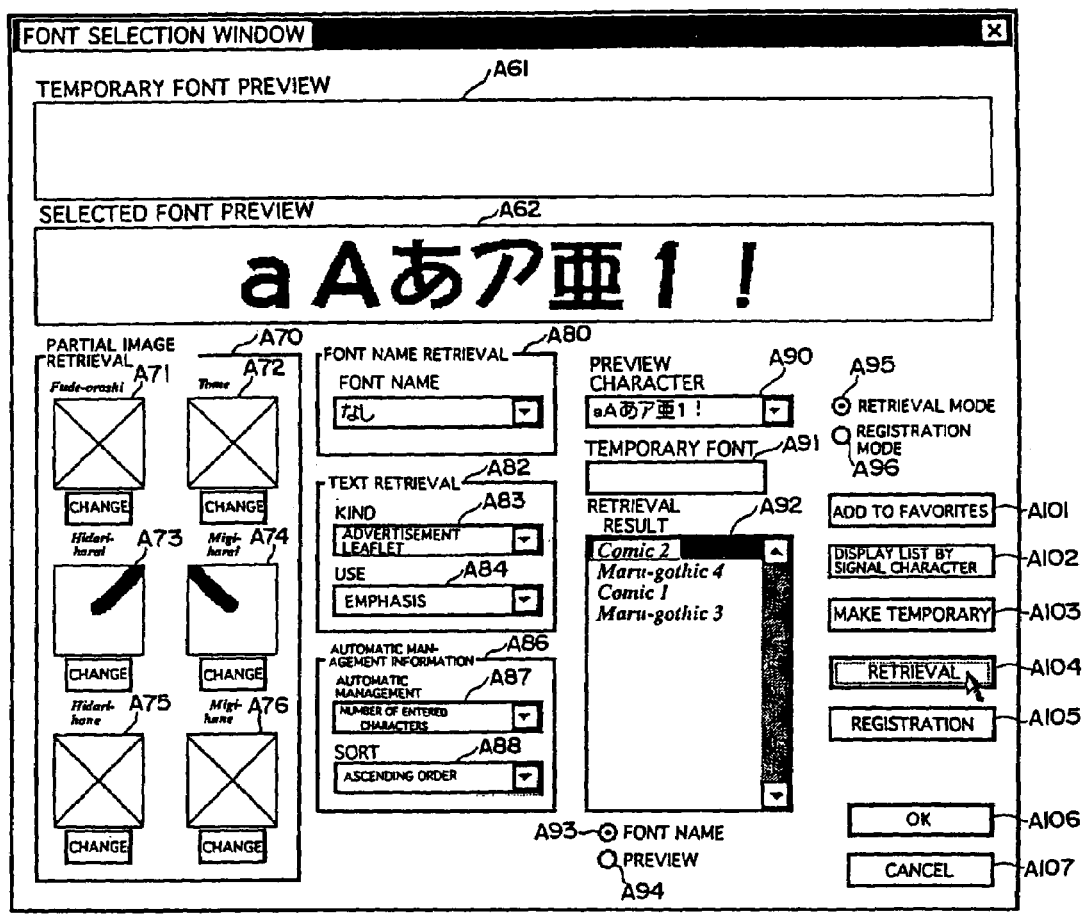

When the retrieval area A104 is clicked by the user, the font names are rearranged in ascending order of the numbers of characters entered with fonts represented by the font names, and are displayed in the retrieval result area A92 (see FIG. 25). In the example shown in FIG. 25, the font for which the number of entered characters in the past is smallest is "Comic 2", so that characters represented by the font "Comic 2" is displayed in the selected font preview area A62.

Figure 26A:
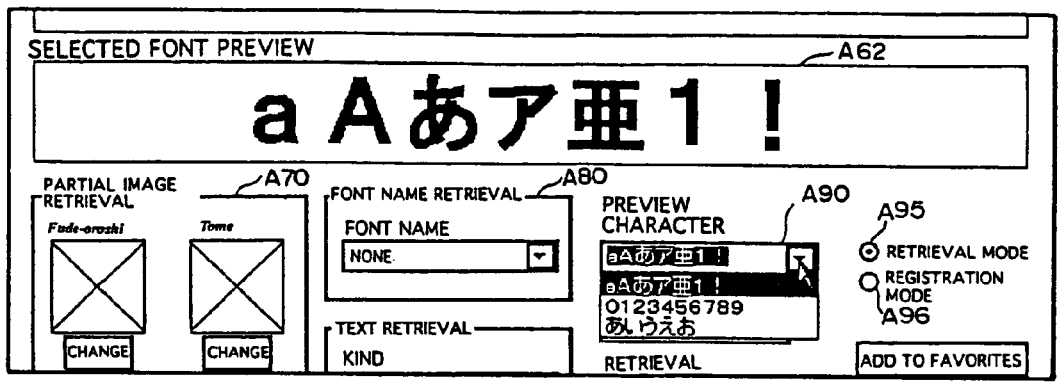
FIGS. 26a to 27c illustrate a part of the font selection window.
Figure 26B:
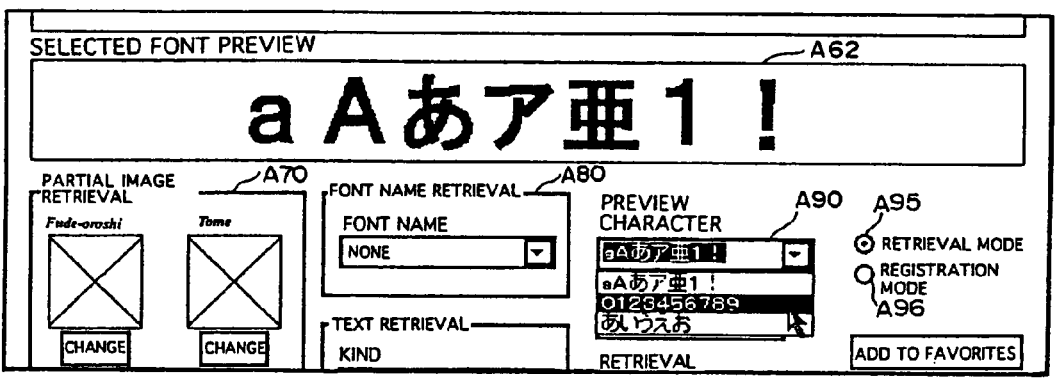
Figure 26C:
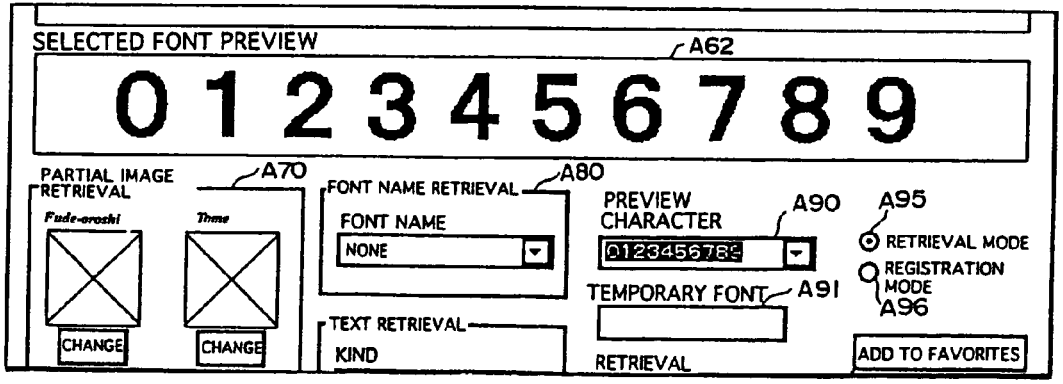

FIGS. 26a to 26c illustrate a part of the font selection window.

In the present embodiment, preview characters displayed in the selected font preview area A62 can be also changed.

As shown in FIG. 26a, when the preview character area A90 is pulled down by the user, a pull-down list is displayed. Desired preview characters are is selected by the user on the pull-down list displayed as shown in FIG. 26b. Here, "0123456789" is selected as the preview characters. As shown in FIG. 26c, the selected preview characters are displayed with a font found by the retrieval in the selected font preview area A62.

Figure 27A:
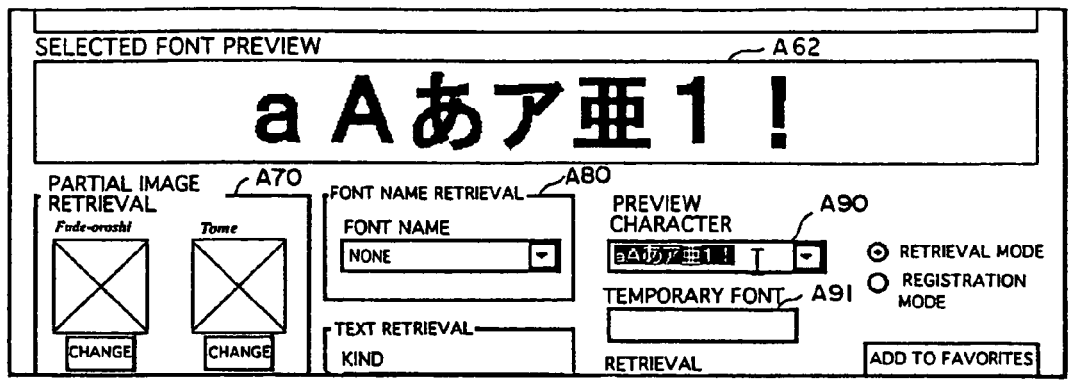
Figure 27B:
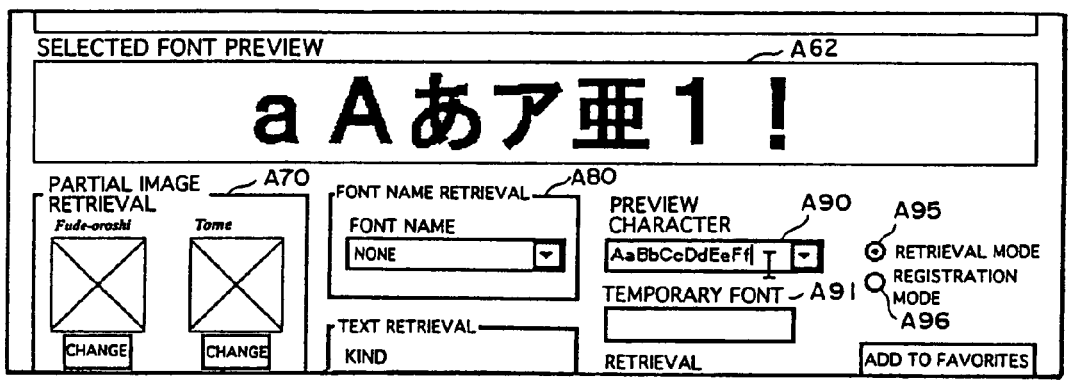
Figure 27C:
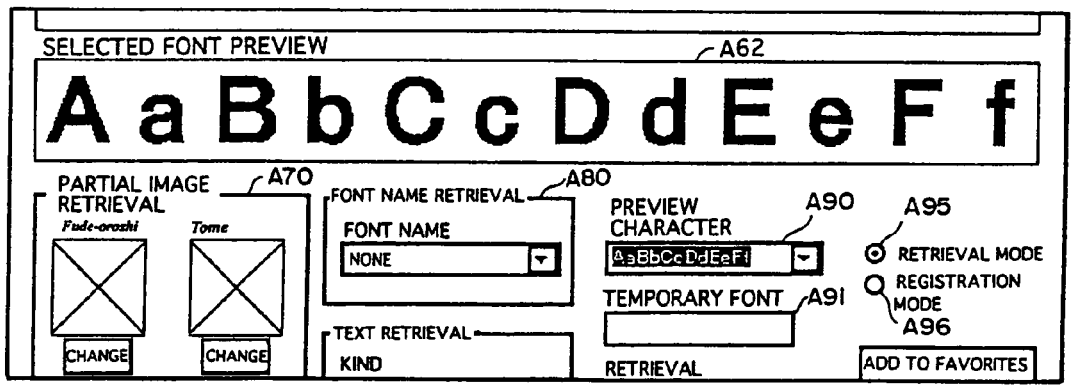

FIGS. 27a to 27c illustrate a part of the font selection window.

In the present embodiment, preview characters displayed in the selected font preview area A62 can be changed into characters desired by the user.

As shown in FIG. 27a, a character display window of the preview character area A90 is clicked by the user. Consequently, there arises a state where a preview character can be entered. Characters displayed in the preview character area A90 is erased, to enter characters desired by the user from the keyboard 7. As shown in FIG. 27b, the entered characters are displayed in the preview character area A90. By pressing a line feed key in the keyboard 7 or clicking an area other than the preview character area A90 using the mouse 8, the entered characters become effective. As shown in FIG. 27c, the entered characters are displayed in the selected font preview area A62.

FIGS. 28 to 31 illustrate an example of the font selection window.

In the present embodiment, characters represented by two different fonts can be simultaneously displayed in the font selection window, i.e., in the temporary font preview area A61 and the selected font preview area A 62.

Figure 28:
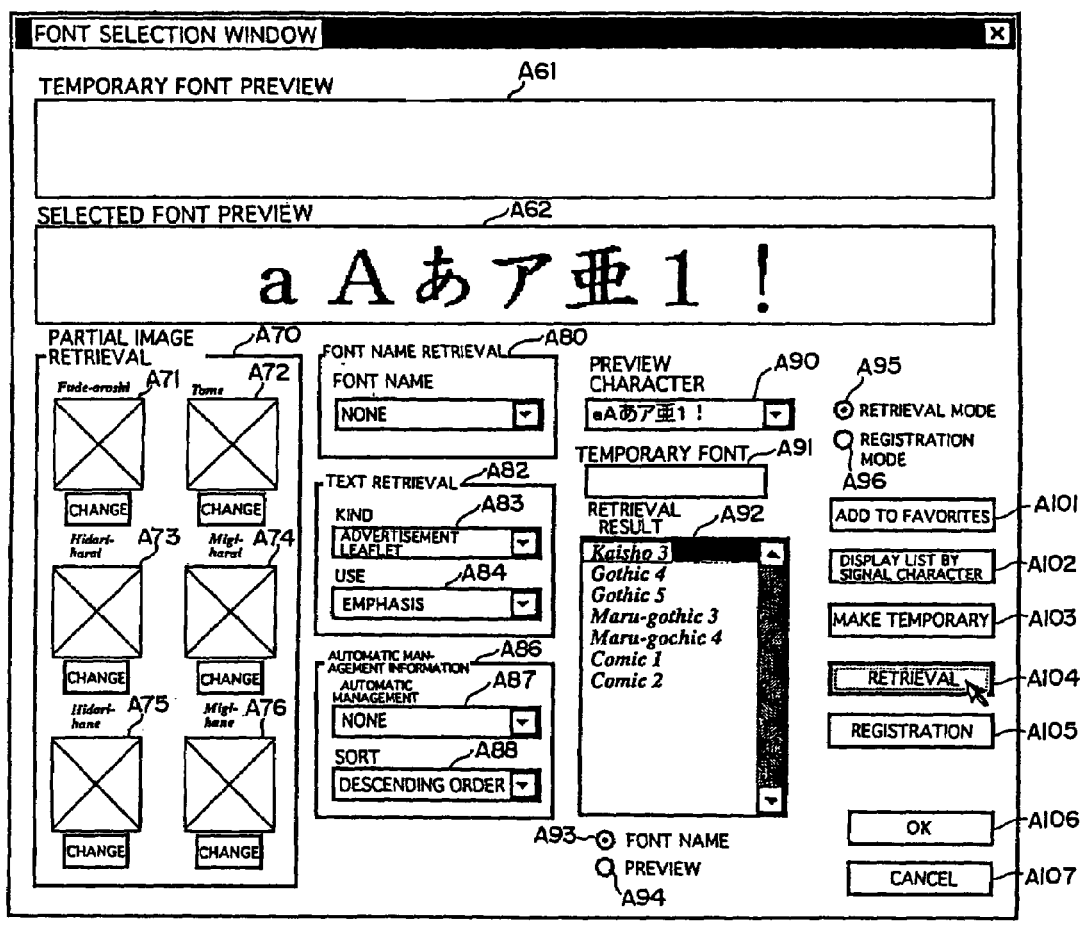
FIGS. 28 to 31 illustrate the font selection window.

As described above, the characters represented by the font found by the font retrieval is displayed in the selected font preview area A62 (see FIG. 28). Characters represented by a font displayed in the uppermost part of the retrieval result area A92 by the font retrieval, for example, the font "Kaisho 3" in the example shown in FIG. 28 has been displayed in the selected font preview area A62. In a state where "Kaisho 3" in the retrieval result area A92 is selected, when the temporary setting area A103 is clicked by the user, "Kaisho 3" is set as a temporary font.

Figure 29:
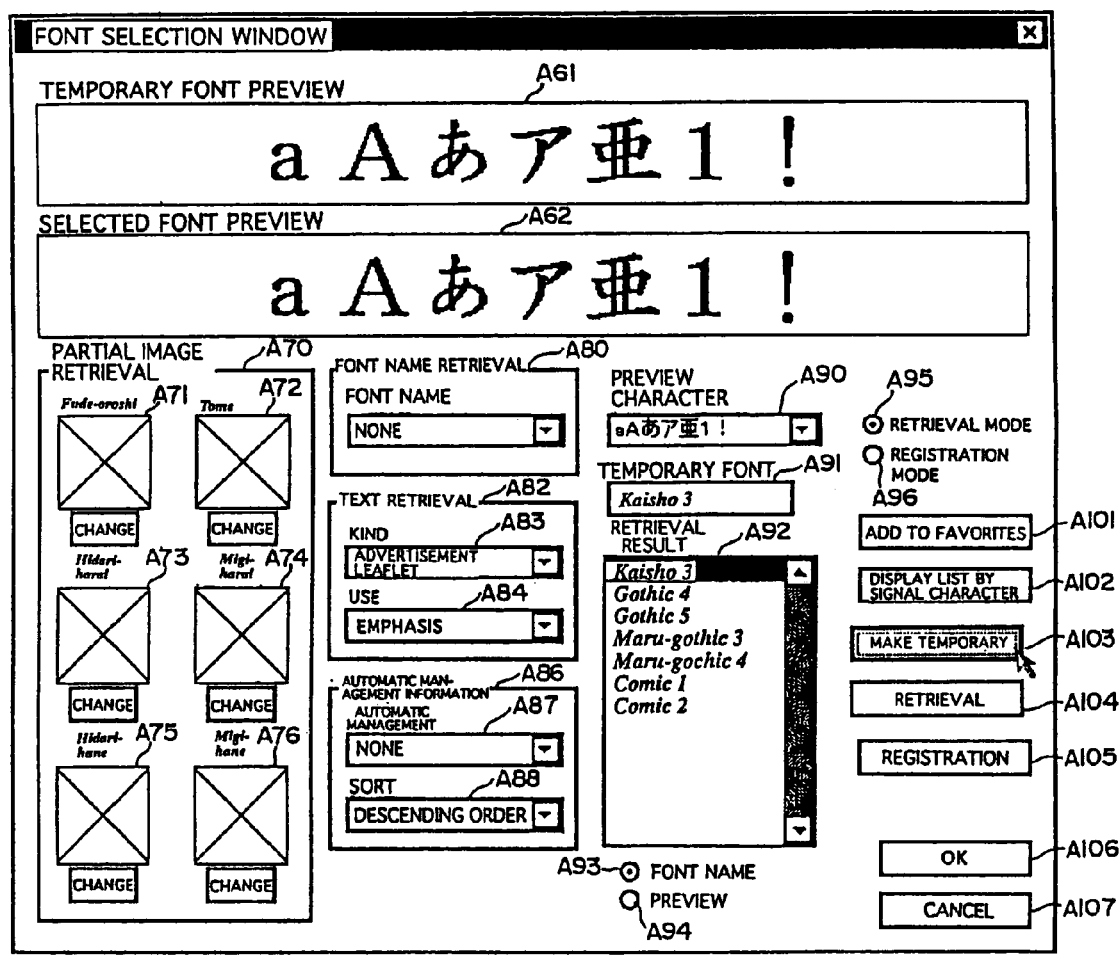

The selected font "Kaisho 3", is displayed in the temporary font display area A91, and the characters represented by the font "Kaisho 3" is displayed in the temporary font preview area A61 (see FIG. 29).

A font to be compared with the font of the characters displayed in the temporary font preview area A61 is then selected by the user. Here, the font "Gothic 5" and the font "Kaisho 3" shall be compared with each other.

Figure 30:
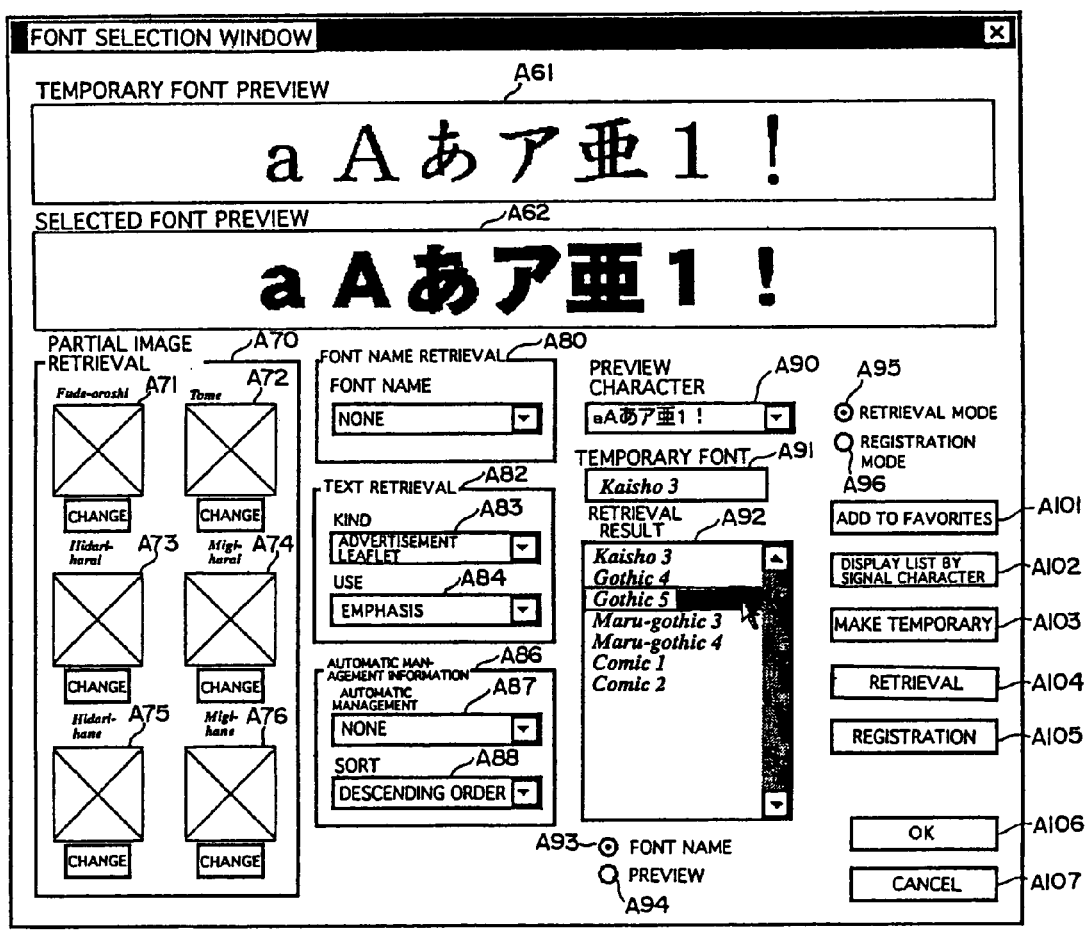
Figure 31:
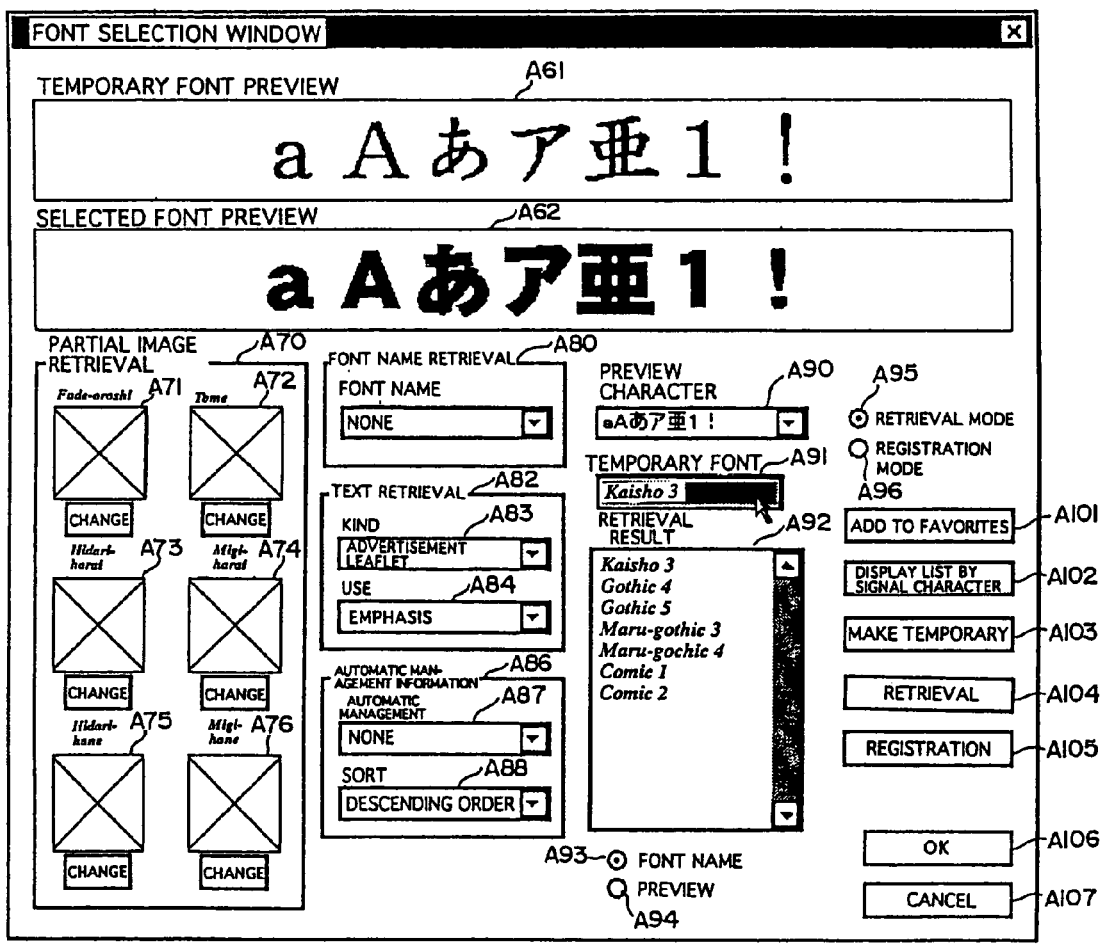

The font "Gothic 5" is selected by the user out of the font names displayed in the retrieval result area A92 (see FIG. 30). Characters represented by the font "Gothic 5" newly selected is displayed in the selected font preview area A62.

It is possible to directly compare the characters represented by the font "Kaisho 3" displayed in the temporary font preview area A61 and the characters represented by the font "Gothic 5" displayed in the selected font preview area A62 with each other.

When the user judges that the font "Kaisho 3" displayed in the temporary font preview area A61 is used by comparing the characters represented by the font "Kaisho 3" displayed in the temporary font preview area A61 and the characters represented by the font "Gothic 5" displayed in the selected font preview area A62 with each other, the temporary font area A91 is clicked by the user. Consequently, the font displayed in the temporary font area A91 is brought into a selected state (see FIG. 31). Thereafter, the OK area A106 is clicked by the user, so that "Kaisho 3" displayed in the temporary font preview area A61 is selected as a font to be used.

Figure 32A:
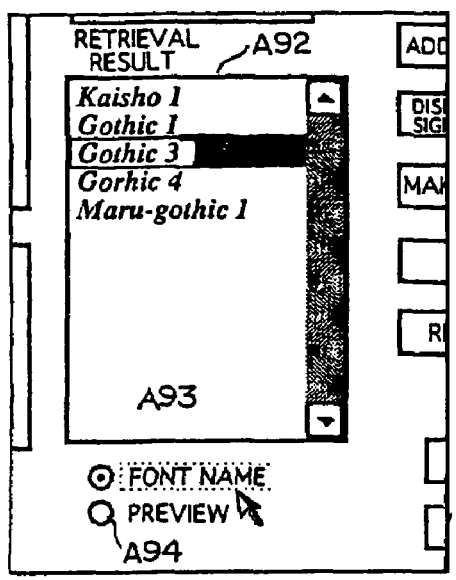
FIGS. 32a and 32b illustrate a part of the font selection window.
Figure 32B:
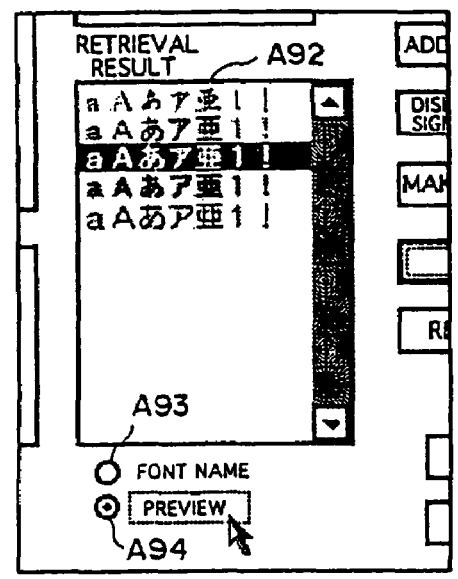

FIGS. 32a and 32b illustrate a part of the font selection window.

Although in the above-mentioned example, the results of retrieval displayed in the retrieval result area A92 are expressed by font names, the results of retrieval displayed in the retrieval result area A92 can be also changed into and expressed by characters represented by retrieved fonts.

When the font name display designation button A93 in the font selection window is selected, a list of font names representing retrieved fonts is displayed in the retrieval result area A92 (FIG. 32a). When the preview designation button A94 in the font selection window is selected, a list of characters represented by the retrieved fonts is displayed in the retrieval result area A92 (FIG. 32b). It is possible to find at a glance how the retrieved fonts are.

Figure 33A:
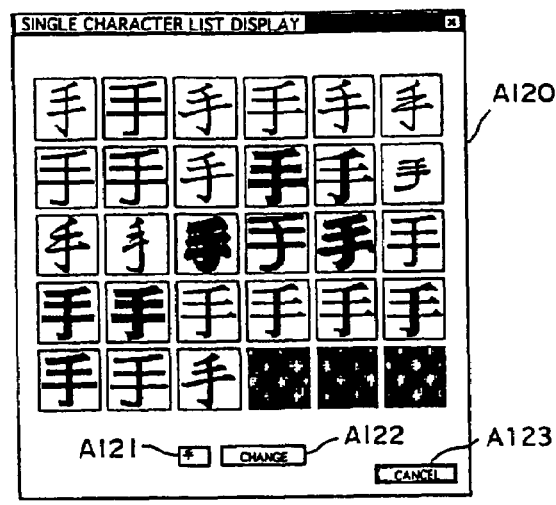
FIGS. 33a to 33c illustrate an example of a single character font list window.
Figure 33B:
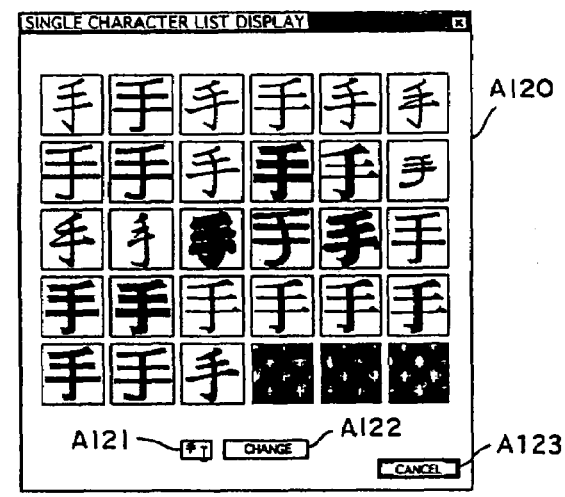
Figure 33C:
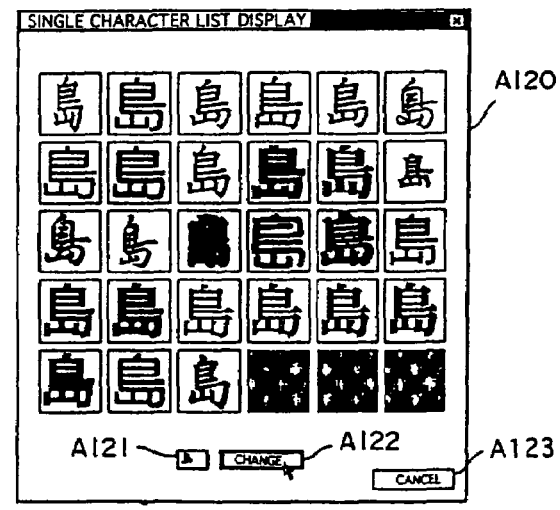

FIGS. 33a to 33c illustrate an example of a single character font list display window appearing on the display screen of the display device 14 in the client computer 1.

When the list display area A102 in the font selection window is clicked by the user, a single character font list display window A120, as shown in FIG. 33a, appears on the display screen of the display device 14.

A list of all fonts representing a single character is displayed in the single character font list display window A120 on the basis of all font data stored in the hard disk.

The single character font list display window A120 includes a character entry window A121, a change area A122, and a cancel area A123.

When the single character displayed in the single character font list display window A120 is changed, the character entry window A121 is clicked by the user, as shown in FIG. 33b. After the character displayed in the character entry window A121 is erased, a desired character is entered from the keyboard 7.

When the change area A122 is clicked by the user after the desired character is entered in the character entry window A121, a list of the fonts representing the entered single character is displayed on the basis of the font data stored in the hard disk (FIG. 33c).

It is possible to confirm at a glance all the fonts stored in the hard disk.

Figure 34A:
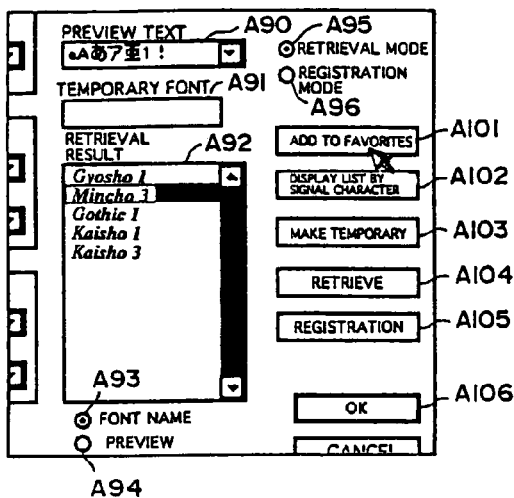
FIG. 34a illustrates a part of the font selection window.

FIG. 34a illustrates a part of the font selection window, and FIGS. 34b to 35d illustrate an example of a favorite edit window appearing in the font selection window.

In the present embodiment, it is possible to register a font desired by the user as a favorite font. When the favorite font is added or deleted, the favorite edit window is displayed on the display screen of the display device 14.

Figure 34B:
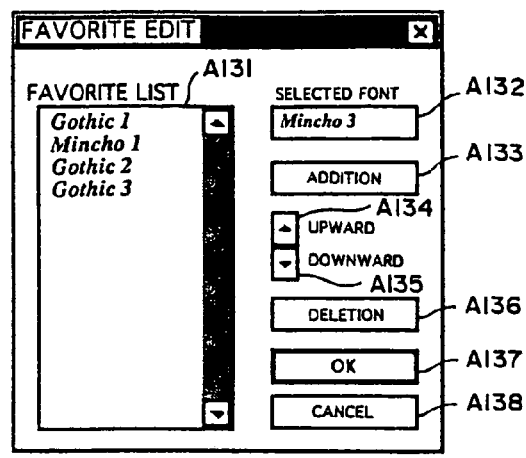
FIGS. 34b to 34d illustrate an example of a favorite edit window.

Referring to FIG. 34a, a desired font name is selected out of the results of retrieval whose list is displayed in the retrieval result area A92 in the font selection window. Thereafter, when the favorite addition area A101 is clicked by the user, the favorite edit window appears, as shown in FIG. 34b, on the display screen of the display device 14.

The favorite edit window includes a favorite list area A131 where a list of user's favorite fonts is displayed (the fonts are displayed in the order of descending priorities of favorites from the top), a selected font area (a font name selected by the user is displayed) A132, an addition area A133, areas A134 and A135 clicked by the user when the priorities of favorites are changed, a delete area A136, an OK area A137, and a cancel area A138.

Figure 34C:
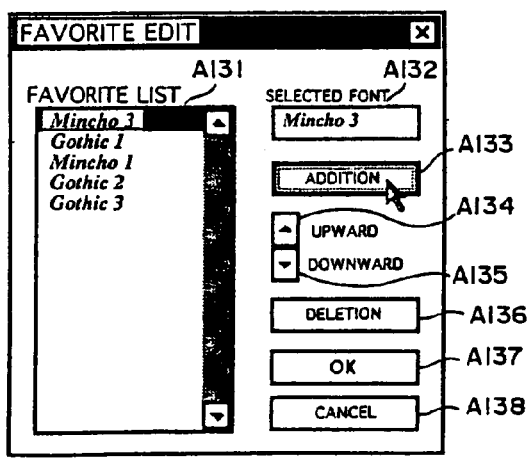

When the addition area A133 is clicked by the user, the selected font displayed in the selected font area A132 is added as a favorite font, and is displayed in the uppermost part of the favorite list display area A131 (FIG. 34c). In an example shown in FIG. 34c, "Mincho 3" is selected as the selected font, so that "Mincho 3" is displayed in the uppermost part of the favorite list display area A131.

Figure 34D:
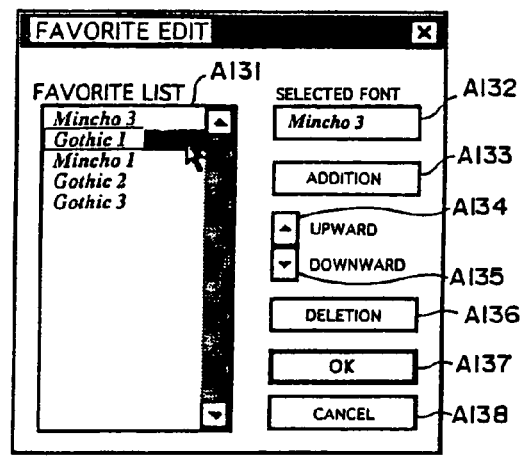

When the priorities of favorites displayed in the favorite list display area A131 are changed, the font whose priority is to be changed is selected by the user (FIG. 34d). When the priority is raised, the upward area A134 is clicked by the user, so that the priority is set to a desired priority (see FIG. 35a). When the priority is lowered, the downward area A135 is clicked by the user.

Figure 35A:
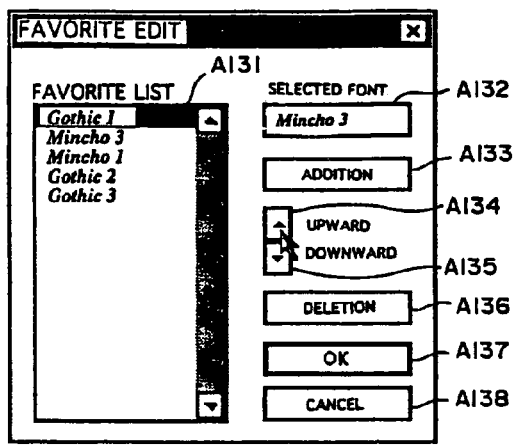
FIGS. 35a to 35d illustrate an example of the favorite edit window.
Figure 35B:
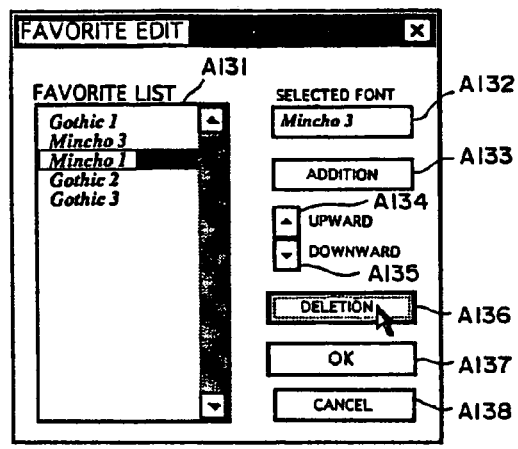

When there is a font to be deleted from the favorite list display area A131, the font to be deleted is selected out of the fonts displayed in the favorite list display area A131, and the delete area A136 is clicked by the user (see FIG. 35b).

Figure 35C:
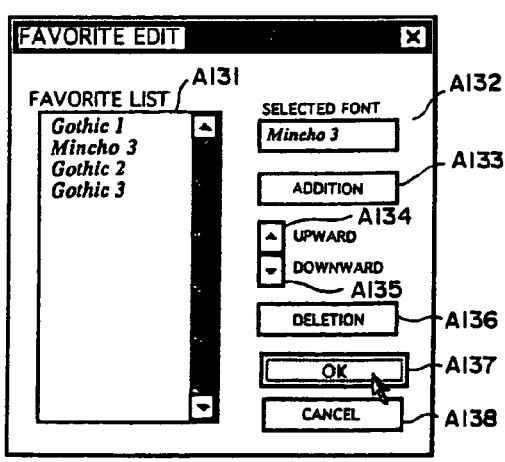
Figure 35D:
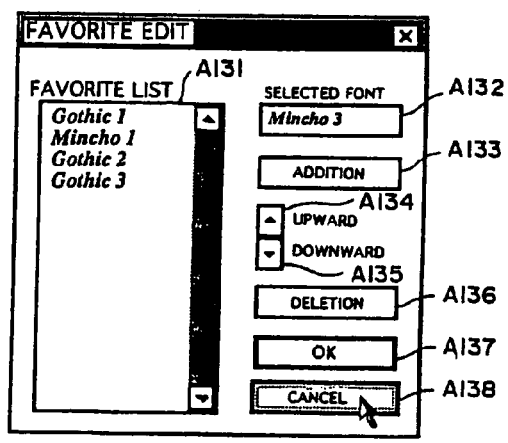

If the contents of the edited favorite are acceptable, the OK area A137 is clicked by the user (FIG. 35c). When the contents of the edited favorite are cancelled, the cancel area A138 is clicked by the user (FIG. 35d).

(4) Font Link Processing

Figure 36:
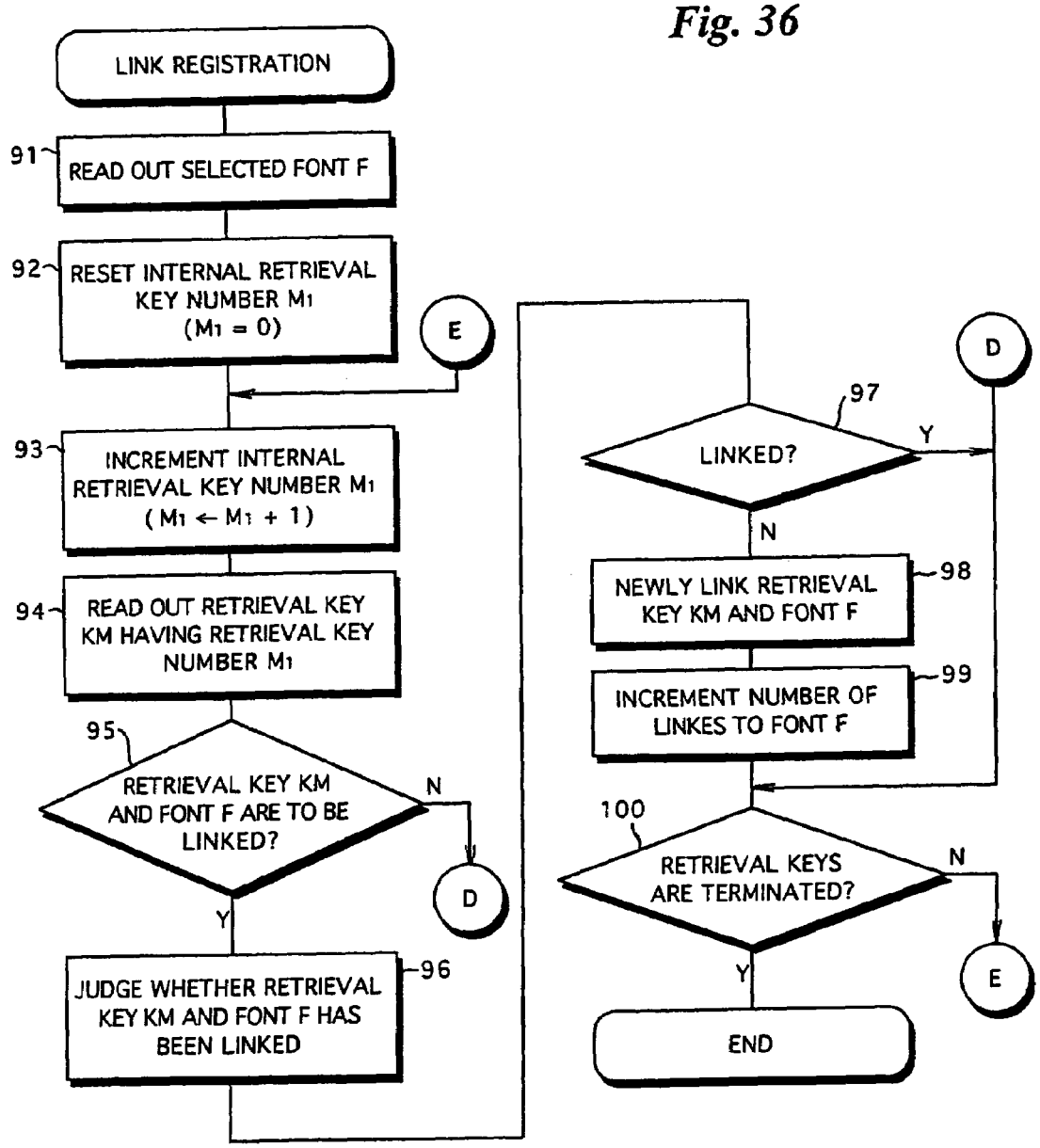
FIG. 36 is a flow chart showing the procedure for font data link processing.

FIG. 36 is a flow chart showing the procedure for processing for linking a retrieval key and font.

When the retrieval key and the font are linked to each other, the font F to be linked to the retrieval key is selected and read out of the hard disk for the client computer 1 (step 91).

An internal retrieval key number $M_1$ is reset (step 92). The internal retrieval key number $M_1$ is then incremented (step 93).

A retrieval key KM having a retrieval key number M equal to the internal retrieval key number $M_1$ is read out (step 94). It is judged whether or not the retrieval key KM read out and selected font F are linked to each other (step 95). If they are not linked to each other (NO at step 95), it is judged whether or not the font F is linked to a retrieval key KM having a retrieval key number M equal to the subsequent internal retrieval key number $M_1$, incrementing the internal retrieval key number $M_1$ (step 100, step 93, 94, 95). When both are linked to each other, it is judged whether or not the retrieval key KM and the font F have already been linked to each other (step 96).

If they have already been linked to each other (YES at step 97), they need not be newly linked to each other. Therefore, it is judged whether or not the font F is linked to the retrieval key KM having the retrieval key number M equal to the subsequent internal retrieval key number $M_1$, incrementing the internal retrieval key number $M_1$ (step 100, step 93, 94, 95). If they have not linked to each other yet (NO at step 97), the retrieval key KM and the font data F are newly linked to each other (step 98). Specifically, a retrieval key is added to the corresponding font in the font link table (see FIGS. 7 and 8). Further, the number of links to the font data is incremented (step 99). The font is added to the corresponding to the retrieval key in the retrieval key link table (FIGS. 9 and 10).

The processing from the step 93 to the step 99 is repeated until likes to all the retrieval keys are terminated (step 100).

FIGS. 37 to 46 illustrate an example of the font selection window.

Referring to FIGS. 37 to 46, description is made of a link between font and a retrieval key.

Figure 37:
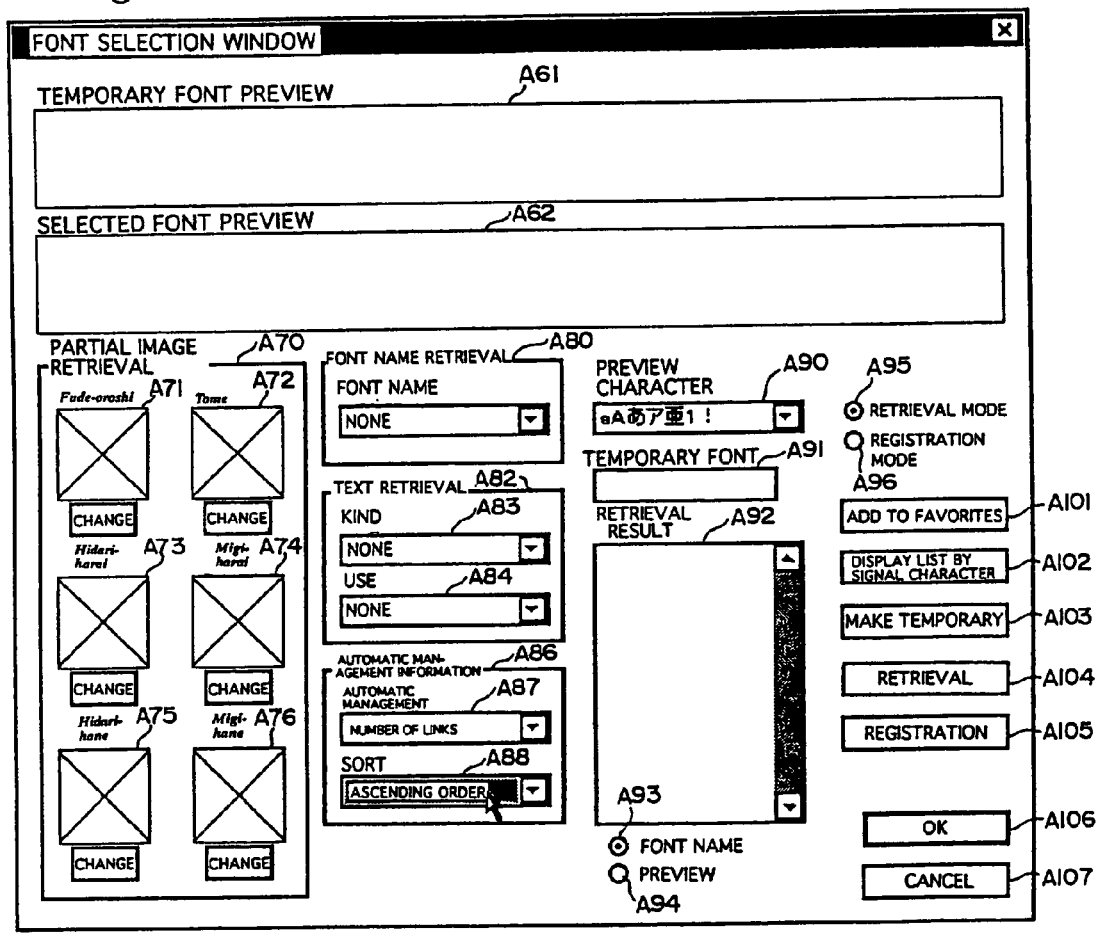
FIGS. 37 to 47 illustrate the font selection window.

In order to display a font in the retrieval result area A92, the number of links and the ascending order are respectively set in the automatic management area A87 and the sort area A88 in the automatic management information area A86 (FIG. 37).

Figure 38:
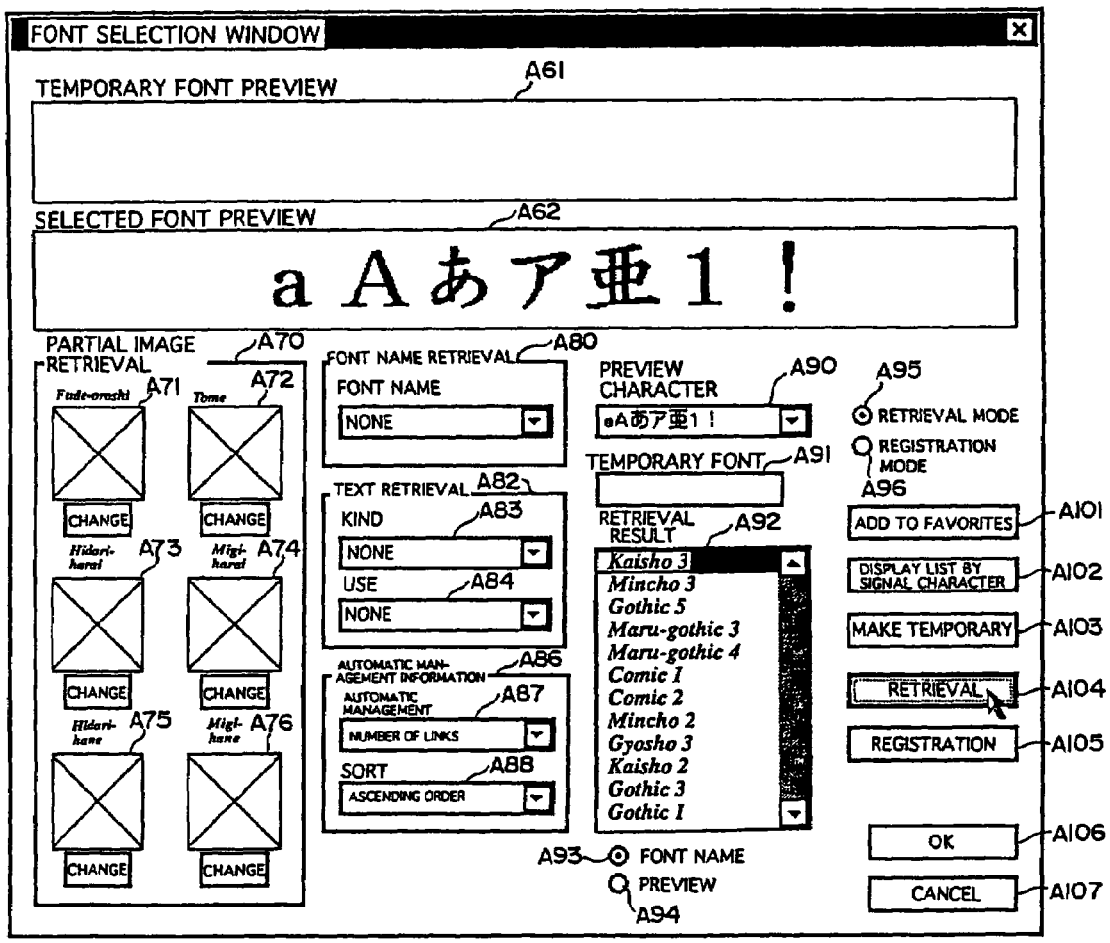
Figure 39:
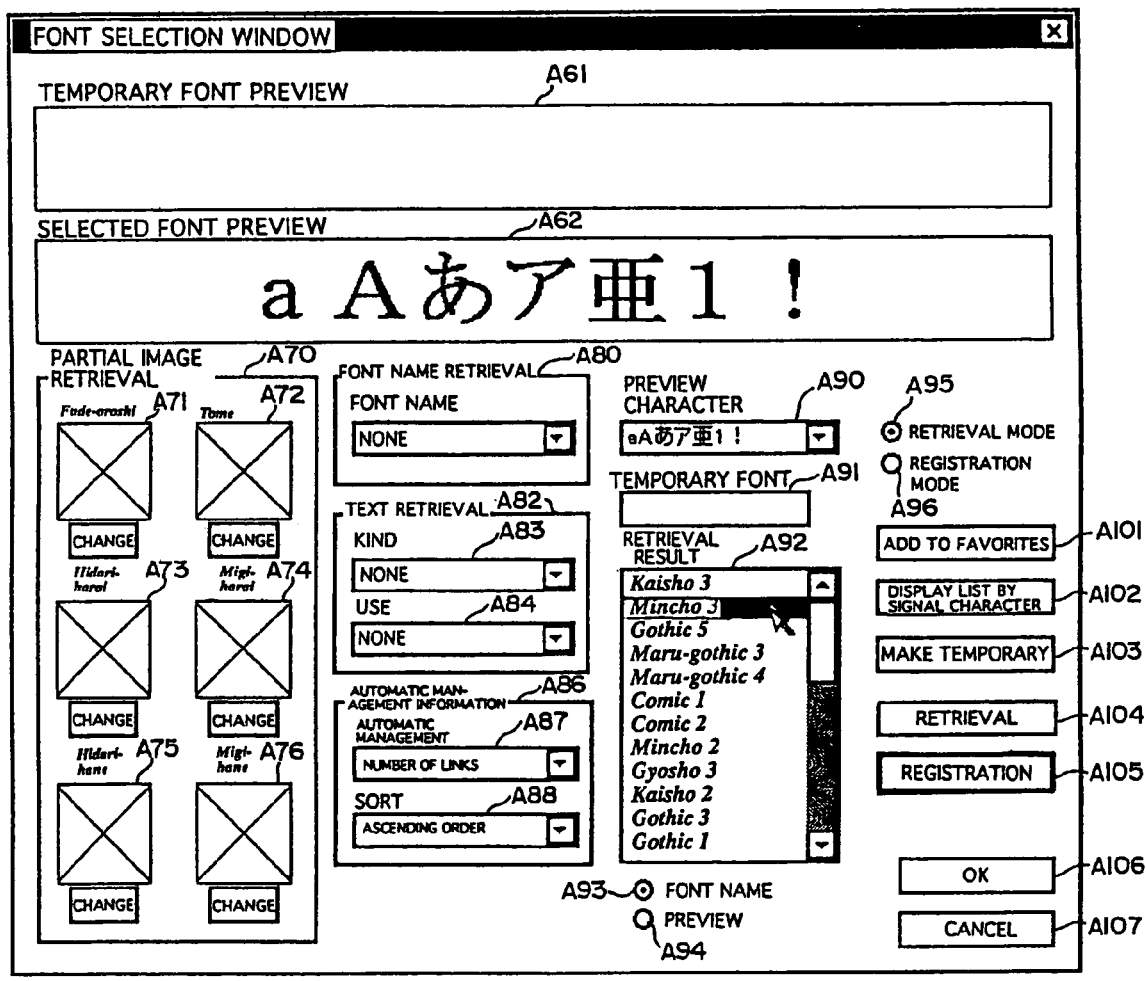

When the retrieval setting area A104 is clicked by the user, font names representing all the fonts stored in the hard disk for the client computer 1 are displayed in the retrieval result area A92 in ascending order of the numbers of links (see FIG. 38).

The name of a font to be linked is then selected from the font names displayed in the retrieval result area A92. Here, "Mincho 3" shall be linked. The font "Mincho 3" is selected by the user (see FIG. 39).

Figure 40:
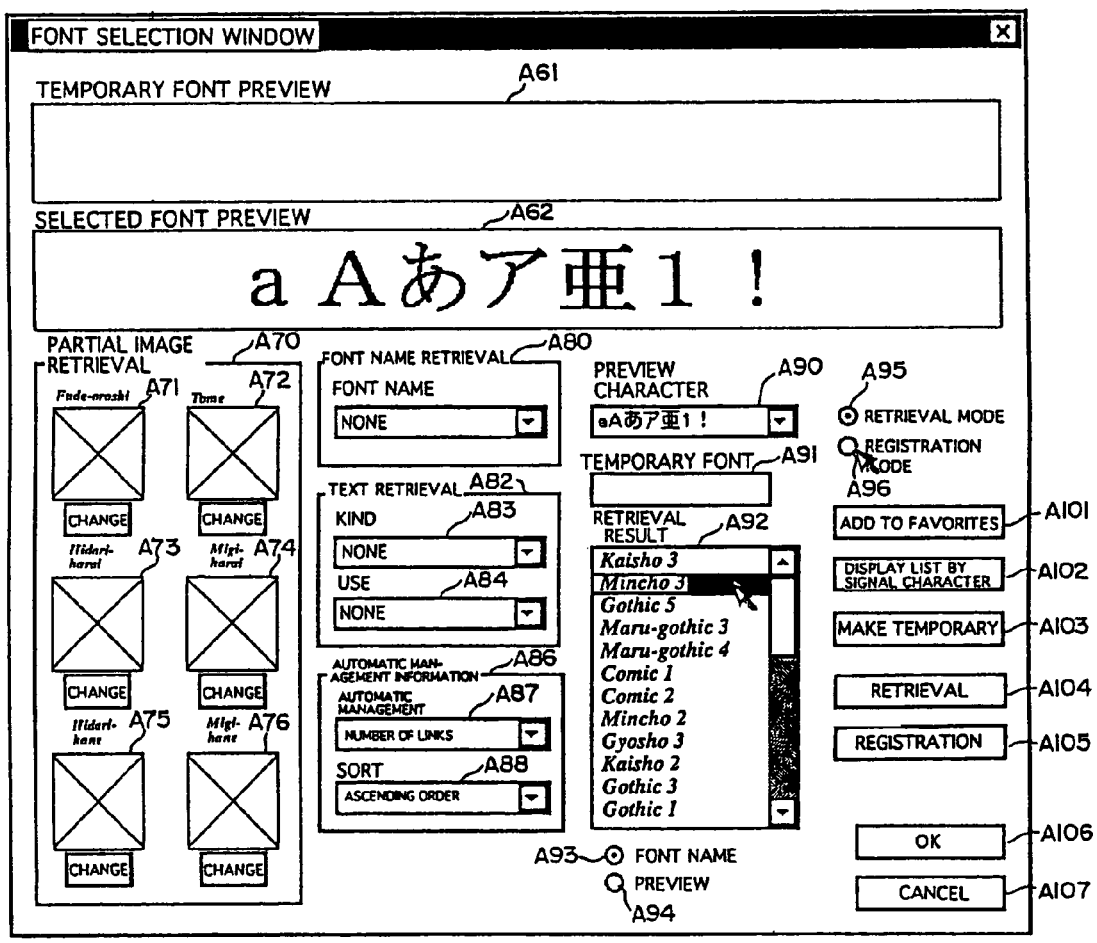

In order to establish a link, the registered mode setting button A96 is clicked, to enter a registration mode (FIG. 40).

Figure 41:
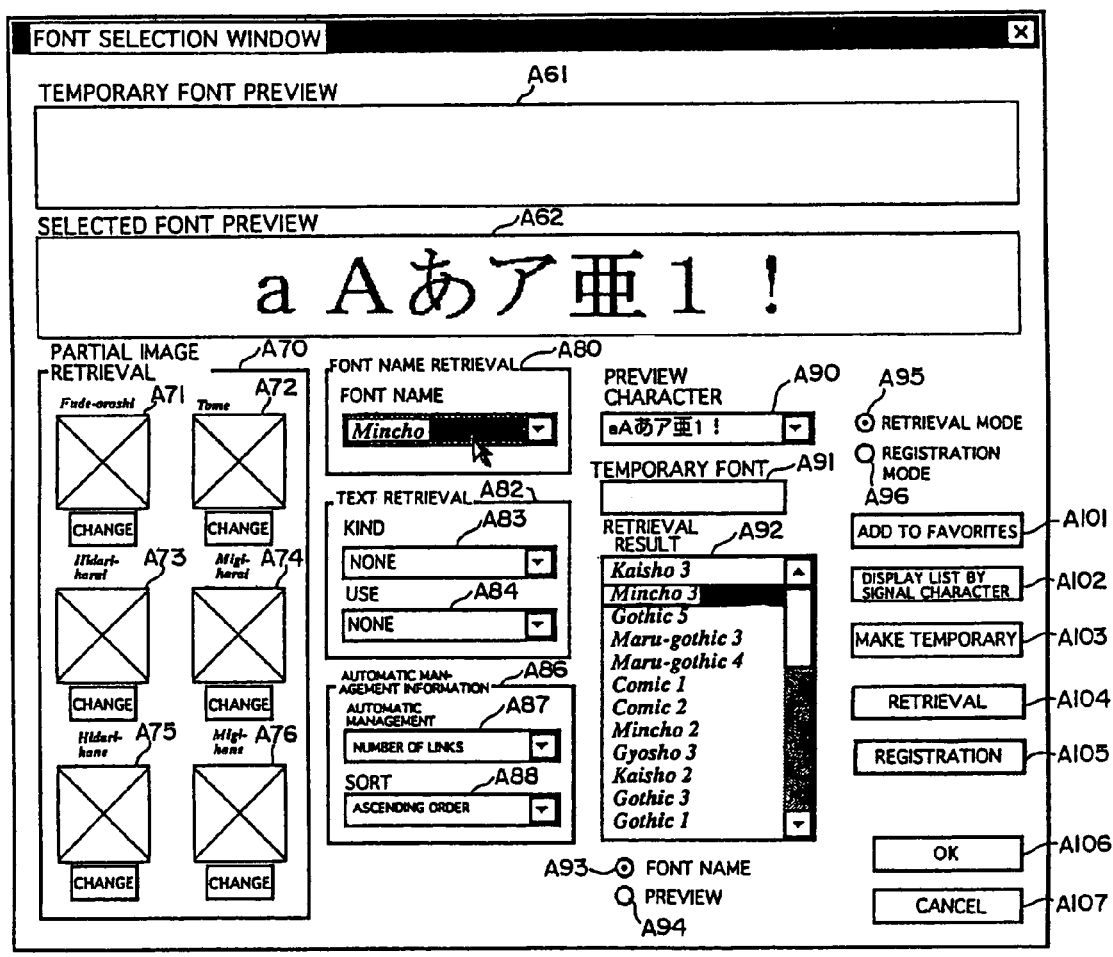
Figure 42:
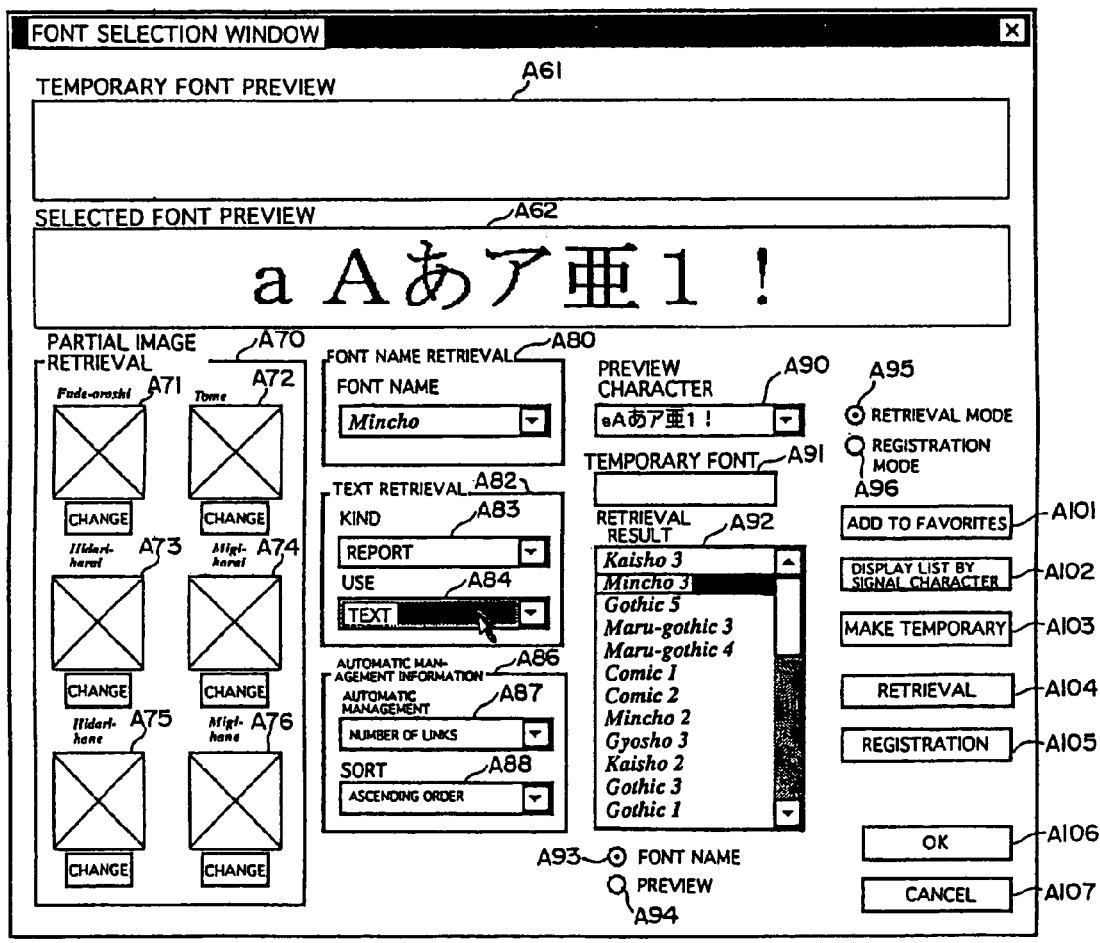

A retrieval key to be linked to the font "Mincho 3" is then set. The font retrieval area A80 is pulled down, so that "Mincho" is set as a retrieval key to be linked to the font "Mincho 3" (FIG. 41). Further, "Report" and "Text" are set as retrieval keys to be linked to the font "Mincho 3" (FIG. 42). It goes without saying that the retrieval keys, that is, "Report" and "Text" are also selected, after pull-down lists are respectively displayed by pulling down the kind retrieval setting area A83 and the use retrieval setting area A84, from the displayed pull-down lists.

Figure 43:
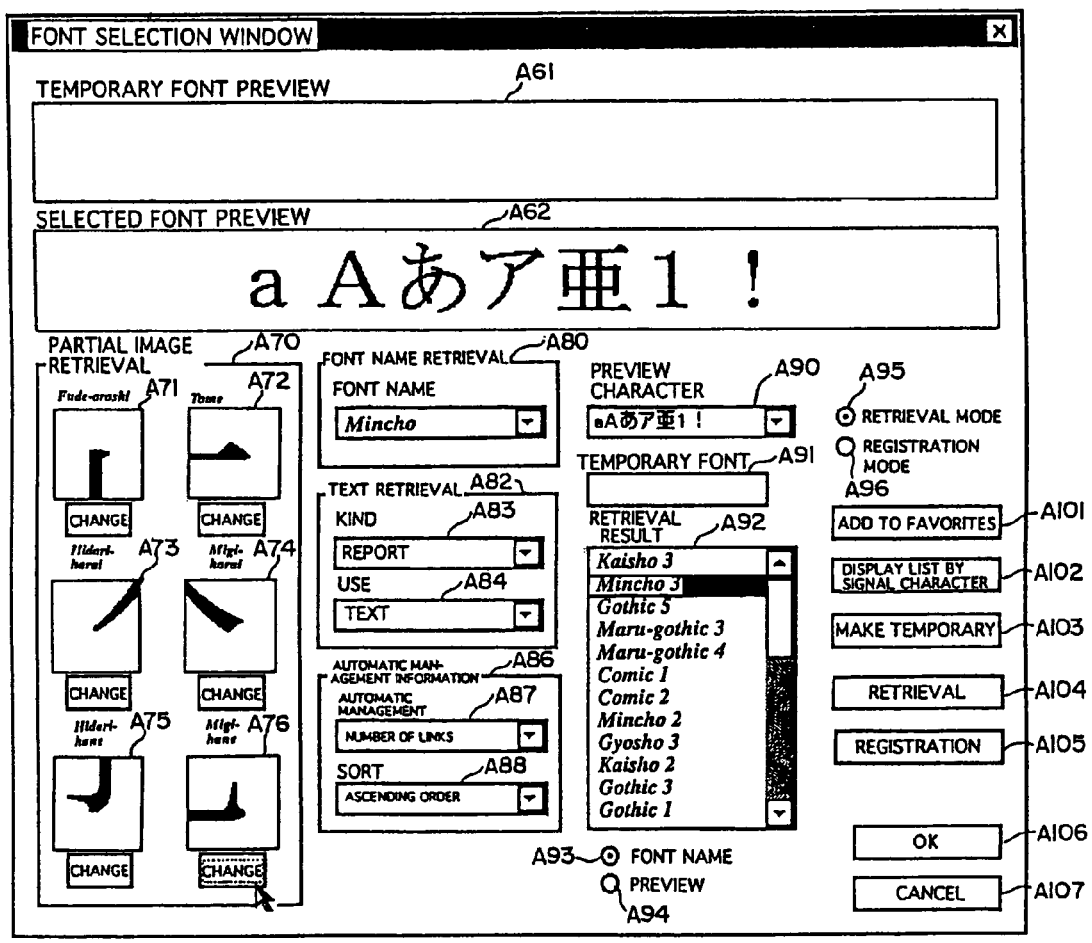

A desired partial image is then set as partial image retrieval (FIG. 43).

Figure 44:
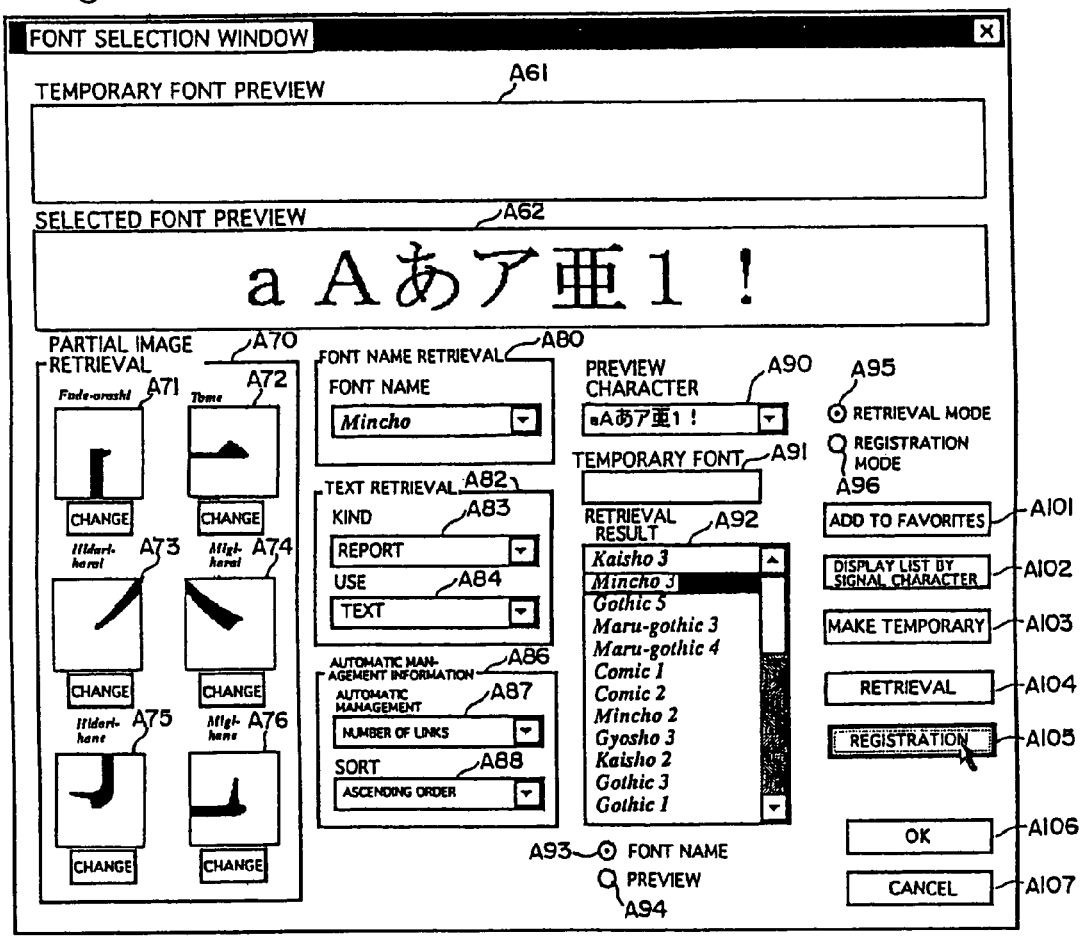

When all the retrieval keys have been set, the registration command setting area A105 is clicked by the user, so that the link to the font "Mincho 3" is terminated (FIG. 44).

Figure 45:
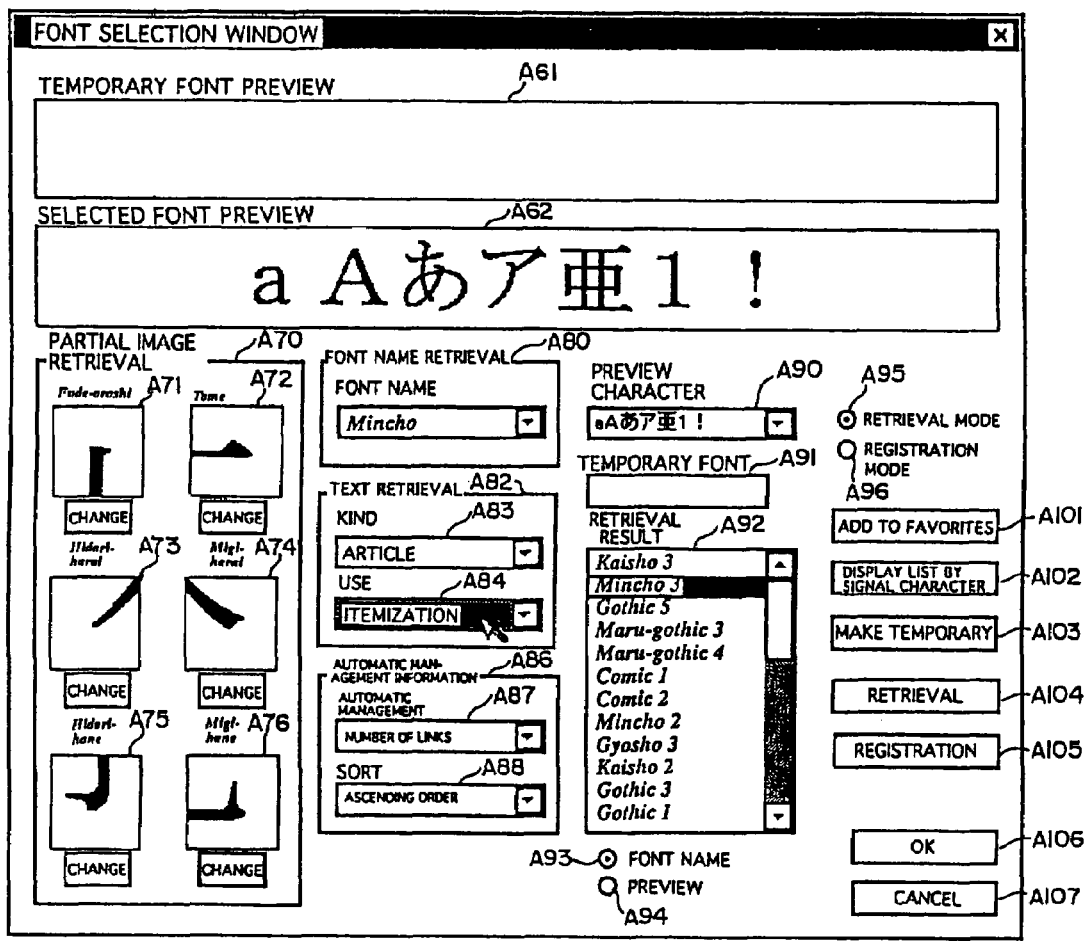
Figure 46:
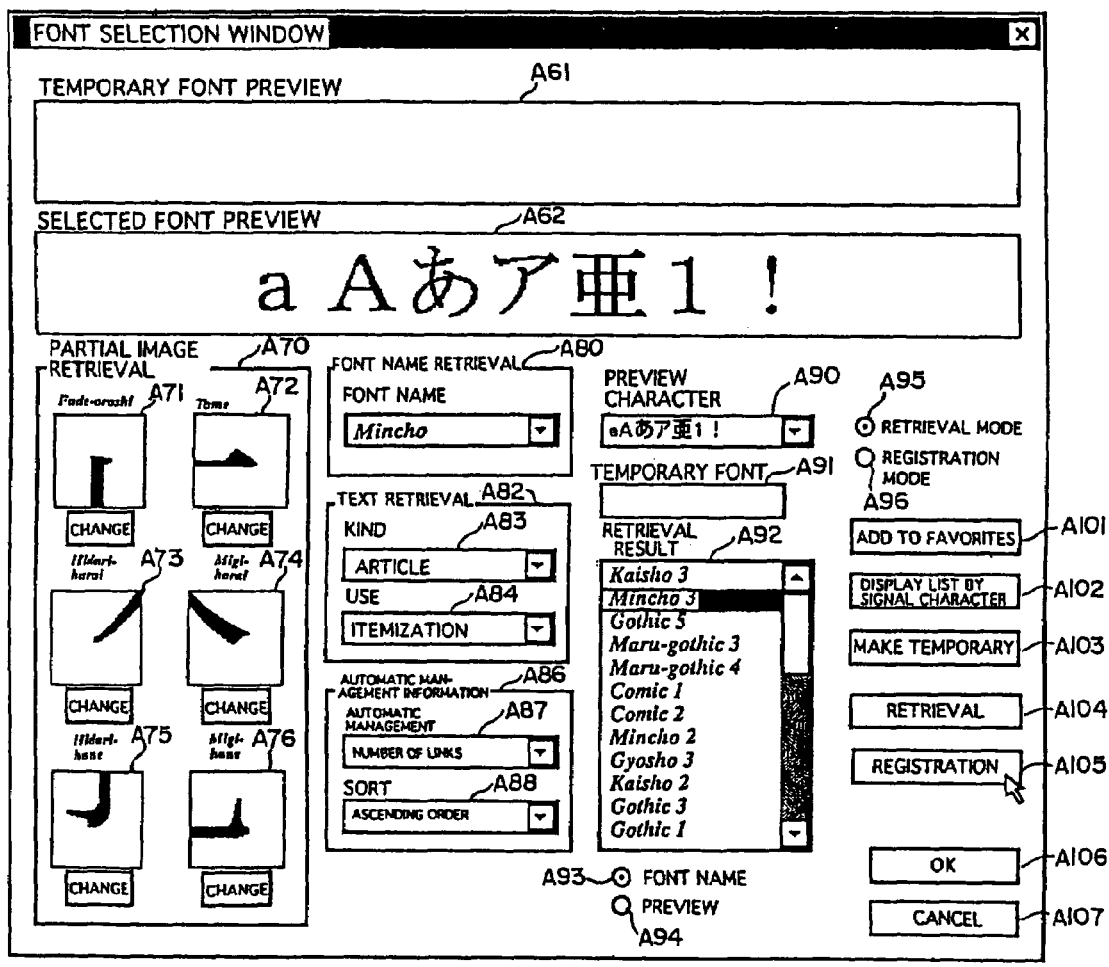

Furthermore, when the retrieval key is linked, the retrieval key is set. For example, when a link to the font "Mincho" is established using kind and use of a text, that is, "Article" and "Itemization" as retrieval keys, "Article" and "Itemization" are set in the areas A83 and A84 (FIG. 45). When the registration command setting area A105 is clicked by the user, the retrieval keys "Article" and "Itemization" are linked to the font "Mincho 3" (FIG. 46).

(5) Font Retrieval in Client Computer and Server

Although the above-mentioned font retrieval is performed with respect to the font stored in the hard disk for the client computer 1, it is also possible to take font stored in the hard disk for the server 30 as an object of font retrieval by setting a destination (a client or server) of font retrieval.

Figure 47:
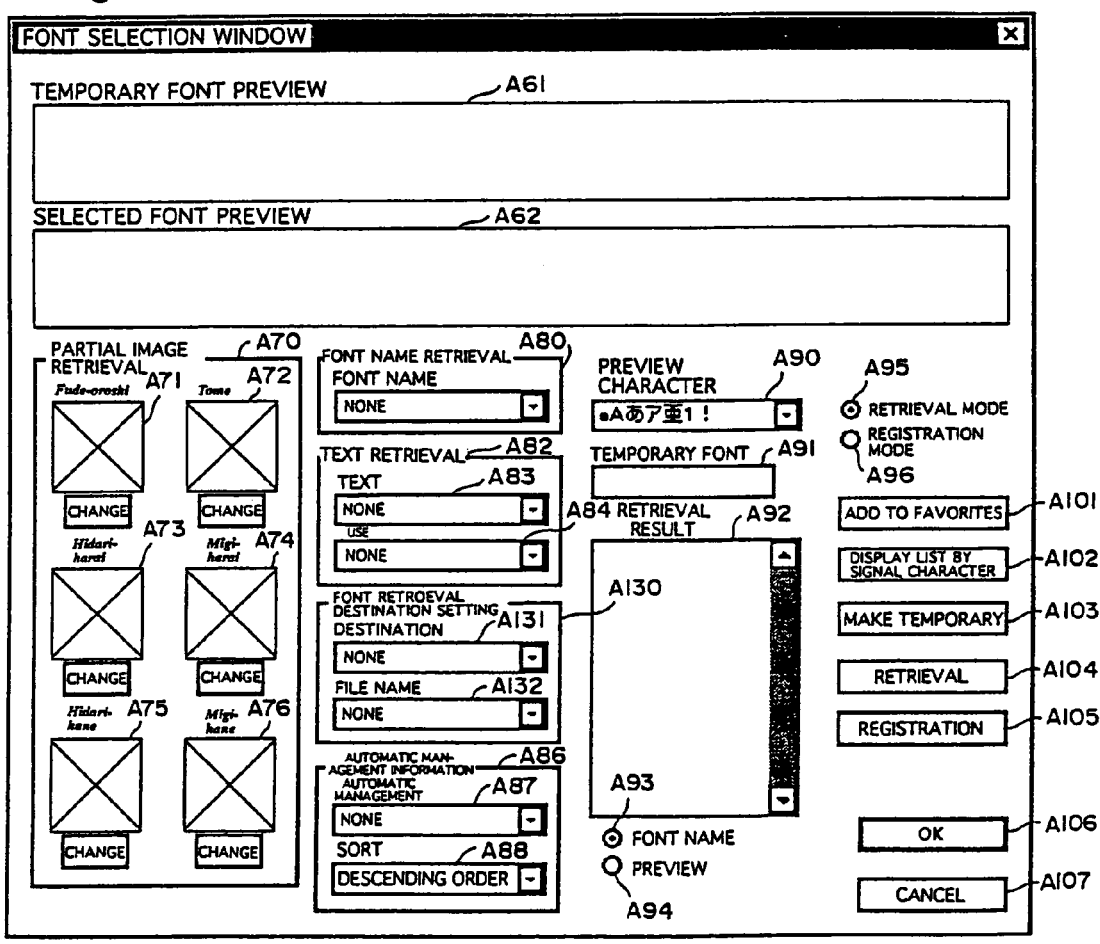

FIG. 47 illustrates an example of the font selection window. FIGS. 48a to 49c illustrate a part of the font selection window.

The font selection window shown in FIG. 47 includes a font retrieval destination setting area A130. The font retrieval destination setting area A130 includes a font retrieval destination area A131 and a file name setting area A132.

The font retrieval destination setting area A130 is utilized by the user when a destination of retrieval of font is set. It is possible to determine using the font retrieval destination area A131 whether the font stored in the hard disk for the client computer 1 is taken as an object of retrieval or the hard disk for the server 30 which can communicate with the client computer 1 is taken as an object of retrieval. Further, it is possible to set a file name to be an object of retrieval using the file name setting area A132.

The destination of font retrieval is set using the font retrieval destination area A131 in the following manner.

The font retrieval destination setting area A130 is pulled down. Consequently, a pull-down list appears (FIG. 48a). A name representing a desired destination of retrieval is selected from the pull-down list (here, an URL name is selected; FIG. 48b). When the selection is terminated, the selected name is displayed in a display window of the font retrieval destination area A131 (FIG. 48c).

It is possible to also set a desired destination of retrieval that does not exist in the pull-down list by entry from the user. The display window of the font retrieval destination area A131 is clicked by the user (FIG. 48d). Consequently, a text is allowed to be entered using the keyboard 7. A desired name (a path name, etc.) is entered by the user (FIGS. 48e and 48f).

Figure 49A:
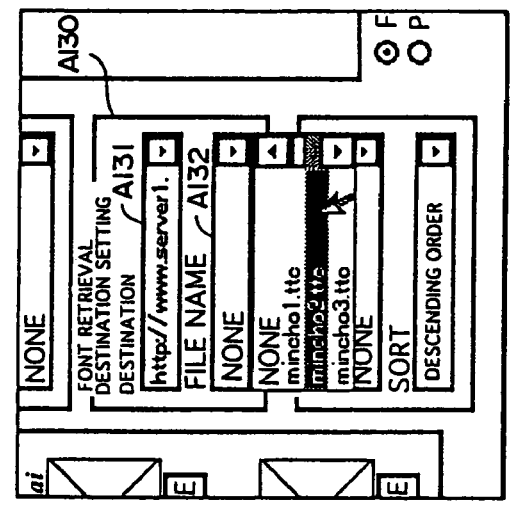
Figure 49B:
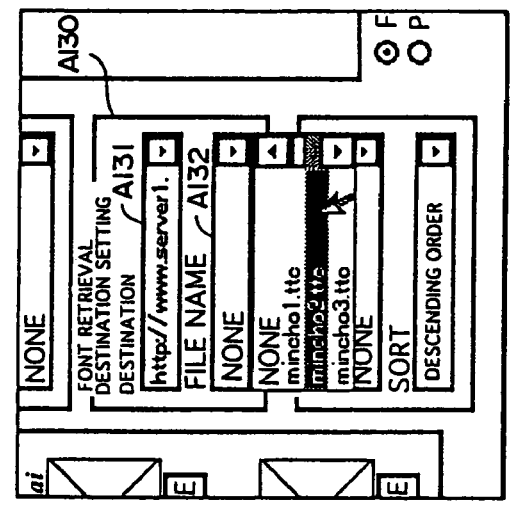
Figure 49C:
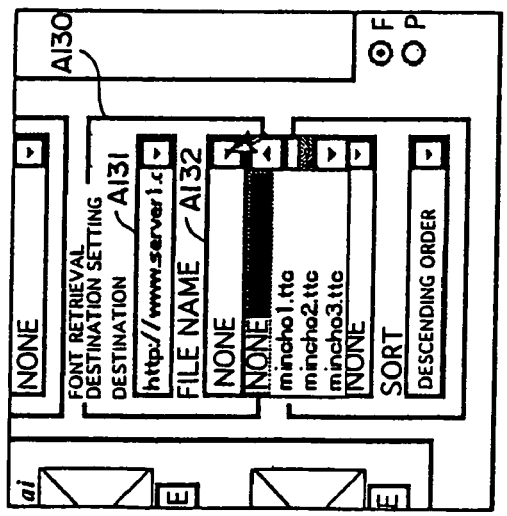

The file name setting area A132 is pulled down by the user. Consequently, a pull-down list appears (FIG. 49a). A desired file name is selected from the pull-down list by the user, so that a file name at a destination of retrieval of font is set (FIGS. 49b and 49c). Font is retrieved in a file having the set file name.

Figure 50:
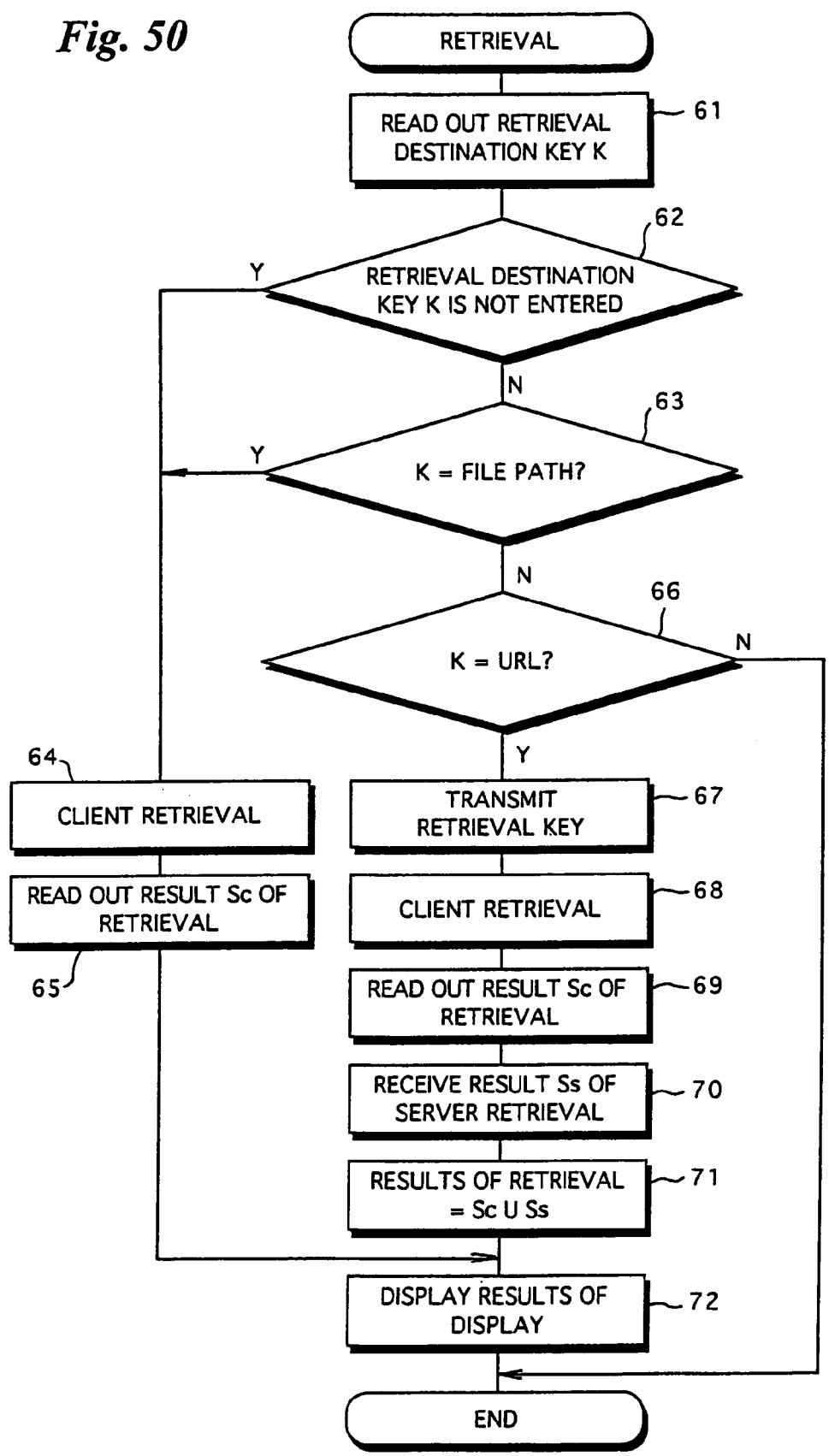
FIGS. 50 and 51 are flow charts showing the procedure for font retrieval processing.
Figure 51:
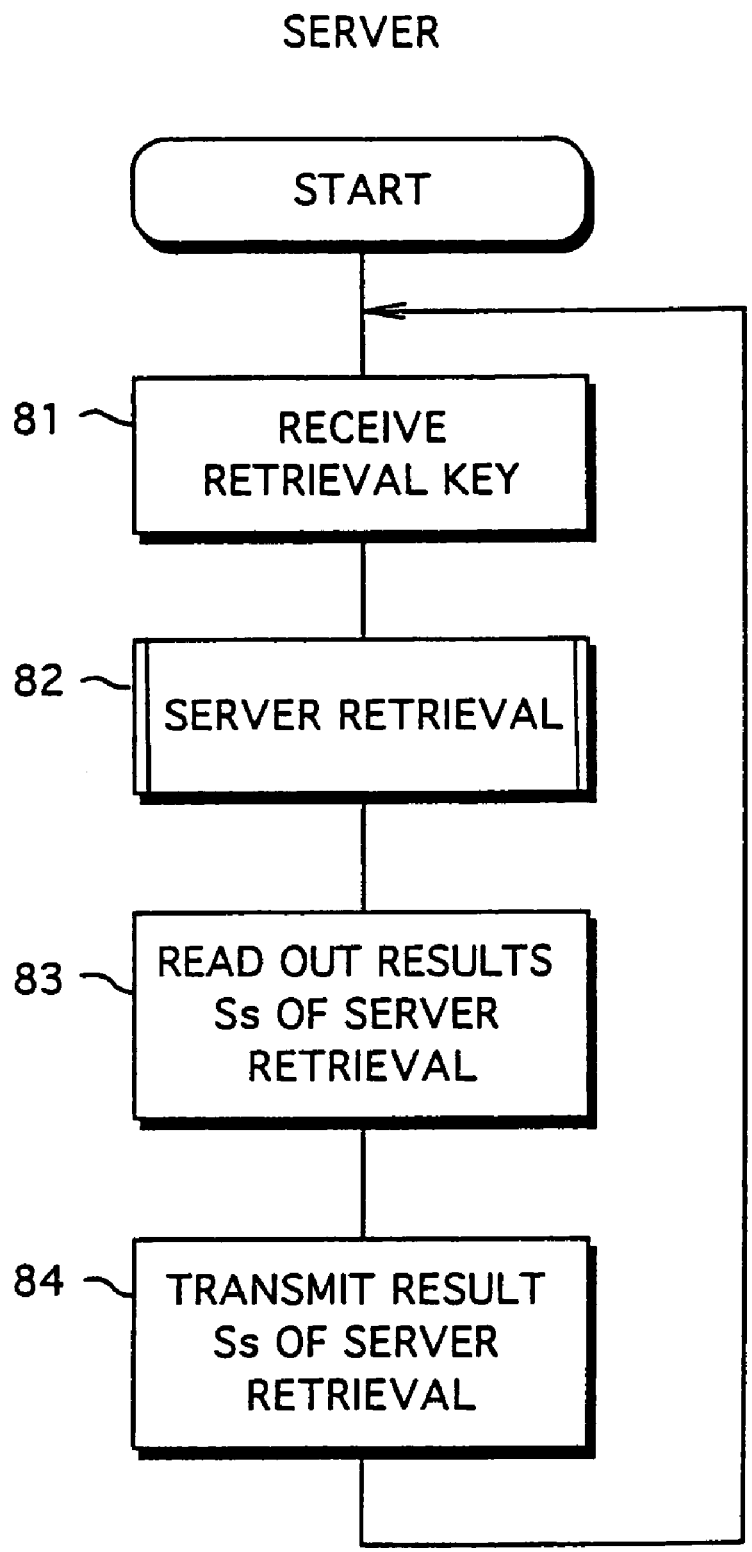

FIGS. 50 and 51 are flow charts showing the procedure for processing in a case where font retrieval is also performed with respect to the font stored in the hard disk for the server 30 in addition to the font stored in the hard disk for the client computer 1.

A retrieval destination key K is first read out by the user (step 61). If the retrieval destination key K is not entered from the user (YES at step 62), font retrieval based on the font data stored in the hard disk for the server 30 is not performed. Therefore, the font retrieval is performed in the client computer 1 in the procedure for processing shown in FIGS. 18 and 19, as described above (step 64). The result of retrieval obtained by the font retrieval is read out (step 65), and is displayed in the retrieval result display area A92 in the font selection window (step 72).

When the retrieval destination key K is entered from the user, it is judged whether it is a file path (step 63) or a URL (step 66).

If the retrieval destination key K is the file path, this indicates that file retrieval based on the font stored in the hard disk for the client computer 1 is performed, so that the font retrieval is performed in the client computer 1 (step 64). If the retrieval destination key K is the URL, this indicates that font retrieval based on the font stored in the hard disk for the server 30 is performed, so that data representing the retrieval key set in the font selection window is transmitted from the client computer 1 to the server 30 (step 67).

When data representing the retrieval key transmitted from the client computer 1 is received in the server 30 (step 81), font retrieval processing is performed on the basis of the font stored in the hard disk for the server 30 on the basis of the received retrieval key (step 82). The font retrieval processing in the server 30 is also performed in the same manner as the font retrieval processing in the client computer 1 shown in FIGS. 18 and 19.

When the font retrieval processing is terminated in the server 30, data representing the result of retrieval is transmitted from the server 30 to the client computer 1 (steps 83 and 84).

On the other hand, also in the client computer 1, the font retrieval is performed on the basis of the retrieval conditions set in the font selection window (step 68). The result obtained by the retrieval is read out (step 69).

Both a font obtained as a result of the font retrieval in the client computer 1 and a font obtained and received as a result of the font retrieval in the server 30 (step 70) are obtained as the results of retrieval (step 71). The results of retrieval are displayed in the retrieval result area A92 in the font selection window displayed in the display device 14 in the client computer 1 (step 72). It is possible to also retrieve the font stored in the server 30 which can communicate with the client computer 1.

For example, a font name "FJ-Comic" (=the result of client retrieval Sc) shall be obtained as a result of the font retrieval in the client computer 1, and font names "FJ-Mincho, FJ-Gothic, FJ-Comic" (=the results of server retrieval Ss) shall be obtained as a result of the font retrieval in the server 30. As the results of retrieval, "FJ-Mincho, FJ-Gothic, FJ-Comic" (=the results of retrieval Sc U Ss) are displayed.

(6) Sequential Font Conversion

FIG. 52 illustrates a text which is being entered using the keyboard 7 in the client computer 1 and operations at that time.

In the present embodiment, the font of a part of the text which is being entered can be changed into a font different from the font of the text which is being entered.

In the first step during entry of the text shown in FIG. 52, "今は晴ですが、" is entered, and a font is set to "Mincho" in the text entered in the first step.

In the second step, "今は晴ですが、すぐにくもるでしょう" is entered (an underlined part indicates an undetermined state). In the second step, a Kanji conversion key in the keyboard 7 is pressed, so that the text part in the undetermined state is converted into Kanji (or Katakana).

In the third step, the Kanji conversion key in the keyboard 7 is pressed again, so that Kanji (or Katakana) in the text part in the undetermined state is determined. In the third step, Kanji is determined as "今は晴ですが、すぐに曇るでしょう" in the text part in the undetermined state.

In the fourth step, a font conversion key in the keyboard 7 is pressed, so that the font of the text part in the undetermined state is converted. As the font conversion key is pressed, the font of the text part in the undetermined state is converted and displayed.

In the fifth step, when a font determination key in the keyboard 7 is pressed, the font of the text part in the undetermined state is determined. Therefore, Kanji conversion and font conversion are terminated, so that an underline indicating the undetermined state disappears, as shown in the sixth step.

The font which changes every time the font conversion key is pressed will conform to the order of favorites, as described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A font retrieval apparatus comprising:
 a display device displaying a plurality of partial images which represents a characterizing portion of a character with a plurality of different fonts;
 a portion selecting device for selecting at least one of a plurality of characterizing portions of the character, said display device displaying the plurality of partial images of the characterizing portion selected by said portion selecting device;
 a partial image selecting device selecting at least one of the partial images displayed on said display device; and
 a font output device outputting data representing any font corresponding to the partial image selected by said partial image selecting device.

2. The font retrieval apparatus of claim 1, wherein said font data comprises at least one of:
 a font identification name; and
 one or more characters as represented in a format of said font.

3. The font retrieval apparatus of claim 2, wherein characters are simultaneously presentable in two or mare font formats, thereby allowing a comparison of said two or more fonts.

4. The font retrieval apparatus of claim 2, further comprising one or more of:
 a selector to choose at least one of said font identification name and a representation of at least one character in a font;
 a selector allowing a single character to be displayed in different fonts; and
 a font link table to store said font data and a relationship between said fonts and said partial images.

5. The font retrieval apparatus of claim 1, wherein more than one of said plurality of characterizing portions of the character are selected for deriving said font information.

6. A font retrieval method comprising the steps of:
 displaying a plurality of characterizing portions of characters;
 selecting one of said plurality of characterizing portions;
 displaying a plurality of partial images which represents the selected characterizing portion with a plurality of different fonts;
 selecting one of the displayed partial images; and
 outputting data representing any font corresponding to the selected partial image.

7. A machine-readable medium tangibly embodying a program of machine-readable instructions executable by a digital processing apparatus to perform a method of retrieving font information, said method comprising:

displaying a plurality of characteristic portions of characters;

allowing a selection of at least one of the displayed characteristic portions;

displaying a plurality of partial images of a character, each said partial image representing a portion of said character as represented in a different font in said selected characteristic portion;

allowing a selection of at least one of the displayed partial images; and outputting data representing information of any font corresponding to the selected partial image.

8. A font information retrieval apparatus comprising:

a font link table storing a relationship between a plurality of fonts and a plurality of retrieval keys, said retrieval keys being classified into a plurality of groups, said relationship defining an association between the retrieval keys and the fonts;

a display device displaying a plurality of retrieval key groups, wherein one said retrieval group includes a plurality of retrieval keys to allow selection of one or more characteristic portions of characters for displaying partial images of a character, each partial image illustrating a characteristic of said character as represented in at least one said font;

a retrieval key selecting device to allow selecting at least one of said plurality of retrieval keys in said first group; and a font output device retrieving and outputting a font information associated with the retrieval key selected by said retrieval key selecting device.

9. The font retrieval apparatus according to claim 8, wherein said font output device retrieves, when a plurality of retrieval keys are selected by said retrieval key selecting device, font information for each of a font which is associated with all of the selected retrieval keys.

10. The font information retrieval apparatus of claim 8, wherein a second group of said plurality of retrieval keys is displayed when one of first group of retrieval keys is selected, each retrieval key of said second group being associated with each said partial image.

11. A font retrieval device, comprising:

a font link table storing information about a plurality of fonts, each said font having one or more features;

a plurality of retrieval keys, each said retrieval key being related to one of said features, at least one retrieval key for indicating partial images of a character, each partial image representing a portion of a character that serves to illustrate a characteristic of said character as represented in at least one said font;

a retrieval key entry device for allowing a retrieval key to be entered;

a registration key for allowing a registration command to be entered; and a link device for linking a font stored in said font link table to a retrieval key entered from said retrieval key entry device and storing the link relation in said font link table when said registration command is entered.

12. A font information retrieval method using partial images of a character, said method comprising:

storing a relationship between a plurality of fonts and a plurality of retrieval keys classified into a plurality of groups, said relationship defining an association, if any, between each said retrieval key and one or more of said fonts;

displaying a plurality of retrieval keys for at least one said group; wherein said plurality of groups comprises a first group of retrieval keys associated with a plurality of portions of characters;

selecting one of said first group of retrieval keys to display at least one partial image of a character, each said partial image comprising a portion of a character that serves to illustrate a characteristic of at least one said font, each said partial image being respectively associated with a second group of retrieval keys;

selecting one of said retrieval keys in said second group; and retrieving and outputting data for each of any font associated with the selected retrieval key from said second group.

13. A font data link method using partial images, said method comprising:

storing a plurality of fonts;

entering a retrieval key relating to a feature of one of said stored fonts, wherein at least one retrieval key relates to at least one partial image of a character, each said partial image comprising a portion of said character that serves to illustrate a characteristic of said stored font;

linking the one of said plurality of fonts to the entered retrieval key; and storing the link.

14. A computer readable recording medium storing a program for controlling a computer in order to retrieve font information, the program controlling the Computer so as to:

store a relationship between a plurality of fonts and a plurality of retrieval keys, said retrieval keys being classified into a plurality of groups, said relationship defining an association between the retrieval keys and said fonts, wherein said plurality of groups comprises partial images of a character, each said partial image comprising a portion of a character that serves to illustrate a characteristic of at least one said font;

display a plurality of retrieval keys for allowing a selection of one of a plurality of characteristic portions of characters;

allow a selection of one of said plurality of retrieval keys to display partial images associated with said selected characteristic portion;

allow a selection of one of said partial images; and retrieve and output a font information for any of a font associated with the selected partial image.

15. A font information retrieval apparatus comprising:

a font link table stored in a memory, said font link table storing a relationship between a plurality of fonts and a plurality of features attributable to said fonts, wherein said plurality of features comprises:

partial images of a character, each said partial image comprising a portion of a character that serves to illustrate a characteristic of at least one said font; and a characteristic portion of characters associated with said partial images; and a comparator receiving an input query, said input query including one of said partial images and one of said characteristic portions, said comparator determining which entries in said font link table match said input query.

16. The font retrieval apparatus of claim 15, further comprising:

a plurality of font retrieval keys, each said font retrieval key associated with one of said features, said input query being formed from selections of said font retrieval keys by a user.

17. The font retrieval apparatus of claim 15, further comprising:
a font output display receiving as input the output of said comparator and displaying a font information.

18. A method of font retrieval, comprising:
establishing a font link table in a memory, said font link table storing a relationship between a plurality of fonts and a plurality of features attributable to said fonts, wherein said plurality of features comprises partial images of a character, each said partial image comprising a portion of a character that serves to illustrate a characteristic of at least one said font, and characteristic portions of characters that are associated with said partial images; and
providing a comparator to determine which entries in said font link table match an input query, said input query including at least one of said partial images and one of said characteristic portions.

19. The method of claim 18, further comprising:
providing a plurality of font retrieval keys, each said font retrieval key being associated with one of said plurality of features;
forming said input query from a selection of one or more of said plurality of font retrieval keys; and
displaying a font information for any entry that matches said input query.

20. A computer-readable medium tangibly embodying a program of machine-readable instructions executable by a digital processing apparatus to perform a method of font retrieval based on partial images of a character, said method comprising:
establishing a font link table in a memory, said font link table storing a relationship between a plurality of fonts and a plurality of features attributable to said fonts, wherein said plurality of features comprises at least partial images of a character, each said partial image comprising a portion of a character that serves to illustrate a characteristic of at least one said font, and characteristic portions of said character having said partial images; and
providing a comparator to determine which entries in said font link table match an input query, said input query including at least one of said partial images and one of said characteristic portions.

* * * * *